US012626480B2

(12) United States Patent
Kambara et al.

(10) Patent No.: US 12,626,480 B2
(45) Date of Patent: May 12, 2026

(54) INFORMATION PROCESSING SYSTEM, PROCESSING METHOD, AND RECORDING MEDIUM

(71) Applicants: Kohji Kambara, Tokyo (JP); Shuhei Akiyama, Tokyo (JP)

(72) Inventors: Kohji Kambara, Tokyo (JP); Shuhei Akiyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 273 days.

(21) Appl. No.: 18/281,310

(22) PCT Filed: Mar. 2, 2022

(86) PCT No.: PCT/IB2022/051819
§ 371 (c)(1),
(2) Date: Sep. 11, 2023

(87) PCT Pub. No.: WO2022/189899
PCT Pub. Date: Sep. 15, 2022

(65) Prior Publication Data
US 2024/0161451 A1      May 16, 2024

(30) Foreign Application Priority Data

Mar. 12, 2021    (JP) ................................. 2021-040561
May 28, 2021    (JP) ................................. 2021-090252

(51) Int. Cl.
*G06V 10/56* (2022.01)
*G06V 30/10* (2022.01)

(52) U.S. Cl.
CPC .............. *G06V 10/56* (2022.01); *G06V 30/10* (2022.01)

(58) Field of Classification Search
CPC .............. G06V 30/10; G06V 30/1444; G06V 30/1456; G06V 10/56
See application file for complete search history.

(56) References Cited

U.S. PATENT DOCUMENTS 11,297,200 B2 *  4/2022  Teshima ............. H04N 1/00782
11,328,448 B2 *  5/2022  Shinohara ................. G06F 9/54
(Continued)

FOREIGN PATENT DOCUMENTS

EP            2228751 A2      9/2010
JP        2010-211465 A      9/2010
(Continued)

OTHER PUBLICATIONS

International Search Report and Written Opinion issued on Jun. 1, 2022 in PCT/IB2022/051819 filed on Mar. 2, 2022, 10 pages.
(Continued)

*Primary Examiner* — Daniel G Mariam
(74) *Attorney, Agent, or Firm* — XSENSUS LLP

(57) ABSTRACT

An information processing system communicably connectable to one or more apparatuses and configured to execute a plurality of processes, includes: a data storing unit configured to store, in response to a user operation on a first apparatus, setting information associating identification information identifying content of a particular process among the plurality of processes and the particular process; an area identifying unit configured to identify an area including the identification information from image data received from a second apparatus; and a processing unit configured to execute the particular process, based on the identified area and the setting information.

16 Claims, 60 Drawing Sheets

101

(56)                    References Cited

U.S. PATENT DOCUMENTS

| | | |
|---|---|---|
| 2011/0058228 A1 | 3/2011 | Inamoto et al. |
| 2013/0272523 A1* | 10/2013 | McCorkindale ......... H04N 1/44 |
| | | 380/243 |
| 2019/0166284 A1 | 5/2019 | Sadowara et al. |
| 2021/0409555 A1 | 12/2021 | Yoshihashi et al. |

FOREIGN PATENT DOCUMENTS

| | | | |
|---|---|---|---|
| JP | 2017-212575 A | 11/2017 | |
| JP | 2019-040250 A | 3/2019 | |
| JP | 2019-096178 A | 6/2019 | |
| WO | 2009/063329 A1 | 5/2009 | |

OTHER PUBLICATIONS

Office Action issued Jan. 21, 2025 in Japanese Patent Application No. 2021-090252, 8 pages.

* cited by examiner (1)
ENABLE COOPERATION
BETWEEN APPLICATION AND
COOPERATION APPLICATION (3)
REGISTER MARK AND PROCESS
IN SETTING FILE (2)
USER GIVES MARK TO
PROCESS AND PERFORM
SCANNING

| MARKER COLOR | PROCESS |
|---|---|
|  | OCR |
|  | OMR |
|  | TRIMMING |

FIG. 2A (4) IMAGE DATA
OF FORM WITH
AREA DESIGNAT-
ED WITH MARKER (5) DETECT COLOR IN SET-
TING FILE AND REGISTER
AREA INFORMATION IN
SETTING FILE (6)-1 COM-
PLEMENT
SETTING FILE (6)-2 ASSOCIATE APPLI-
CATION WITH SETTING FILE

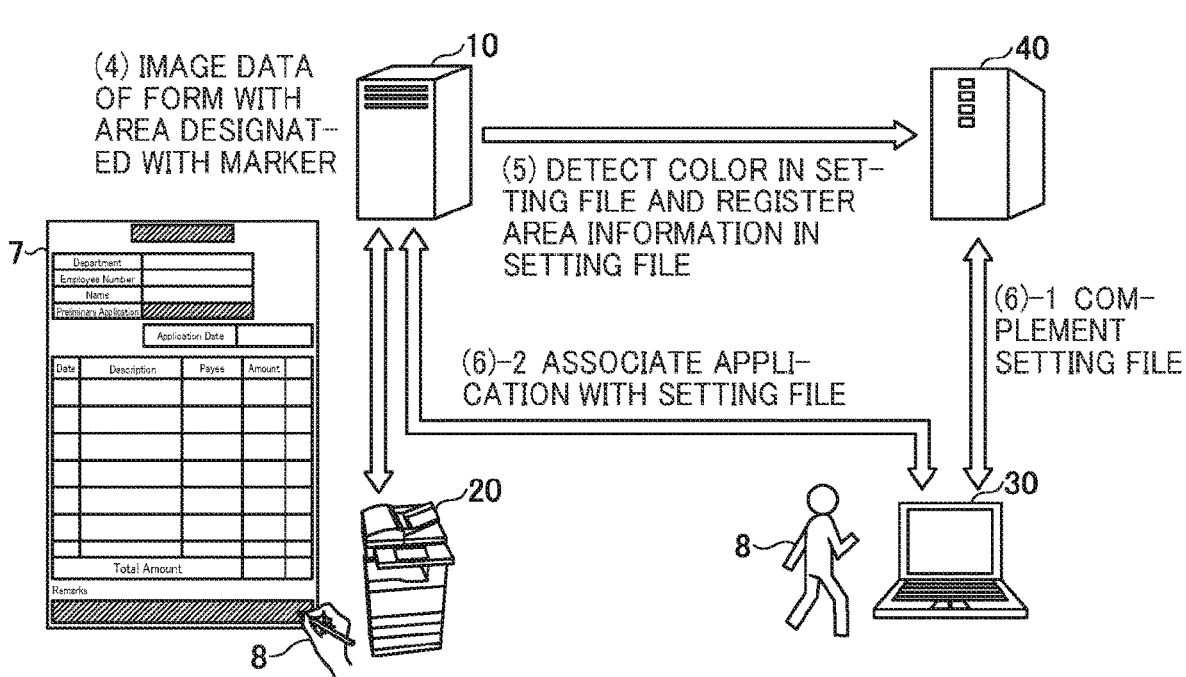

FIG. 2B (8) EXTRACT DATA
FROM AREA USING
AREA INFORMATION IN
SETTING FILE IDENTI-
FIED BY APPLICATION
ID

(11) REGISTER
IMAGE DATA
AND FILE IN
FOLDER

(10) STORE IMAGE
DATA AND FILE (9) PROCESS AREA
AND REGISTER
DATA IN FILE (7) APPLICATION ID
OF APPLICATION
AND PDF FILE

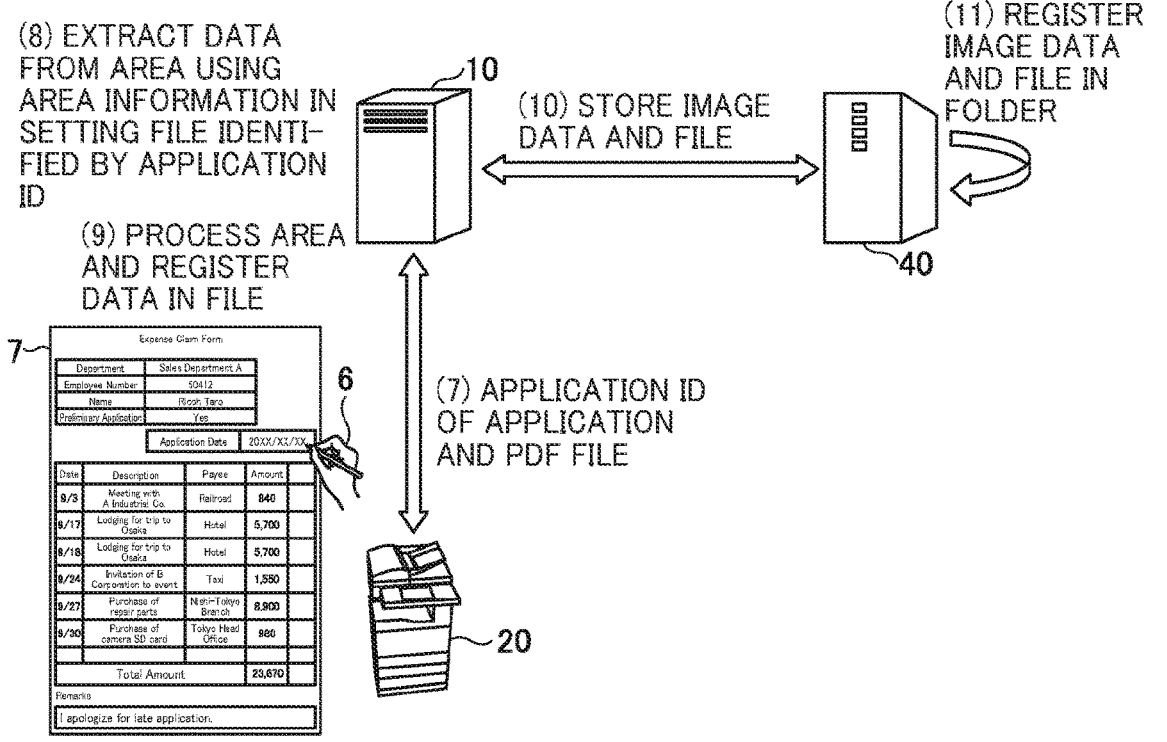

| MARKER COLOR | PROCESS |
|---|---|
| | OCR |
| | MASKING |
| | TRIMMING |

APPLY COLORS TO PREDETER-MINED POR-TIONS (b)

| MARKER COLOR | PROCESS |
|---|---|
| | OCR |
| | MASKING |
| | TRIMMING |

SCAN (c)

| MARKER COLOR (NUMERICAL VALUE) | PROCESS |
|---|---|
| NUMERICAL VALUE IDENTIFYING MARKER COLOR (GREEN) | OCR |
| NUMERICAL VALUE IDENTIFYING MARKER COLOR (BLUE) | MASKING |
| NUMERICAL VALUE IDENTIFYING MARKER COLOR (RED) | TRIMMING |

| | ⊞ APPLICATION SETTING ... |
|---|---|

← APPLICATION MANAGEMENT

| COLOR SETTINGS

MASKING ● GREEN ○ BLUE ○ RED

OCR ○ GREEN ● BLUE ○ RED ⎫ 151

TRIMMING ○ GREEN ○ BLUE ● RED ⎭

| DEFAULT PARAMETER SETTINGS

FORM NAME [ ]

EXTENSION WIDTH OF AREA (mm)* [ 0 ⌄ ]

```
                                                                    ⟋ 53
┌─────────────────────────────────────────────────────────────────────┐
│                                                                       │
│  [                                                                    │
│                                                                       │
│    "flowId" : "flow001",              ⎤1201A                          │
│                                       ⎦                               │
│    "flowName" : "expense claim form", ⎤1202A          ⟋1203A          │
│   ┌─ ─ ─ ─ ─ ─ ─ ─ ─ ─ ─ ─ ─ ─ ─ ─ ─ ─ ─ ─ ─ ─ ─ ─ ─ ─ ─ ─ ─┐       │
│   │ "flowDetails" : [                                         │       │
│   │                                              ⎤            │       │
│   │       {                                      │            │       │
│   │                                              │            │       │
│   │           "component" : "ExService_B",       │            │       │
│   │                                              │            │       │
│   │           "parameters" :[                    ⎬1223A        │       │
│   │                                              │            │       │
│   │               "AppId" : "2575"               │            │       │
│   │                                              │            │       │
│   │           "Folder" : "/expense claim form storage site/"⎦ │       │
│   │                                                           │       │
│   │           }                                               │       │
│   │                                                           │       │
│   │       }                                                   │       │
│   │                                                           │       │
│   │ ]                                                         │       │
│   └─ ─ ─ ─ ─ ─ ─ ─ ─ ─ ─ ─ ─ ─ ─ ─ ─ ─ ─ ─ ─ ─ ─ ─ ─ ─ ─ ─ ─┘       │
│  }                                                                    │
│                                                                       │
└─────────────────────────────────────────────────────────────────────┘
```

(a)                 (b)

FIG. 16A
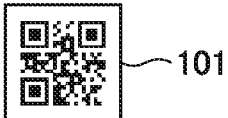101
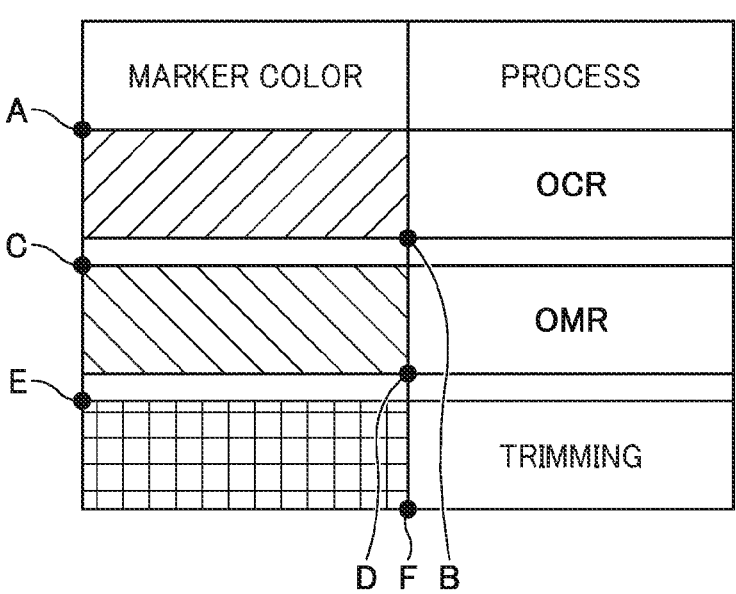
FIG. 16B
| PROCESS | POSITION INFORMATION |
|---------|---------------------|
| OCR | $(X_A, Y_A)$ $(X_B, Y_B)$ |
| OMR | $(X_C, Y_C)$ $(X_D, Y_D)$ |
| TRIMMING | $(X_E, Y_E)$ $(X_F, Y_F)$ |

Expense Claim Form

| Department | |
| Employee Number | |
| Name | |
| Preliminary Application | No |
| Application Date | |

| Date | Description | Payee | Amount |
|------|-------------|-------|--------|
| | | | |
| | | | |
| | | | |
| | | | |
| | | | |
| | | | |
| | Total Amount | | |

Remarks

FIG. 19B

| Department | |
| Employee Number | |
| Name | |
| Preliminary Application | No |
| Application Date | |

| Date | Description | Payee | Amount |
|------|-------------|-------|--------|
| | | | |
| | | | |
| | | | |
| | | | |
| | | | |
| | | | |
| | Total Amount | | |

Remarks

| MARKER COLOR | PROCESS | CSV COLUMN NAME | CSV COLUMN POSITION | CSV START ROW |
|---|---|---|---|---|
|  | OCR-CSV OUTPUT | DOCUMENT NAME | 2 | 2 |
|  | OCR-CSV OUTPUT | APPLICA-TION DATE | 3 | 2 |
|  | OCR-CSV OUTPUT | AMOUNT | 4 | 2 |

APPLY COLORS TO PREDETER-MINED PORTIONS (b)

| MARKER COLOR | PROCESS | CSV COLUMN NAME | CSV COLUMN POSITION | CSV START ROW |
|---|---|---|---|---|
|  | OCR-CSV OUTPUT | DOCUMENT NAME | 2 | 2 |
|  | OCR-CSV OUTPUT | APPLICA-TION DATE | 3 | 2 |
|  | OCR-CSV OUTPUT | AMOUNT | 4 | 2 |

(c)

| MARKER COLOR (NUMERICAL VALUE) | PROCESS | CSV COLUMN NAME | CSV COLUMN POSITION | CSV START ROW | START POINT X COOR-DINATE | START POINT Y COOR-DINATE | END POINT X COOR-DINATE | END POINT Y COOR-DINATE |
|---|---|---|---|---|---|---|---|---|
| NUMERICAL VALUE IDENTIFY-ING MARKER COLOR (GREEN) | OCR-CSV OUTPUT | DOCUMENT NAME | 2 | 2 | 47 | 171 | 87 | 151 |
| NUMERICAL VALUE IDENTIFY-ING MARKER COLOR (BLUE) | OCR-CSV OUTPUT | APPLICA-TION DATE | 3 | 2 | 87 | 130 | 127 | 110 |
| NUMERICAL VALUE IDENTIFY-ING MARKER COLOR (RED) | OCR-CSV OUTPUT | AMOUNT | 4 | 2 | 95 | 30 | 115 | 10 |

154    155

SCAN

FIG. 21A

Expense Claim Form ~140

| Department | |
|---|---|
| Employee Number | |
| Name | |
| Preliminary Application | No ~141 |

Application Date | |

| Date | Description | Payee | Amount |
|---|---|---|---|
| | | | |
| | | | |
| | | | |
| | | | |
| | | | |
| | | | |
| Total Amount | | | |

Remarks ~142

| Department | |
|---|---|
| Employee Number | |
| Name | |
| Preliminary Application | ~141 |

Application Date | |

| Date | Description | Payee | Amount |
|---|---|---|---|
| | | | |
| | | | |
| | | | |
| | | | |
| | | | |
| | | | |
| Total Amount | | | |

Remarks ~142

FIG. 21C

Expense Claim Form ~140

| Department | Sales Department A |
|---|---|
| Employee Number | 50412 |
| Name | Ricoh Taro |
| Preliminary Application | Yes ~141 |

Application Date | 2020/10/10

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| Total Amount | | | 23,670 |

Remarks ~142
I apologize for late application.

FIG. 22A

Expense Claim Form

| Department | Sales Department A |
| --- | --- |
| Employee Number | 50412 |
| Name | Ricoh Tar... |
| Preliminary Application | Yes |

Application Date: 2020/10/10

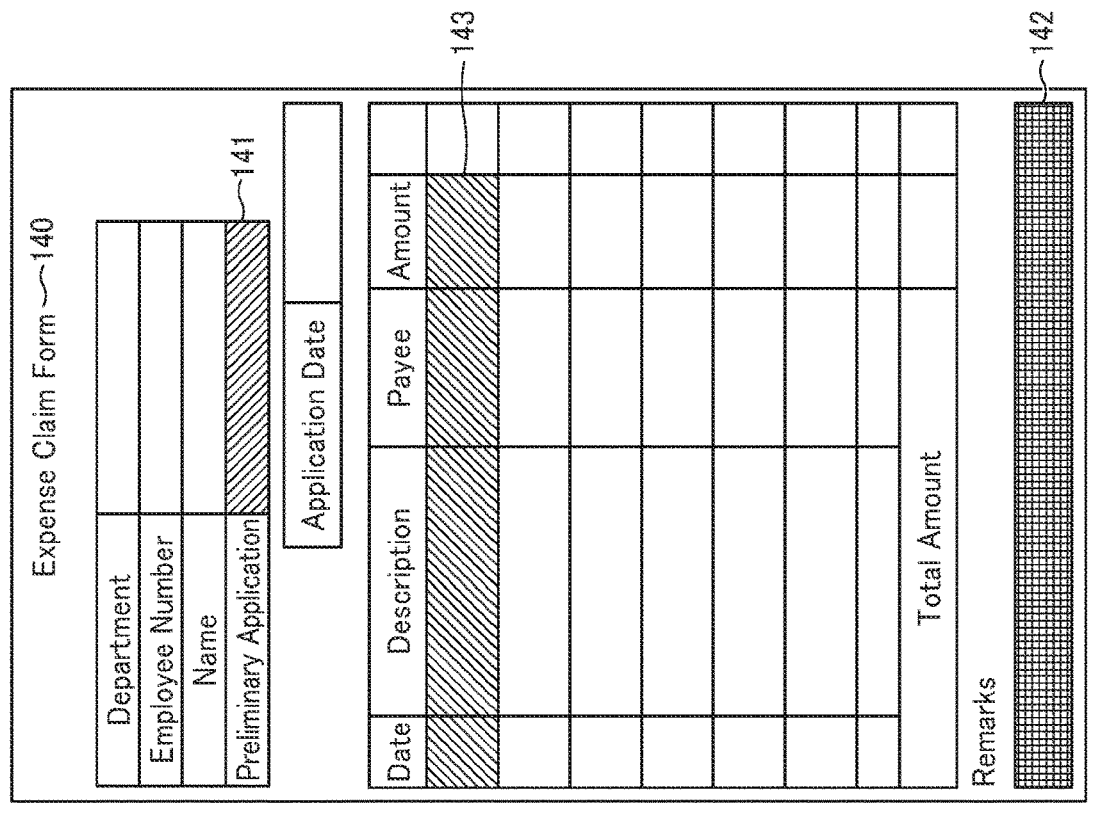

| Date | Description | Payee | Amount | Remarks |
| --- | --- | --- | --- | --- |
| 9/3 | Meeting with A Industrial Co. | Railroad | 840 | |
| 9/17 | Lodging for trip to Osaka | Hotel | 5,700 | |
| 9/18 | Lodging for trip to Osaka | Hotel | 5,700 | |
| 9/24 | Invitation of B Corporation to event | Taxi | 1,550 | |
| 9/27 | Purchase of repair parts | Nishi-Tokyo Branch | 8,900 | |
| 9/30 | Purchase of camera SD card | Tokyo Head Office | 980 | |
| | Total Amount | | 23,670 | |

Remarks: I apologize for late application.

Expense Claim Form —140

| Department | |
| --- | --- |
| Employee Number | |
| Name | |
| Preliminary Application | |

Application Date

| Date | Description | Payee | Amount |
| --- | --- | --- | --- |
| | | | |
| | | | |
| | | | |
| | | | |
| | | | |
| | | | |
| | Total Amount | | |

Remarks

FIG. 24

FIG. 26A
601
| Application Date | 2020/01/01 |
| --- | --- |
FIG. 26B
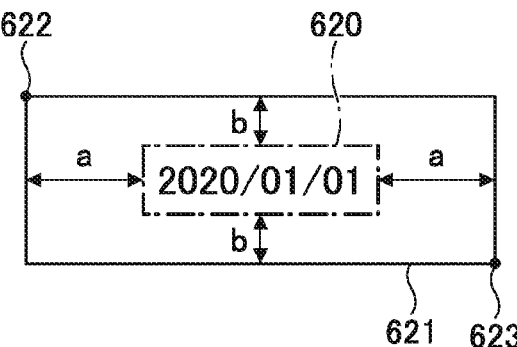
FIG. 26C
601 625
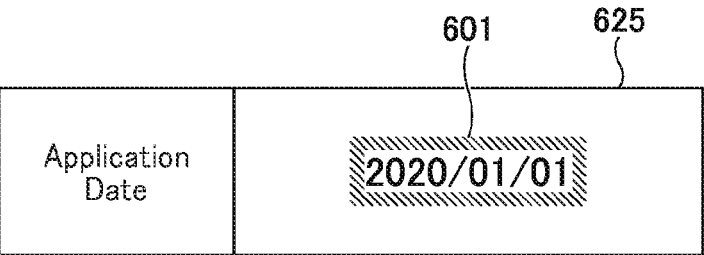
| Application Date | 2020/01/01 |
| --- | --- |

FIG. 28

| A | B | C | D | E | F | G | H | I | J | K | L | M |
|---|---|---|---|---|---|---|---|---|---|---|---|---|
| ID | MARKER COLOR | PROCESS | START POINT X COORDINATE | START POINT Y COORDINATE | END POINT X COORDINATE | END POINT Y COORDINATE | FORMAT | CSV COLUMN NAME | CSV POSITION (COLUMN) | CSV POSITION (START ROW) | OCR LANGUAGE | ORDER OF USE FOR FILE NAME |
| 1 | H = 61 to 180° (GREEN) | OCR | 47 | 171 | 87 | 151 | TEXT | DOCUMENT NAME | | | Japanese | 1 |
| 2 | H = 181 to 300° (BLUE) | OMR | 30 | 130 | 60 | 70 | Y/N | PRELIMINARY APPLICATION | 3 | 2 | | |
| 3 | H = 0 to 60°, 301 to 360° (RED) | TRIMMING | 5 | 30 | 150 | 5 | IMAGE | REMARKS | 4 | 2 | | |

Expense Claim Form

| Department | Sales Department A |
|---|---|
| Employee Number | 50412 |
| Name | Ricoh Taro |
| Preliminary Application | Yes |

| Application Date | 2020/10/10 |
|---|---|

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| | Total Amount | | 23,670 |

Remarks: apologize for late application

Figure 31:
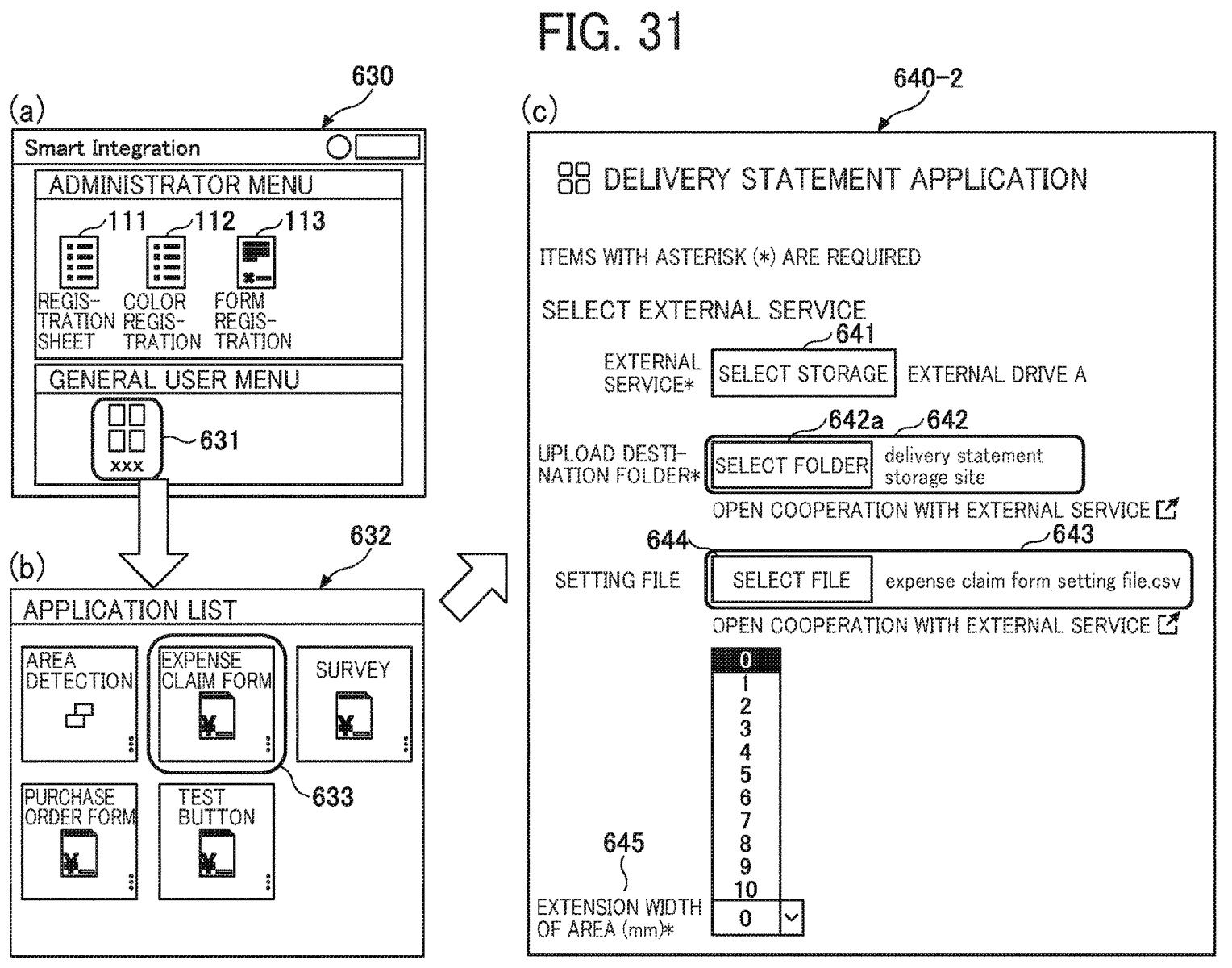

Smart Integration

ADMINISTRATOR MENU

111 — REGIS-TRATION SHEET
112 — COLOR REGIS-TRATION
113 — FORM REGIS-TRATION

GENERAL USER MENU

631 — xxx

630

(b)

APPLICATION LIST

632

AREA DETECTION

EXPENSE CLAIM FORM    633    SURVEY

PURCHASE ORDER FORM    TEST BUTTON

(c)

640-2

DELIVERY STATEMENT APPLICATION

ITEMS WITH ASTERISK (*) ARE REQUIRED

SELECT EXTERNAL SERVICE    641

EXTERNAL SERVICE*    | SELECT STORAGE |    EXTERNAL DRIVE A 642    642a

UPLOAD DESTI-NATION FOLDER*    | SELECT FOLDER |    delivery statement storage site

OPEN COOPERATION WITH EXTERNAL SERVICE    643

644    SETTING FILE    | SELECT FILE |    expense claim form_setting file.csv

OPEN COOPERATION WITH EXTERNAL SERVICE

645    EXTENSION WIDTH OF AREA (mm)*

```
{
    "alphabetToNumeric": {
        "I": "1",
        "B": "8",
        "I": "1",
        "Z": "2"
    },
    "numericToAlphabet": {
        "1": "I",
        "2": "Z",
        "8": "B"
    }
}
```

EXPENSE CLAIM FORM APPLICATION~692

FOLLOWING FILES ARE OUTPUT.

FILE NAME
1. expense claim forms.csv
2. expense claim forms.pdf
693

694

| PRELIMINARY APPLICATION | REMARKS |
|---|---|
| APPLIED | I APOLOGIZE FOR LATE APPLICATION. |

FIG. 41

WHEN FORMS TO BE REGISTERED ARE COLLECTIVELY SCANNED (a)

| Expense Claim Form | |
|---|---|
| Department | Sales Department A |
| Employee Number | 50412 |
| Name | Ricoh Taro |
| Preliminary Application | Yes |

| | Application Date | 2020/10/10 |
|---|---|---|

| Date | Description | Payee | Amount | |
|---|---|---|---|---|
| 9/3 | Meeting with A Industrial Co. | Railroad | 840 | |
| 9/17 | Lodging for trip to Osaka | Hotel | 5,700 | |
| 9/18 | Lodging for trip to Osaka | Hotel | 5,700 | |
| 9/24 | Invitation of B Corporation to event | Taxi | 1,550 | |
| 9/27 | Purchase of repair parts | Nishi-Tokyo Branch | 8,900 | |
| 9/30 | Purchase of camera SD card | Tokyo Head Office | 980 | |
| | | | | |
| | Total Amount | | 23,670 | |

Remarks

I apologize for late application.

| Expense Claim Form | |
|---|---|
| Department | Sales Department A |
| Employee Number | 50412 |
| Name | Ricoh Taro |
| Preliminary Application | No |

| | Application Date | 2020/10/10 |
|---|---|---|

| Date | Description | Payee | Amount | |
|---|---|---|---|---|
| 9/3 | Meeting with A Industrial Co. | Railroad | 840 | |
| 9/17 | Lodging for trip to Osaka | Hotel | 5,700 | |
| 9/18 | Lodging for trip to Osaka | Hotel | 5,700 | |
| 9/24 | Invitation of B Corporation to event | Taxi | 1,550 | |
| 9/27 | Purchase of repair parts | Nishi-Tokyo Branch | 8,900 | |
| 9/30 | Purchase of camera SD card | Tokyo Head Office | 980 | |
| | | | | |
| | Total Amount | | 23,670 | |

Remarks

I have no specific comments.

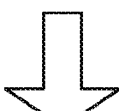

(b)

| | A | B | |
|---|---|---|---|
| 1 | PRELIMINARY APPLICATION | REMARKS | |
| 2 | APPLIED | I APOLOGIZE FOR LATE APPLICATION. | OCR RESULT OF FIRST FORM |
| 3 | NOT APPLIED | I have no specific comments. | OCR RESULT OF SECOND FORM |
| 4 | ⋮ | ⋮ | |

(1) ENABLE COOPERATION BETWEEN APPLICATION AND COOPERATION APPLICATION (3) REGISTER MARK AND PROCESS IN SETTING FILE

10

20

(2) USER GIVES MARK TO PROCESS AND PERFORM SCANNING

| MARKER COLOR | PROCESS |
|---|---|
|  | OCR OF KANJI CHARACTERS |
|  | OCR OF DATES |
|  | OCR OF ALPHANU-MERIC CHARACTERS |

FIG. 43A (4) IMAGE DATA
OF FORM WITH
AREA DESIGNAT-
ED WITH MARKER (5) DETECT COLOR IN SET-
TING FILE AND REGISTER
AREA INFORMATION IN
SETTING FILE (6)-1 COM-
PLEMENT
SETTING FILE (6)-2 ASSOCIATE APPLI-
CATION WITH SETTING FILE

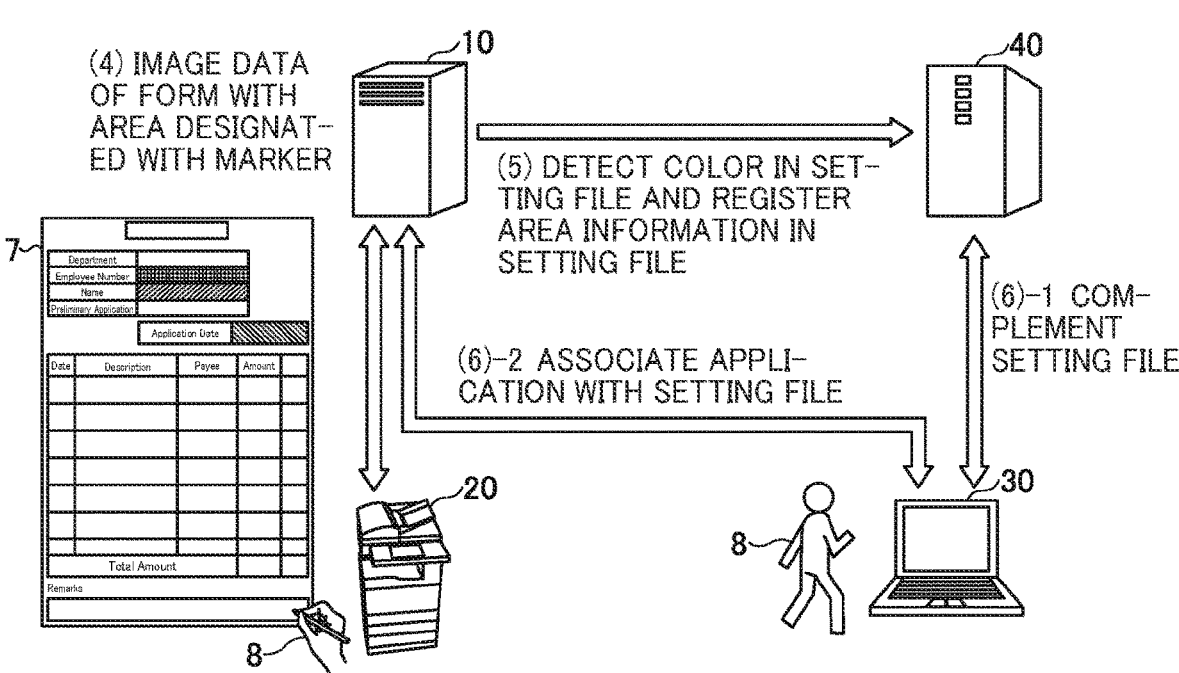

FIG. 43B (8) EXTRACT DATA
FROM AREA USING
AREA INFORMATION IN
SETTING FILE IDENTI-
FIED BY APPLICATION
ID (9) PROCESS AREA
AND REGISTER
DATA IN FILE

(10) STORE IMAGE
DATA AND FILE

(11) REGISTER
IMAGE DATA
AND FILE IN
FOLDER (7) APPLICATION ID
OF APPLICATION
AND PDF FILE

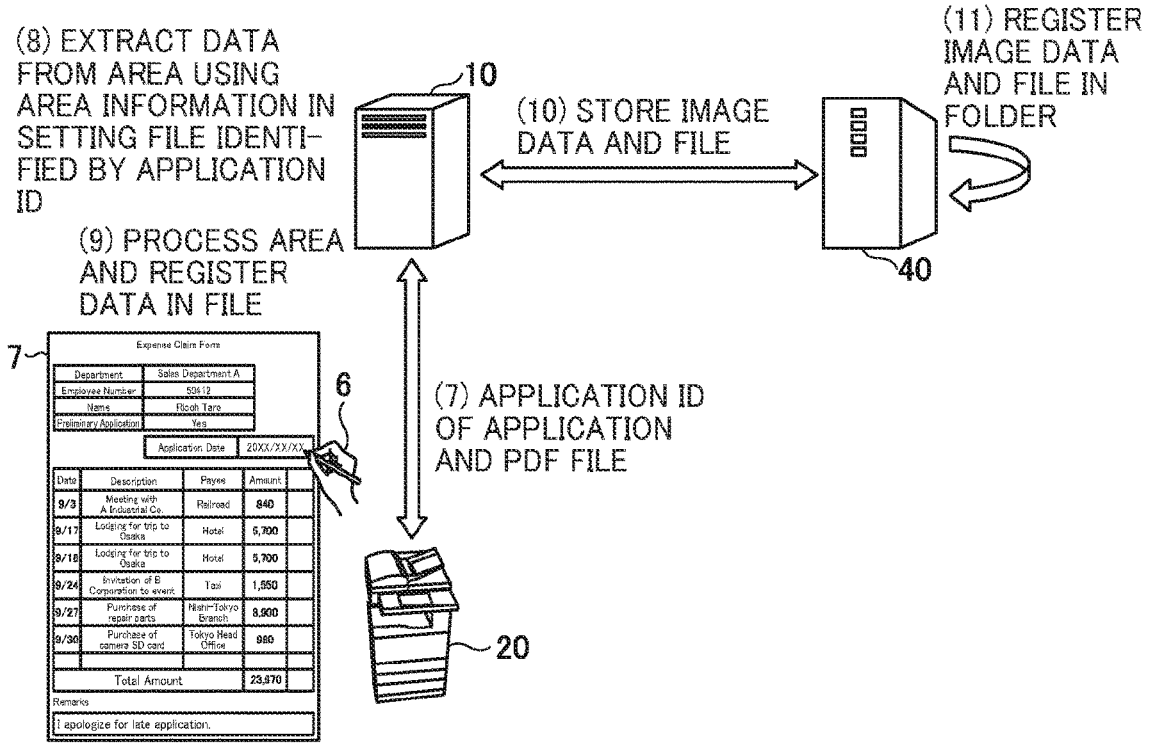

Figure 44:
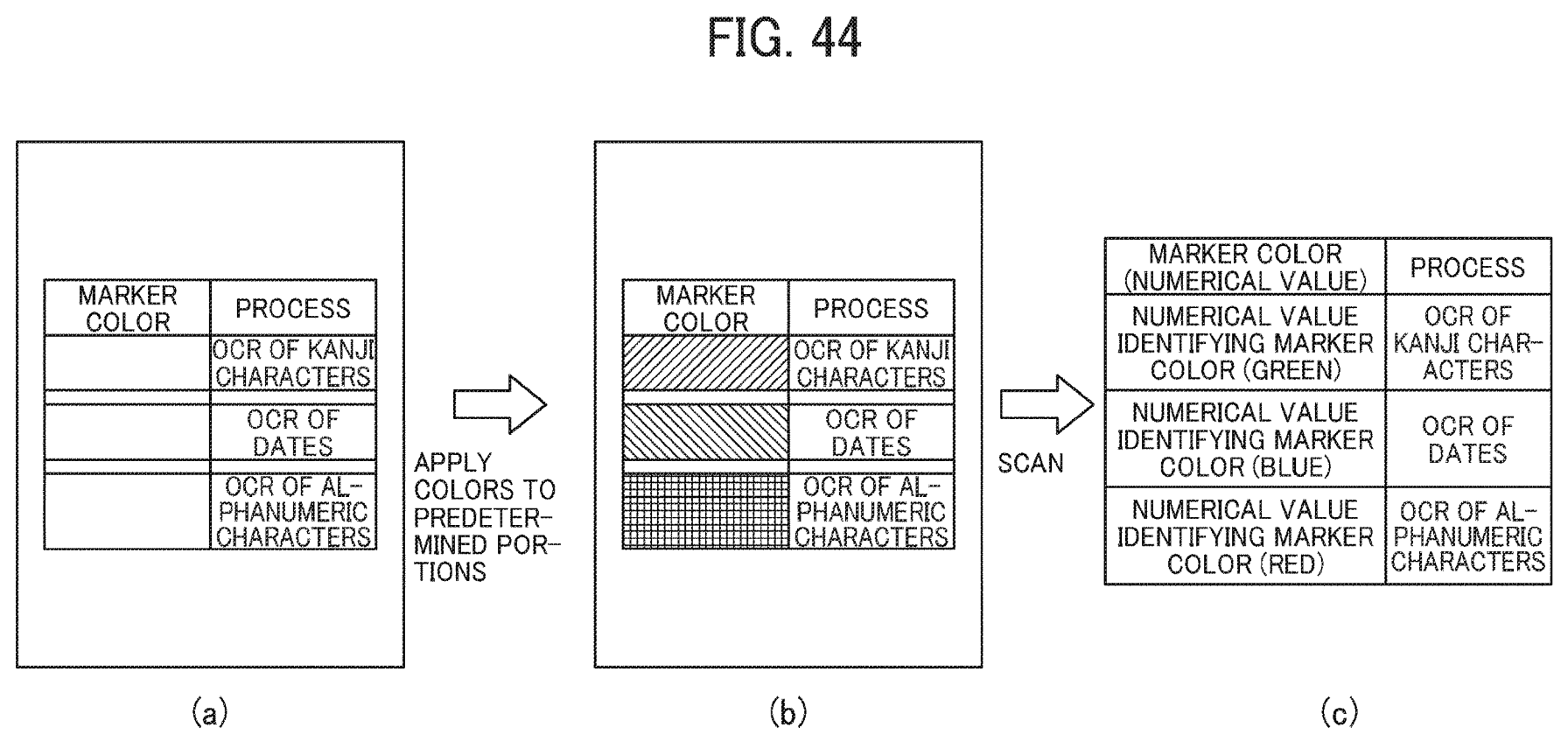

| MARKER COLOR | PROCESS |
|---|---|
| | OCR OF KANJI CHARACTERS |
| | OCR OF DATES |
| | OCR OF AL-PHANUMERIC CHARACTERS |

↑ APPLY COLORS TO PREDETER-MINED POR-TIONS (b)

| MARKER COLOR | PROCESS |
|---|---|
| (green hatch) | OCR OF KANJI CHARACTERS |
| (blue hatch) | OCR OF DATES |
| (red grid) | OCR OF AL-PHANUMERIC CHARACTERS |

↑ SCAN (c)

| MARKER COLOR (NUMERICAL VALUE) | PROCESS |
|---|---|
| NUMERICAL VALUE IDENTIFYING MARKER COLOR (GREEN) | OCR OF KANJI CHAR-ACTERS |
| NUMERICAL VALUE IDENTIFYING MARKER COLOR (BLUE) | OCR OF DATES |
| NUMERICAL VALUE IDENTIFYING MARKER COLOR (RED) | OCR OF AL-PHANUMERIC CHARACTERS |

Figure 46:
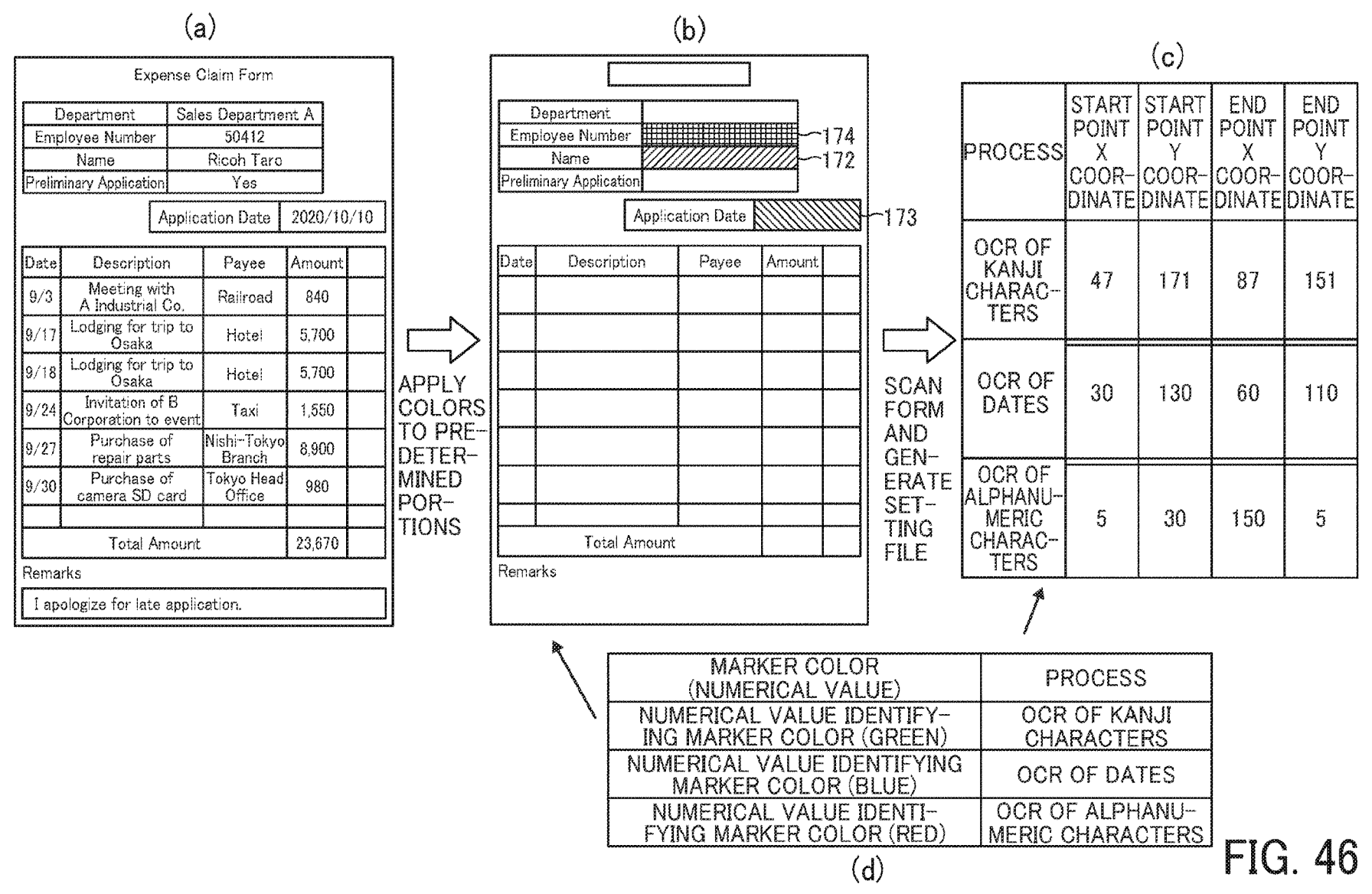

Expense Claim Form

| Department | Sales Department A |
| Employee Number | 50412 |
| Name | Ricoh Taro |
| Preliminary Application | Yes |

| Application Date | 2020/10/10 |

| Date | Description | Payee | Amount |
|---|---|---|---|
| 9/3 | Meeting with A industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| | Total Amount | | 23,670 |

Remarks
I apologize for late application.

APPLY COLORS TO PRE-DETER-MINED POR-TIONS (b)

| Department | |
| Employee Number | |
| Name | |
| Preliminary Application | |

| Application Date | |

| Date | Description | Payee | Amount |
|---|---|---|---|
| | | | |
| | | | |
| | | | |
| | | | |
| | | | |
| | | | |
| | Total Amount | | |

Remarks 174
172
173

SCAN FORM AND GEN-ERATE SET-TING FILE (c)

| PROCESS | START POINT X COOR-DINATE | START POINT Y COOR-DINATE | END POINT X COOR-DINATE | END POINT Y COOR-DINATE |
|---|---|---|---|---|
| OCR OF KANJI CHARAC-TERS | 47 | 171 | 87 | 151 |
| OCR OF DATES | 30 | 130 | 60 | 110 |
| OCR OF ALPHANU-MERIC CHARAC-TERS | 5 | 30 | 150 | 5 |

(d)

| MARKER COLOR (NUMERICAL VALUE) | PROCESS |
|---|---|
| NUMERICAL VALUE IDENTIFY-ING MARKER COLOR (GREEN) | OCR OF KANJI CHARACTERS |
| NUMERICAL VALUE IDENTIFYING MARKER COLOR (BLUE) | OCR OF DATES |
| NUMERICAL VALUE IDENTI-FYING MARKER COLOR (RED) | OCR OF ALPHANU-MERIC CHARACTERS |

FIG. 47

OCR FILE NAME "expense claim form.PDF"

OCR IN CORRESPONDING FORMATS

FORM

Expense Claim Form ——140

| Department | Sales Department A |
|---|---|
| Employee Number | 50412 |
| Name | Ricoh Taro |
| Preliminary Application | Yes |

| Application Date | 2020/10/10 |
|---|---|

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| Total Amount | | | 23,670 |

Remarks

I apologize for late application.

SCAN

FORM

Expense Claim Form

| Department | Sales Department A |
|---|---|
| Employee Number | 50412 | 174 |
| Name | Ricoh Taro | 172 |
| Preliminary Application | Yes | 173 |

| Application Date | 2020/10/10 |
|---|---|

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| Total Amount | | | 23,670 |

Remarks

I apologize for late application.

| MARKER COLOR | PROCESS |
|---|---|
| | OCR OF KANJI CHARACTERS |
| | OCR OF DATES |
| | OCR OF ALPHANU-MERIC CHARACTERS |

130

(b)

| MARKER COLOR | PROCESS |
|---|---|
| GREEN | OCR OF KANJI CHARACTERS |
| BLUE | OCR OF DATES |
| RED | OCR OF ALPHANU-MERIC CHARACTERS |

130

FIG. 51A
101
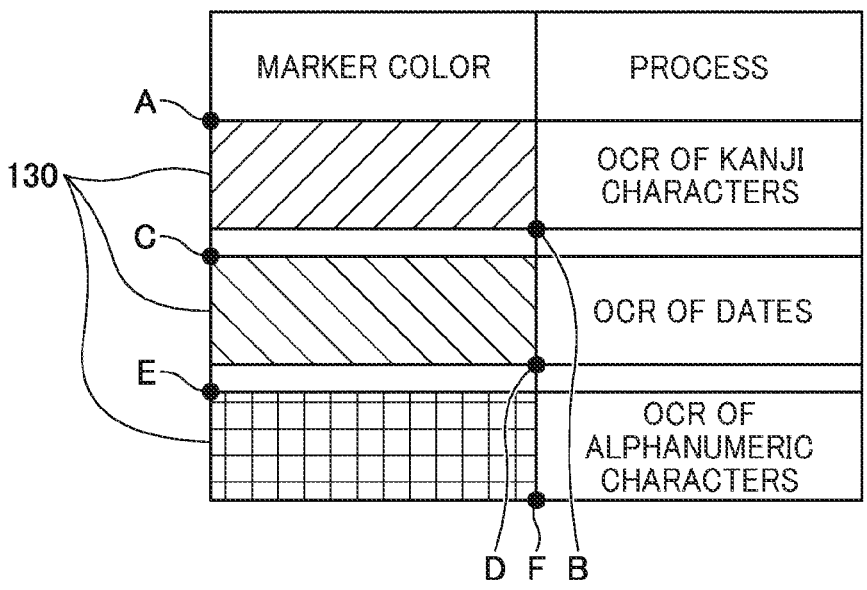
| MARKER COLOR | PROCESS |
|---|---|
| A ... | OCR OF KANJI CHARACTERS |
| C ... | OCR OF DATES |
| E ... | OCR OF ALPHANUMERIC CHARACTERS |
130
D F B
FIG. 51B
| PROCESS | POSITION INFORMATION |
|---|---|
| OCR OF KANJI CHARACTERS | $(X_A,Y_A)$ $(X_B,Y_B)$ |
| OCR OF DATES | $(X_C,Y_C)$ $(X_D,Y_D)$ |
| OCR OF ALPHANU-MERIC CHARACTERS | $(X_E,Y_E)$ $(X_F,Y_F)$ |

Figure 52:
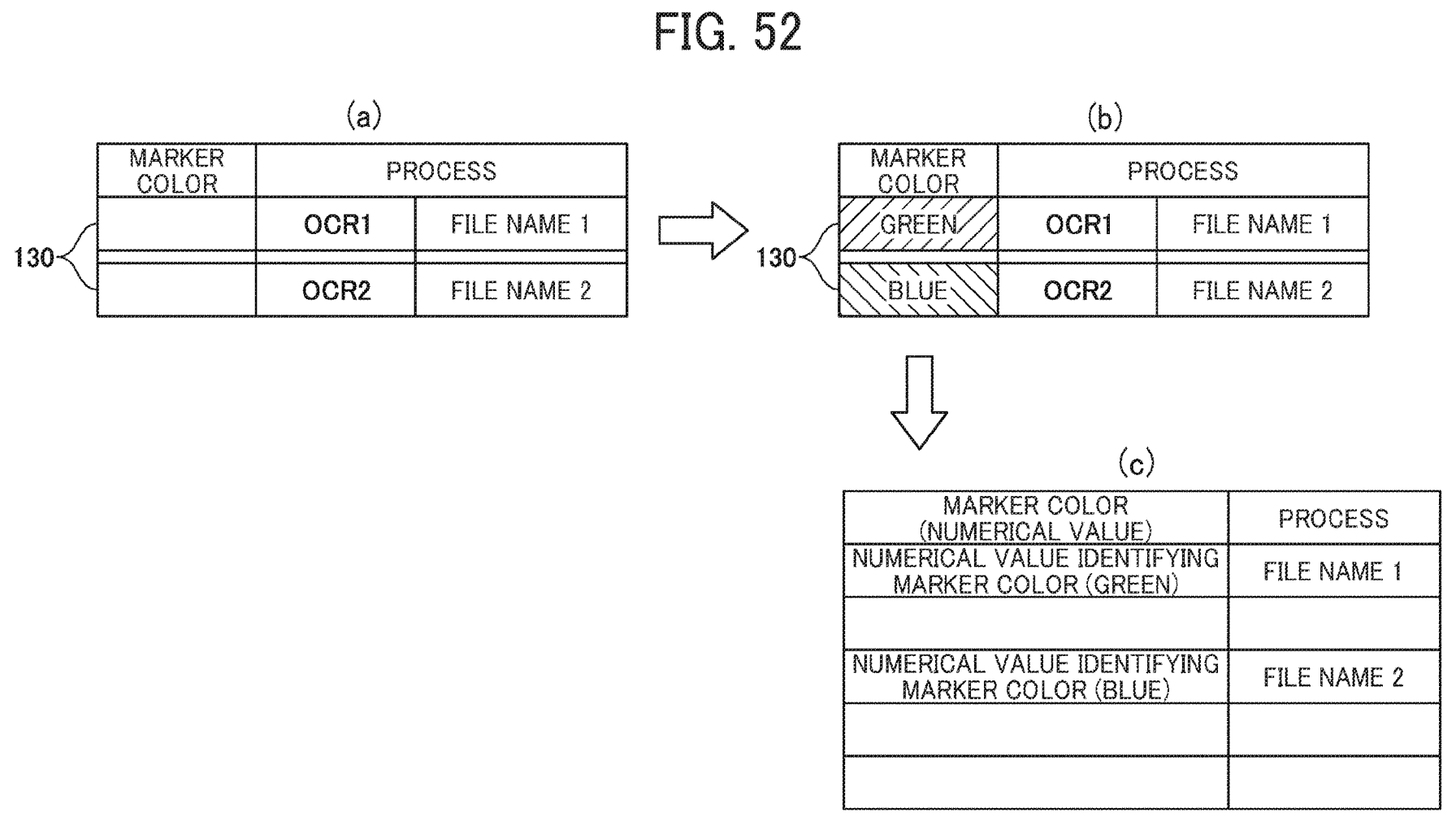

| MARKER COLOR | PROCESS | |
|---|---|---|
| | OCR1 | FILE NAME 1 |
| | OCR2 | FILE NAME 2 |

130

(b)

| MARKER COLOR | PROCESS | |
|---|---|---|
| GREEN | OCR1 | FILE NAME 1 |
| BLUE | OCR2 | FILE NAME 2 |

130

(c)

| MARKER COLOR (NUMERICAL VALUE) | PROCESS | |
|---|---|---|
| NUMERICAL VALUE IDENTIFYING MARKER COLOR (GREEN) | FILE NAME 1 | |
| NUMERICAL VALUE IDENTIFYING MARKER COLOR (BLUE) | FILE NAME 2 | |
| | | |

FIG. 54A

Expense Claim Form

| Department | |
| Employee Number | |
| Name | |
| Preliminary Application | No |

| Application Date | |

| Date | Description | Payee | Amount |
|---|---|---|---|
| | | | |
| | | | |
| | | | |
| | | | |
| | | | |
| | | | |
| | Total Amount | | |

Remarks

FIG. 54B

Expense Claim Form

| Department | |
| Employee Number | |
| Name | 172 |
| Preliminary Application | No | 173 |

| Application Date | |

| Date | Description | Payee | Amount |
|---|---|---|---|
| | | | |
| | | | |
| | | | |
| | | | |
| | | | |
| | | | |
| | Total Amount | | |

Remarks

| MARKER COLOR | PROCESS | CSV COLUMN NAME | CSV COLUMN POSITION | CSV START ROW |
|---|---|---|---|---|
| | OCR-CSV OUTPUT | NAME | 2 | 2 |
| | OCR-CSV OUTPUT | APPLICA-TION DATE | 3 | 2 |
| | OCR-CSV OUTPUT | EMPLOYEE NUMBER | 4 | 2 |

APPLY COLORS TO PREDETER-MINED PORTIONS (b)

| MARKER COLOR | PROCESS | CSV COLUMN NAME | CSV COLUMN POSITION | CSV START ROW |
|---|---|---|---|---|
| | OCR-CSV OUTPUT | NAME | 2 | 2 |
| | OCR-CSV OUTPUT | APPLICA-TION DATE | 3 | 2 |
| | OCR-CSV OUTPUT | EMPLOYEE NUMBER | 4 | 2 |

(c)

154    155

| MARKER COLOR (NUMERICAL VALUE) | PROCESS | CSV COLUMN NAME | CSV COLUMN POSITION | CSV START ROW | START POINT X COOR-DINATE | START POINT Y COOR-DINATE | END POINT X COOR-DINATE | END POINT Y COOR-DINATE |
|---|---|---|---|---|---|---|---|---|
| NUMERICAL VALUE IDENTIFY-ING MARKER COLOR (GREEN) | OCR-CSV OUTPUT | NAME | 2 | 2 | 47 | 171 | 87 | 151 |
| NUMERICAL VALUE IDENTIFY-ING MARKER COLOR (BLUE) | OCR-CSV OUTPUT | APPLICA-TION DATE | 3 | 2 | 87 | 130 | 127 | 110 |
| NUMERICAL VALUE IDENTIFY-ING MARKER COLOR (RED) | OCR-CSV OUTPUT | EMPLOYEE NUMBER | 4 | 2 | 95 | 30 | 115 | 10 |

SCAN

FIG. 56A

Expense Claim Form —140

| Department | | |
|---|---|---|
| Employee Number | | |
| Name | | |
| Preliminary Application | No | —141 |

| Application Date | |
|---|---|

—173

| Date | Description | Payee | Amount |
|---|---|---|---|
| | | | |
| | | | |
| | | | |
| | | | |
| | | | |
| | | | |
| | | | |
| | Total Amount | | |

Remarks
—142

FIG. 56B

| Department | | |
|---|---|---|
| Employee Number | | —174 |
| Name | | —172 |
| Preliminary Application | | |

| Application Date | |
|---|---|

—173

| Date | Description | Payee | Amount |
|---|---|---|---|
| | | | |
| | | | |
| | | | |
| | | | |
| | | | |
| | | | |
| | | | |
| | Total Amount | | |

Remarks

FIG. 56C

Expense Claim Form —140

| Department | Sales Department A | |
|---|---|---|
| Employee Number | 50412 | —174 |
| Name | Ricoh Taro | —172 |
| Preliminary Application | Yes | —173 |

| Application Date | 2020/10/10 |
|---|---|

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| | Total Amount | | 23,670 |

Remarks

I apologize for late application.

FIG. 58

| A | B | C | D | E | F | G | H | I | J | K | L | M |
|---|---|---|---|---|---|---|---|---|---|---|---|---|
| ID | MARKER COLOR | PROCESS | START POINT X COORDINATE | START POINT Y COORDINATE | END POINT X COORDINATE | END POINT Y COORDINATE | FORMAT | CSV COLUMN NAME | CSV POSITION (COLUMN) | CSV POSITION (START ROW) | OCR LANGUAGE | ORDER OF USE FOR FILE NAME |
| 1 | H = 61 to 180° (GREEN) | OCR1 | 47 | 171 | 87 | 151 | TEXT | Name | | | KANJI | 1 |
| 2 | H = 181 to 300° (BLUE) | OCR2 | 30 | 130 | 60 | 70 | TEXT | Application Date | 3 | 2 | DATE | |
| 3 | H = 0 to 60°, 301 to 360° (RED) | OCR3 | 5 | 30 | 150 | 5 | TEXT | Employee Number | 4 | 2 | ALPHANU-MERIC | |

Expense Claim Form

| Department | Sales Department A |
|---|---|
| Employee Number | 5041 |
| Name | Ricoh Taro |
| Preliminary Application | Yes |

Application Date   2020/10/10

| Date | Description | Payee | Amount |
|---|---|---|---|
| 9/3 | Meeting with A Industrial Co. | Railroad | 840 |
| 9/17 | Lodging for trip to Osaka | Hotel | 5,700 |
| 9/18 | Lodging for trip to Osaka | Hotel | 5,700 |
| 9/24 | Invitation of B Corporation to event | Taxi | 1,550 |
| 9/27 | Purchase of repair parts | Nishi-Tokyo Branch | 8,900 |
| 9/30 | Purchase of camera SD card | Tokyo Head Office | 980 |
| | Total Amount | | 23,670 |

Remarks

I apologize for late application.

1

INFORMATION PROCESSING SYSTEM, PROCESSING METHOD, AND RECORDING MEDIUM

CROSS-REFERENCE TO RELATED APPLICATIONS

This application is based on PCT filing PCT/IB2022/051819, filed on Mar. 2, 2022, which claims priority to Japanese Patent Application Nos. 2021-040561, filed on Mar. 12, 2021, and 2021-090252, filed on May 28, 2021, the entire disclosure of each is hereby incorporated by reference herein.

TECHNICAL FIELD

The present disclosure relates to an information processing system, a processing method, and a recording medium.

BACKGROUND ART

Processing of forms such as expense claim forms, invoices, bills, or purchase order forms is common in daily work of an organization such as a company or a group. A person in charge in the organization performs the task of extracting handling dates, case numbers, amounts of money, or the like from forms or tabulating handling dates, case numbers, amounts of money, or the like in forms on a daily basis.

A technique for digitizing such a form has been devised (see, for example, PTL1). PTL1 discloses a technique for detecting a highlighted area including an area filled with a chromatic color in a read image of an original document and a circled area including an area circled by the chromatic color, and classifying the highlighted area as an area for a first process and the circled area as an area for a second process.

CITATION LIST

Patent Literature

PTL 1

Japanese Unexamined Patent Application Publication 2019-096178-A

SUMMARY OF INVENTION

Technical Problem

In the related art, however, it is difficult for a user to associate marks with processes. For example, if the user fails to register the correspondence between marks and processes on a predetermined sheet by marking the sheet with a marker pen or the like, the person in charge performs the task of setting the correspondence between the marks and the processes in a file or the like.

Solution to Problem

According to an aspect of the present disclosure, an information processing system communicably connectable to one or more apparatuses and configured to execute a plurality of processes includes a data storing unit that stores setting information in which identification information identifying content of a particular process among the plurality of processes and the particular process are associated with each other, in response to a user's operation on a first apparatus; an area identifying unit that identifies an area including the identification information from image data received from a second apparatus; and a processing unit that executes the particular process, based on the identified area and the setting information.

Advantageous Effects of Invention

It is possible to provide an information processing system that allows a user to associate identification information to be added to a predetermined sheet with processes.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 2A is a view illustrating setting of area information in a form according to the first embodiment.

FIG. 2B is a view illustrating acquisition of data from the form using the area information according to the first embodiment.

FIG. 3 is a view illustrating registration (task 1) of a correspondence between a color and a process using a registration sheet according to the first embodiment.

FIG. 4 is a view illustrating an example of a management site according to the first embodiment.

FIG. 7 is a diagram illustrating an example system configuration of the data output system according to the first embodiment.

FIG. 8 is a diagram illustrating an example hardware configuration of an information processing system and a terminal apparatus according to the first embodiment.

FIG. 11 is a view illustrating an example of application processing information stored in an application processing information storage unit according to the first embodiment.

FIG. 16A is a view schematically illustrating detection of color information according to the first embodiment.

FIG. 16B is a view schematically illustrating detection of color information according to the first embodiment.

FIG. 19A is a view illustrating an example of a form in which the administrator designates two areas using marker pens according to the first embodiment.

FIG. 19B is a view illustrating an example of a form in which the administrator designates two areas using marker pens according to the first embodiment.

FIG. 20 is a view illustrating a modification of a registration sheet according to the first embodiment.

FIG. 21A is view illustrating a method for marking areas in a form according to the first embodiment.

FIG. 21B is view illustrating the method for marking areas in a form according to the first embodiment.

FIG. 21C is view illustrating the method for marking areas in a form according to the first embodiment.

FIG. 22A is view illustrating another example method for marking areas in a form according to the first embodiment.

FIG. 22B is view illustrating the other example method for marking areas in a form according to the first embodiment.

FIG. 24 is a view illustrating an example of an area registration screen displayed on the device upon registration of area information according to the first embodiment.

FIG. 26A is an example view illustrating detection of an area from image data according to the first embodiment.

FIG. 26B is an example view illustrating detection of an area from image data according to the first embodiment.

FIG. 26C is an example view illustrating detection of an area from image data according to the first embodiment.

FIG. 28 is an example view illustrating a correspondence between a setting file and a form according to the first embodiment.

FIG. 31 is a view illustrating a modification of an association screen according to the first embodiment.

FIG. 38 is an example view illustrating correction of OCR processing results according to the first embodiment.

FIG. 40 is a view illustrating an example of an output data display screen displayed on the device according to the first embodiment.

FIG. 41 is an example view illustrating a plurality of forms and an output file according to the first embodiment.

FIG. 42 is a view illustrating processes or operation for associating a mark with a process in a data output system according to a second embodiment.

FIG. 43A is a view illustrating processes or operation for creating a file from acquired data obtained by the data output system from a form according to the second embodiment.

FIG. 43B is a view illustrating processes or operation for creating a file from acquired data obtained by the data output system from the form according to the second embodiment.

FIG. 44 is a view illustrating registration (task 1) of a correspondence between a color and a process using a registration sheet according to the second embodiment.

FIG. 46 is a view illustrating a correspondence (task 2) between area information and a process using the original of a form according to the second embodiment.

FIG. 47 is a view illustrating a correspondence (task 3) between area information and a process using the original of a form according to the second embodiment.

FIG. 50 is a view illustrating a method for setting a correspondence between a color and a process using a registration sheet according to the second embodiment.

FIG. 51A is a view schematically illustrating detection of color information according to the second embodiment.

FIG. 51B is a view schematically illustrating detection of color information according to the second embodiment.

FIG. 52 is a view illustrating an example of use of a registration sheet in which a process is applied to the setting of a file name according to the second embodiment.

FIG. 54A is a view illustrating an example of a form in which the administrator designates two areas using marker pens according to the second embodiment.

FIG. 54B is a view illustrating an example of a form in which the administrator designates two areas using marker pens according to the second embodiment.

FIG. 55 is a view illustrating a modification of a registration sheet according to the second embodiment.

FIG. 56A is view illustrating a method for marking areas in a form according to the second embodiment.

FIG. 56B is view illustrating the method for marking areas in a form according to the second embodiment.

FIG. 56C is view illustrating the method for marking areas in a form according to the second embodiment.

FIG. 58 is an example view illustrating a correspondence between a setting file and a form according to the second embodiment.

DESCRIPTION OF EMBODIMENTS

Figure 1:
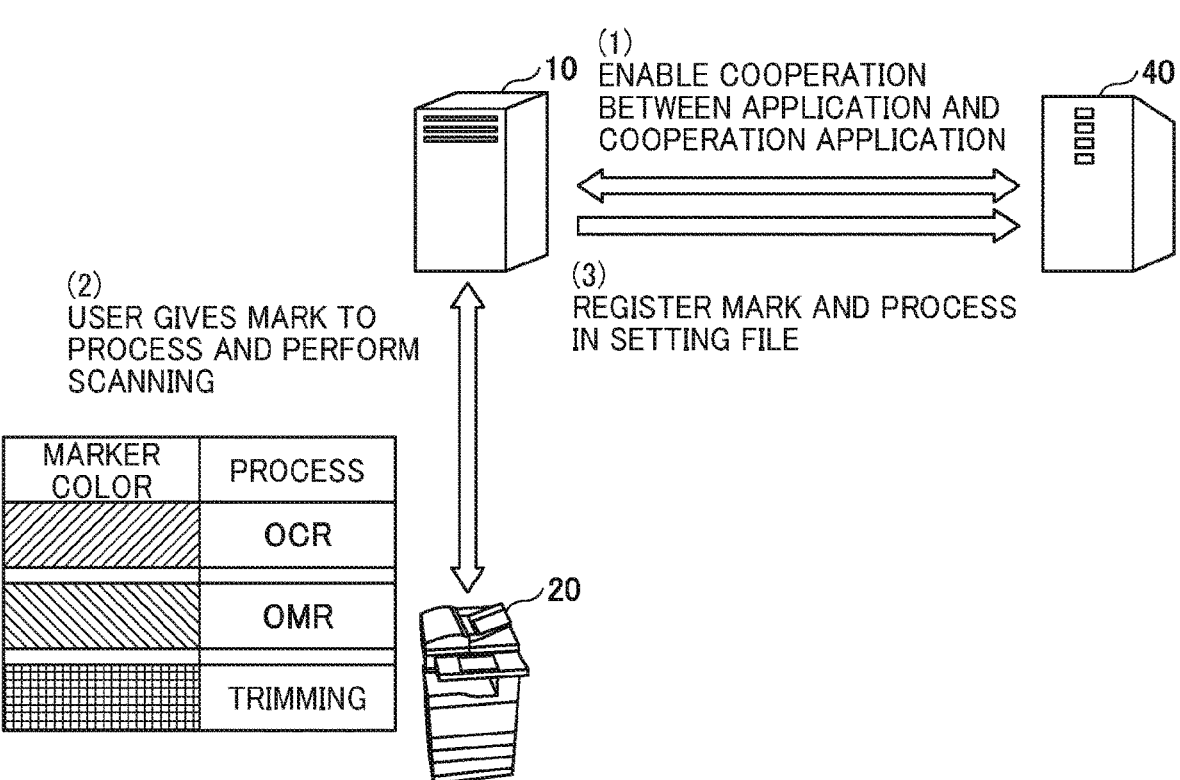
FIG. 1 is a view illustrating processes or operation for associating a mark with a process in a data output system according to a first embodiment.

The terminology used herein is for the purpose of describing particular embodiments only and is not intended to be limiting of the present invention. As used herein, the singular forms "a," "an," and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

The following describes, as an exemplary embodiment of the present disclosure, a data output system and a processing method performed by the data output system.

Overview of Processes or Operation

Processing of forms such as expense claim forms, invoices, bills, or purchase order forms is common in an organization such as a company or a group. A person in charge in the organization performs the task of extracting dates, case numbers, amounts of money, or the like from forms or tabulating dates, case numbers, amounts of money, or the like in forms on a daily basis. The processed forms are stored after filing, but the storage space is costly. While forms have been gradually being converted into electronic files, tasks such as renaming file names automatically assigned to the files of the forms are time-consuming to the person in charge.

Many of systems or services available for automating billing and invoicing management or order processing are expensive, and not many small or medium companies can invest in such systems or services. Various forms are used by organizations, and even items of the same form to be used for processes may be different from organization to organization. Accordingly, in the current situation, processing of such a form is inevitably performed manually.

In this embodiment, the information processing system receives, from a device, image data in which a predetermined mark (such as a marker color or a shape) is associated with a process corresponding to the mark. This enables the user to associate the mark with the process. The information processing system further receives, from the device, image data of a form on which the mark is formed. The information processing system associates the mark, the process, and area information in the form with a setting file. When the form is scanned by the device, the information processing system executes a process associated with an area of the form identified by the area information.

Accordingly, the information processing system is capable of performing various processes designated by the user on specific areas on a document.

An overview of processes or operation performed by a data output system 100 will be described with reference to FIGS. 1, 2A, and 2B. FIG. 1 illustrates processes or operation for associating a mark with a process in the data output system 100. FIGS. 2A and 2B illustrate processes or operation for creating a file from acquired data obtained by the data output system 100 from a form.

(1) The data output system 100 is capable of cooperating with an external service system 40. The data output system 100 cooperates with the external service system 40 via an application. An application operating in the data output system 100 may be simply referred to as an "application" or "app", and an application operating in the external service system 40 may be referred to as a cooperation application. In this case, the application ID of the application and the application ID of the cooperation application are associated with each other, and the correspondence between the application ID of the application and the application ID of the cooperation application is stored in the data output system 100.

(2) An administrator 8 of the data output system 100 prints a registration sheet registered in an information processing system 10 using a device 20, and colors the registration sheet with a color corresponding to a process using a marker pen. For example, the administrator 8 can associate processes with colors such that optical character recognition (OCR) is associated with green, optical mark recognition (OMR) is associated with blue, and trimming is associated with red. The device 20 scans a registration sheet to generate image data (first image data), and transmits the image data to the information processing system 10.

(3) The information processing system 10 detects a correspondence between colors and processes from the image data, and registers the colors and the processes in a setting file in association with each other. The information processing system 10 stores the setting file in the external service system 40.

Next, a description will be given with reference to FIGS. 2A and 2B. FIG. 2A illustrates setting of area information in a form, and FIG. 2B illustrates acquisition of data from the form using the area information.

(4) The administrator 8 uses a form 7, which is usually used by users in the organization, and designates, with a marker pen, which of the processes (e.g., OCR, OMR, and trimming) is to be performed on each area of the form 7. For example, the administrator 8 may use a marker pen to fill an area of the form 7 with a color or circle an area of the form 7 in a color. The device 20 reads the form 7 with the marked areas to generate image data (second image data) and transmits the image data (second image data) to the information processing system 10. The form 7 to be marked may include an item filled in with a character or the like, or an item only, or may be blank.

(5) The information processing system 10 identifies, from the image data of the form, an area colored in the same color as a color registered in a setting file acquired from the external service system 40, and stores area information of the area in the setting file in association with the corresponding color and process in the setting file. The area information is, for example, the coordinates of diagonal vertices of a rectangular area in the image data. The information processing system 10 stores the setting file in the external service system 40.

(6)-1 The administrator 8 connects a terminal apparatus 30 to the external service system 40, downloads the setting file, and inputs the language, the date and time, and the like in the form to the setting file to complement the setting file.

(6)-2 The administrator 8 further connects the terminal apparatus 30 to the information processing system 10 and performs an operation of associating the application ID of an application with the setting file. The administrator 8 can associate application IDs of any number of applications with the setting file. As a result, an icon for accepting selection of an application and area information on which image processing is to be performed are associated with each other.

(7) To submit the form 7 to the organization for reimbursement of expenses or the like, a user 6 in the organization presses the icon of the application corresponding to the form 7 on the device 20. The user 6 is allowed to easily select an application from a plurality of form names or the like. The user 6 causes the device 20 to read a form with items filled in by handwriting or a printed form. The device 20 reads the application ID of the application and the form to generate image data (third image data, such as a Portable Document Format (PDF) file), and transmits the image data to the information processing system 10.

(8) The information processing system 10 identifies a setting file using the application ID, and acquires the setting file from the external service system 40. The information processing system 10 acquires (for example, clips), for each process, an area of area information included in the acquired setting file from the image data. Accordingly, the area of the form registered by the administrator 8 is acquired.

(9) The information processing system 10 performs, for each area, a process associated with the area. As a result, a character code such as a character, the presence or absence of a check, image data, or the like is obtained for each area. In the following, these pieces of data are simply referred to as "acquired data".

(10) The information processing system 10 outputs the acquired data to an electronic file (e.g., a comma-separated value (CSV) file) and transmits the file and the image data of the form to the external service system 40. In response to designating the application ID of the cooperation application, the information processing system 10 can designate the cooperation application and transmit the file and the image data.

(11) The external service system 40 registers the image data and the file in a folder (or directory) designated by the administrator 8. Since the file includes information to be used for reimbursement, the person in charge can perform the reimbursement process.

As described above, the data output system 100 according to this embodiment enables the administrator 8 to register a mark (color) and the content of a process. The device 20 reads a form with marked areas, and the information processing system 10 acquires image data of the form. Thus, a process can be stored in association with each area of the form. The information processing system 10 can acquire an area from the image data of the form transmitted from the device 20 and perform a process corresponding to the area. Accordingly, it is possible to associate an area for image processing and a process with each of any number of applications, and the user may select an application depending on the type of the form, for example, to perform a desired process (such as OCR processing) on a desired area of image data generated by scanning.

Supplementary Information Related to Correspondence between Color and Process The series of processes described with reference to FIGS. 1, 2A, and 2B will be divided into tasks 1 to 3 to provide supplementary information. FIG. 3 illustrates registration (task 1) of a correspondence between a color and a process using a registration sheet.

FIG. 3(*a*) illustrates the registration sheet before coloring is applied.

FIG. 3(*b*) illustrates the registration sheet after coloring is applied. The registration sheet illustrated in FIG. 3(*b*) is scanned by the device 20.

FIG. 3(*c*) illustrates a portion of a setting file in which colors and processes are associated with each other. Two methods are conceivable for associating colors with processes.

In a first method, information indicating whether to associate the coordinates (in the registration sheet) at which a color is acquired with the process obtained from the coordinates is stored in the information processing system 10 in advance. Example parameters prepared in advance are as follows: Color extracted at coordinates (X coordinates: 100, 200; Y coordinates: 1, 50) for OCR; Color extracted at coordinates (X coordinates: 100, 200; Y coordinates: 51, 100) for masking (OMR in Table 4); and Color extracted at coordinates (X coordinates: 100, 200; Y coordinates: 101, 150) for trimming. In a second method, the administrator 8 associates colors with processes on the management site. FIG. 4 illustrates an example of a management site 150 for associating a color with a process. The management site 150 is provided as a web page or a web application from the information processing system 10 to the terminal apparatus 30. The administrator 8 can register colors for processes using radio buttons 151. In the illustrated example, the user uses three marker pen colors.

In either method, as illustrated in FIG. 3(*c*), a numerical value identifying the marker color (green) and OCR are associated with each other. A numerical value identifying the marker color (blue) and OMR are associated with each other. A numerical value identifying the marker color (red) and trimming are associated with each other.

Figure 5:
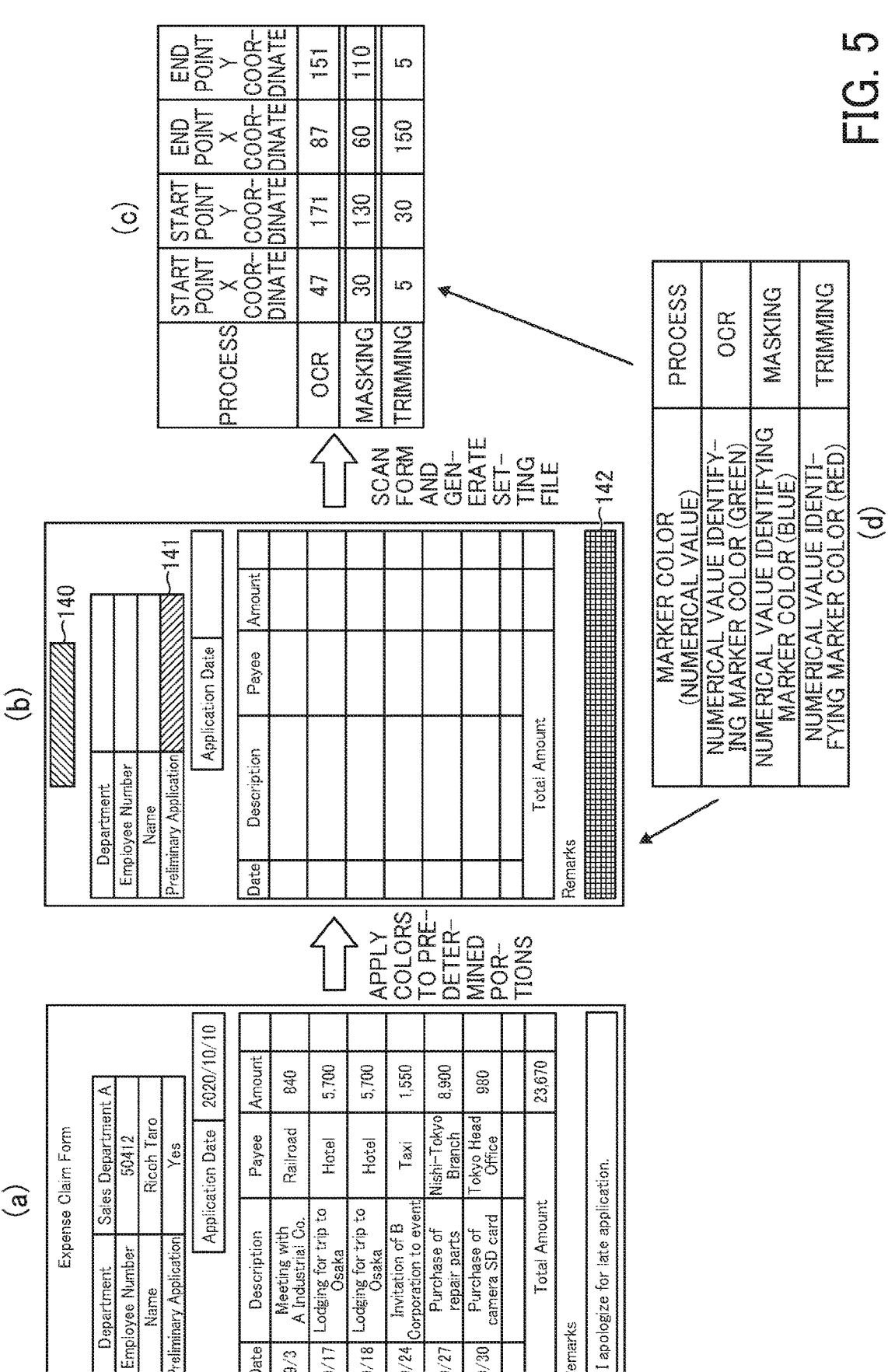
FIG. 5 is a view illustrating a correspondence (task 2) between area information and a process using the original of a form according to the first embodiment.

FIG. 5 illustrates a correspondence (task 2) between area information and a process using the original of a form.

FIG. 5(*a*) illustrates the original of the form.

FIG. 5(*b*) illustrates the form after coloring is applied. The form illustrated in FIG. 5(*b*) is scanned by the device 20.

FIG. 5(*c*) illustrates a portion of a setting file in which area information and processes are associated with each other.

As illustrated in FIG. 5(*d*), colors and processes are associated with each other in the setting file. The information processing system 10 detects a color of the registration sheet (registered in the setting file) from the form, and associates the coordinates of the area where the color is detected with the process in the setting file as area information.

In this embodiment, accordingly, the administrator 8 can change a color used for an area of the form to change the process to be performed on the area.

Ex1: colored in blue→OCR, colored in red→masking

Ex2: colored in blue→beginning of file name, colored in red→end of file name

Figure 6:
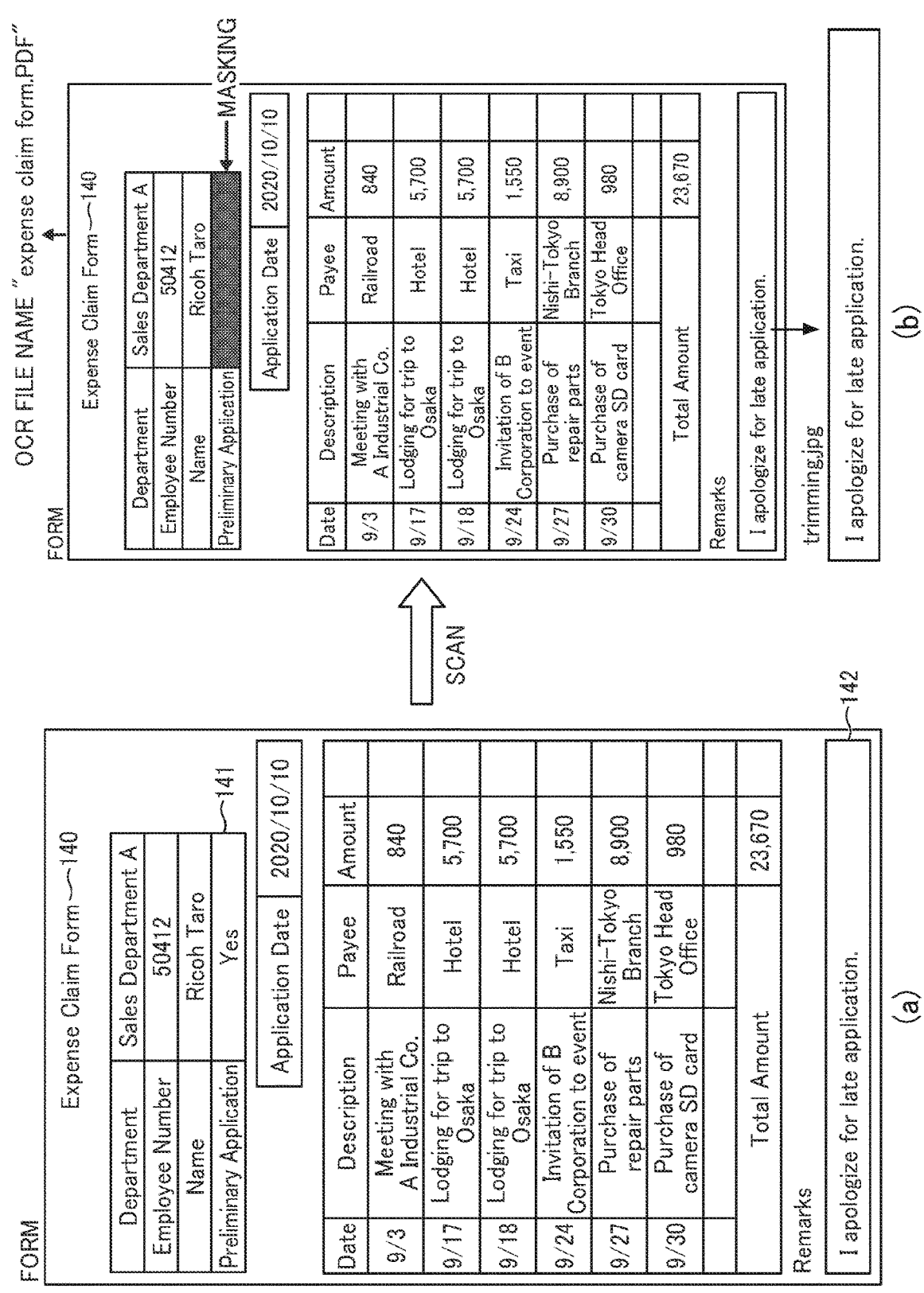
FIG. 6 is a view illustrating a process (task 3) to be performed on an area in a form using the form according to the first embodiment.

FIG. 6 illustrates a process (task 3) to be performed on an area in a form using the form.

FIG. 6(*a*) illustrates the original with items filled in by the user.

FIG. 6(*b*) illustrates processes to be performed on respective areas of the form. Since OCR and file name assignment are registered as processes for a title area 140 of the form, the title is the file name. Since masking is registered as a process for a preliminary application area 141 of the form, the area corresponding to the preliminary application is masked. Since trimming is registered as a process for a remarks area 142 of the form, the remarks area is acquired as image data.

Terms Used Herein

A mark is a type of way how the mark is distinguished from others. In one or more embodiments, a color is an example of a mark. Other examples of the mark include a character, an alphabet, and a sign.

A first apparatus is a device or a terminal apparatus of an administrator. A second apparatus is, for example, a device.

The phrase "in response to a user's operation" includes a case where a user performs setting using a registration sheet and a case where a user performs setting using a management screen.

Setting information is, for example, information associating a color with the content of a process (see, for example, Table 4).

The administrator 8 is a system administrator or the like on the customer side of the data output system 100 and is a person who performs setting related to the data output system 100 for a general user. A user is a general user on the customer side. A general user may perform the tasks of the administrator 8, and the administrator 8 and the general user are not distinguished from each other.

A form generally refers to a ledger, a slip, or the like. A form is also referred to as a business sheet containing blank spaces to be filled in by the user. While one or more embodiments mainly describe a form, any document readable by the device 20 may be used. For example, the form may be replaced with a document, a paper document, a written statement, a report, a newspaper, a magazine, or the like. Some forms are not printed on paper media (some forms need not be read by the device 20).

Any type of image data may be to be processed, and examples of the type of image data include PDF, Joint Photographic Experts Group (JPEG), Portable Network Graphics (PNG), Tagged Image File Format (TIFF), and bitmap (BMP).

In one or more embodiments, the term "setting file" refers to a file in which a process and area information are set, and the term "file" refers to a file to which acquired data is output. A file is a collection of data and is a basic unit of data managed by a computer.

Outputting data refers to enabling a user to visually check the data. In one or more embodiments, data is output to a file, for example.

The web application is software or a mechanism thereof that operates in coordination with a program written in a programming language (e.g., JavaScript (registered trademark)) operating on a browser and a program on the web server and that is executed on the browser.

Example System Configuration

Figure 7:
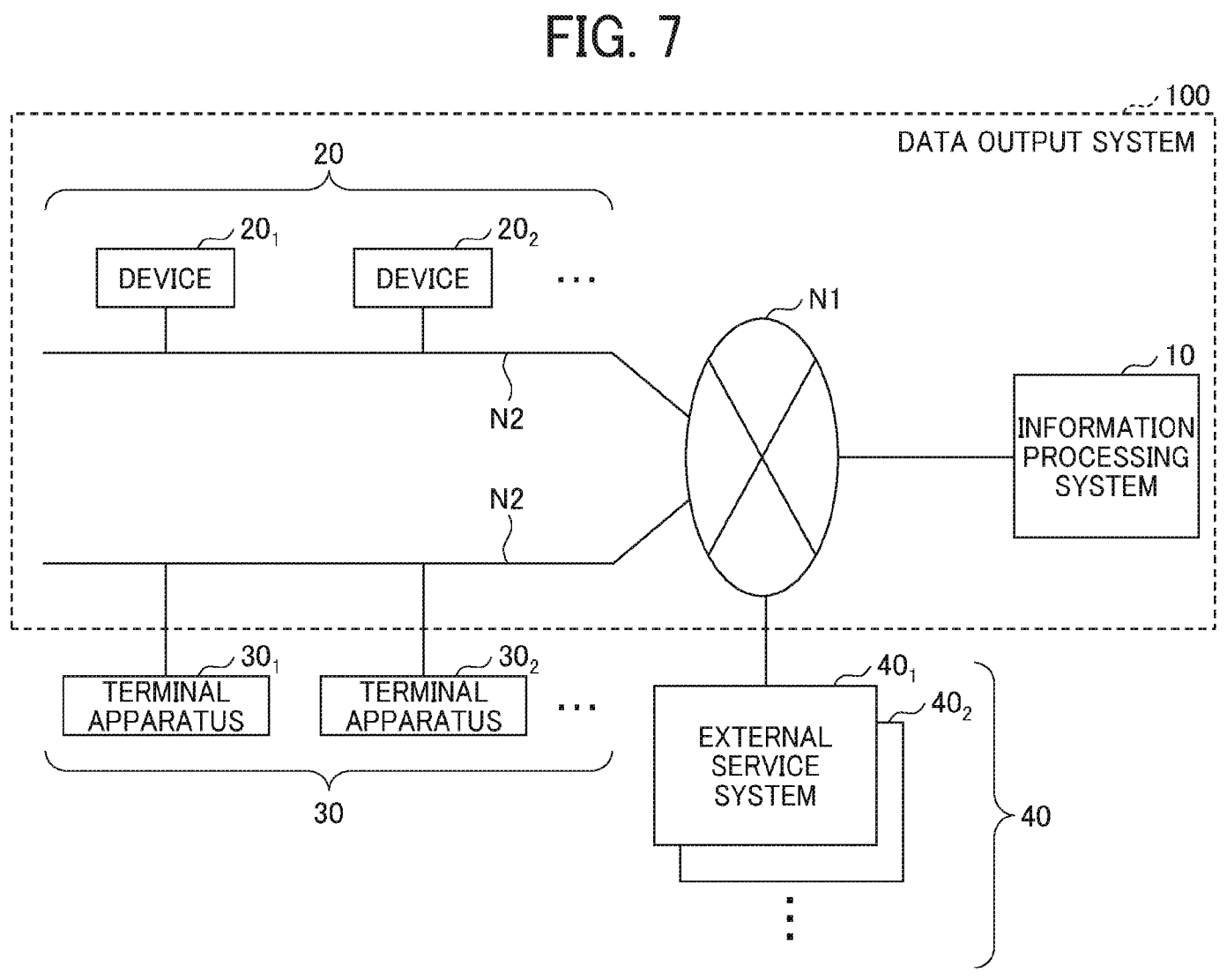

First, the system configuration of the data output system 100 according to this embodiment will be described with reference to FIG. 7. FIG. 7 illustrates an example system configuration of the data output system 100 according to this embodiment.

The data output system 100 illustrated in FIG. 7 includes the information processing system 10 and the device 20. The information processing system 10 is communicably connected to the device 20 via a wide-area network N1 such as the Internet. The data output system 100 communicates with the external service system 40, which is an external system. In addition, any terminal apparatus 30 is capable of communicating with the information processing system 10 via the network N1 and a network N2.

The information processing system 10 is implemented by one or more information processing apparatuses and provides various services implemented by a series of processes in cooperation with the external service system 40, such as a cloud service, via the network N1. Specific examples of the services provided by the information processing system 10 according to this embodiment will be described below. The information processing system 10 may be implemented by cloud computing or by a single information processing apparatus. The term "cloud computing" refers to internet-based computing where resources on a network are used or accessed without identifying specific hardware resources. The information processing system 10 may be located on the Internet or in an on premise environment. A series of processes is provided by one application. A series of processes is also referred to as a "process flow" or a "workflow".

The device 20 is any electronic device used by a user. Examples of the device 20 include an image processing apparatus such as a multifunction peripheral (MFP), an image forming apparatus, a personal computer (PC), a projector, an electronic whiteboard, and a digital camera. The device 20 is connected to the network N2. A user can use the device 20 to use various services provided by at least one of the information processing system 10 or the external service system 40.

In the following, a plurality of devices 20 are distinguished from each other by using subscripts such as "device $20_1$" and "device $20_2$".

The terminal apparatus 30 is, for example, a desktop PC, a laptop PC, a smartphone, a tablet terminal, or the like, which is used by the administrator 8 or a user. Other examples of the terminal apparatus 30 include an apparatus on which a web browser is operable. The terminal apparatus 30 is connected to the network N2. The administrator 8 or a user is able to operate the terminal apparatus 30 to use various services provided by the information processing system 10 or the external service system 40, and is also able to set a cooperation application or an application.

While the device 20 and the terminal apparatus 30 will be described separately for convenience of description, the device 20 and the terminal apparatus 30 may be collectively referred to as a device.

In the following, a plurality of terminal apparatuses 30 are distinguished from each other by using subscripts such as "terminal apparatus $30_1$" and "terminal apparatus $30_2$".

The external service system 40 includes one or more information processing apparatuses that provide services via the network NI in response to the execution of a cooperation application. In response to the execution of a cooperation application, data is managed or processed, and the data itself or processing results are provided as services.

Examples of the external service system 40 include a cloud service system and an application service provider (ASP), and may provide various external services via networks. In this embodiment, a storage service will be described as an example of the services. The external service system 40 may be located on the Internet or in an on premise environment.

In the following, when a plurality of external service systems 40 are distinguished from each other, an "external service system $40_1$" and an "external service system $40_2$" in the illustrated example are represented by an external service system 40A and an external service system 40B, respectively.

Example Hardware Configuration

The hardware configuration of the information processing system 10 and the terminal apparatus 30 included in the data output system 100 according to this embodiment will be described with reference to FIG. 8.

Information Processing System and Terminal Apparatus

Figure 8:
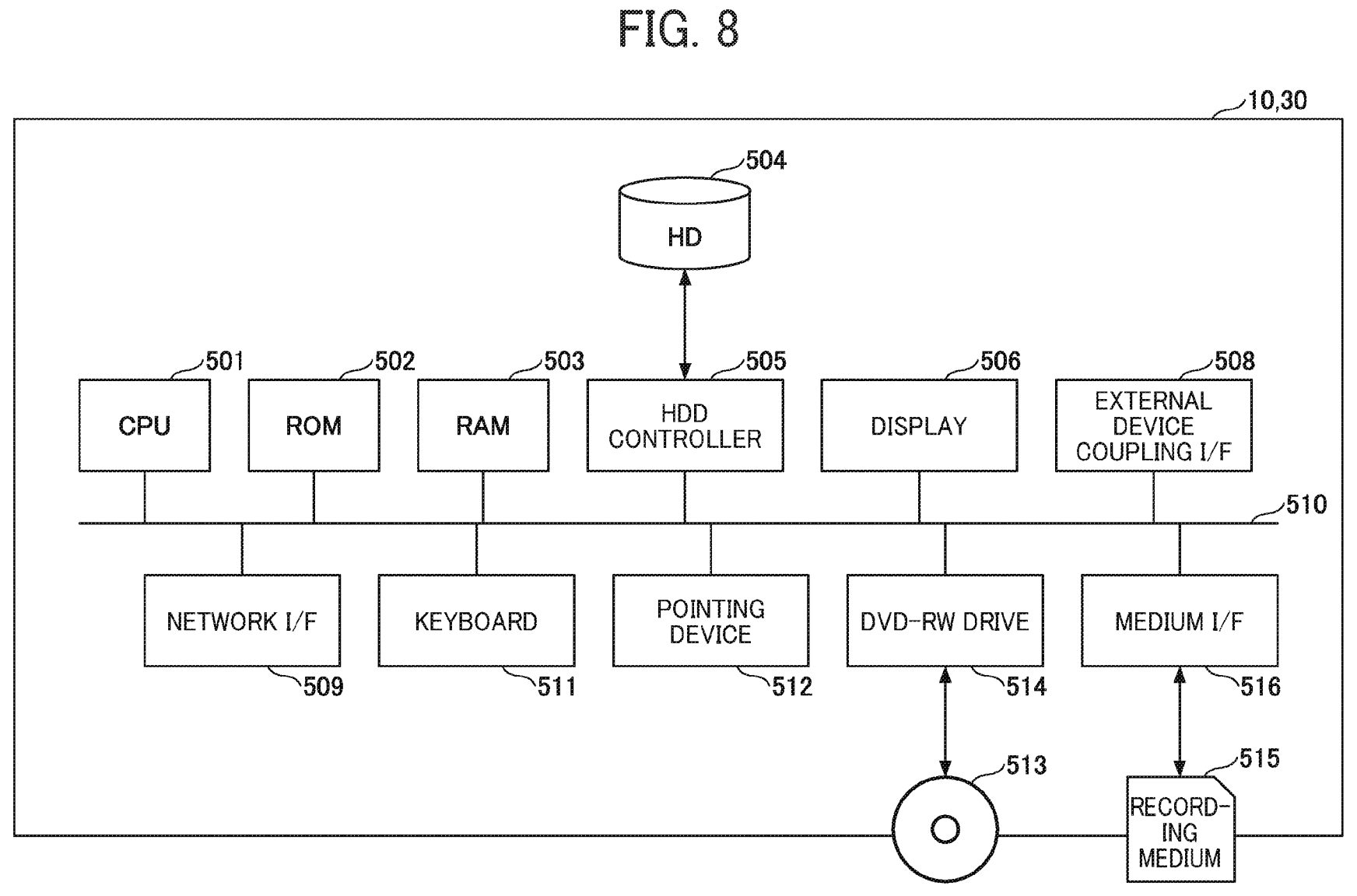

FIG. 8 illustrates an example hardware configuration of the information processing system 10 and the terminal apparatus 30 according to this embodiment. As illustrated in FIG. 8, the information processing system 10 and the terminal apparatus 30 are constructed by a computer and include a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls the overall operation of the information processing system 10 and the terminal apparatus 30. The ROM 502 stores programs such as an initial program loader (IPL) to boot the CPU 501. The RAM 503 is used as a work area for the CPU 501. The HD 504 stores various data such as a program. The HDD controller 505 controls reading or writing of various data from or to the HD 504 under control of the CPU 501. The display 506 displays various information such as a cursor, a menu, a window, text, or an image. The external device connection I/F 508 is an interface for connecting to various external devices. Examples of the external devices include, but are not limited to, a universal serial bus (USB) memory and a printer. The network I/F 509 is an interface for performing data communication using the network N2. The bus line 510 is, for example, an address bus or a data bus for electrically connecting the elements such as the CPU 501 illustrated in FIG. 8.

The keyboard 511 is an example of an input device provided with a plurality of keys for allowing a user to enter characters, numerical values, or various instructions. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable recording medium. In another example, a DVD-R may be used instead of the DVD-RW 513. The medium I/F 516 controls reading or writing (storing) of data from or to a recording medium 515 such as a flash memory.

Device

Figure 9:
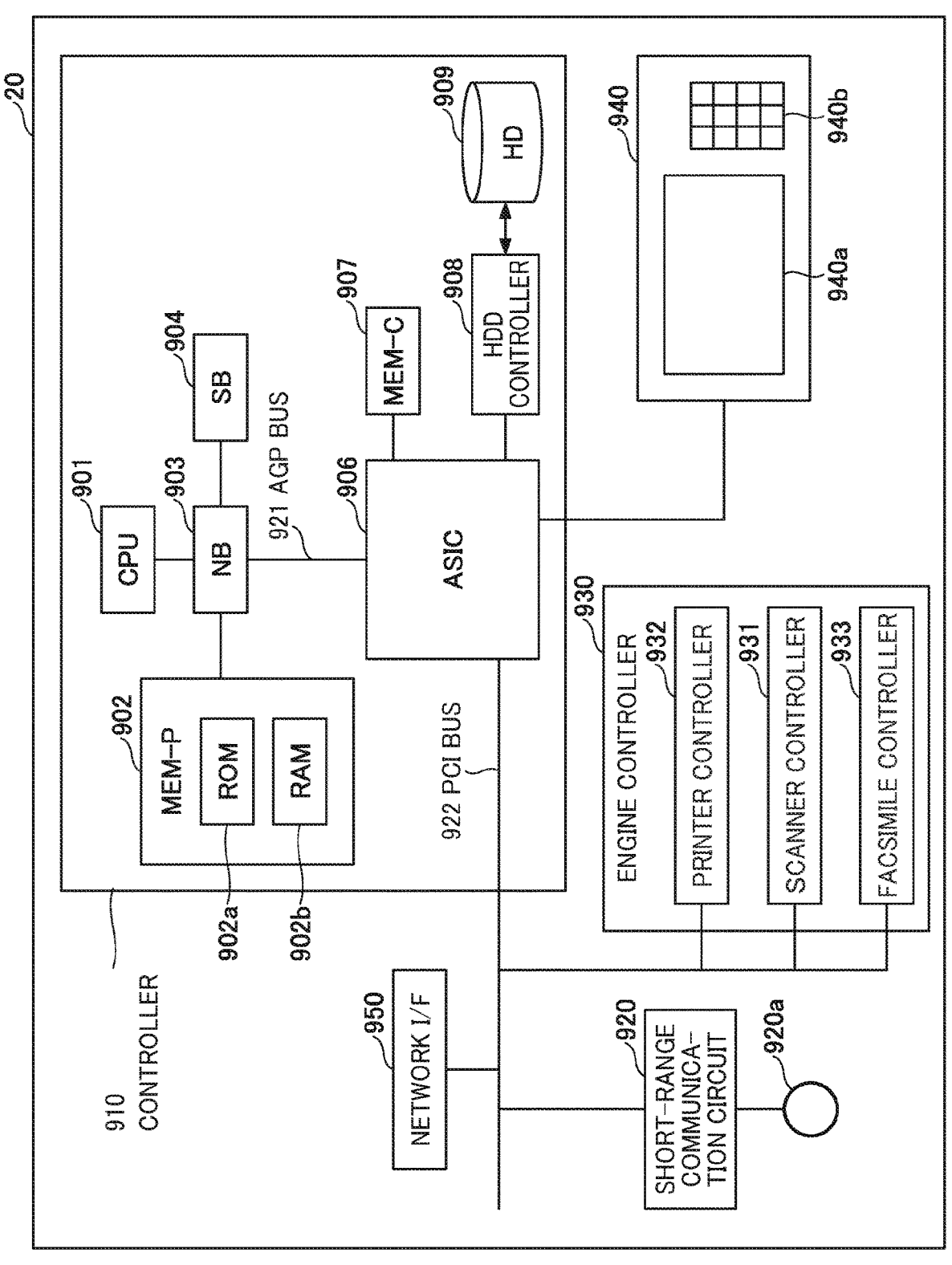
FIG. 9 is a diagram illustrating an example hardware configuration of an image forming apparatus according to the first embodiment.

FIG. 9 is a hardware configuration diagram of an image forming apparatus, which is an example of the device 20. As illustrated in FIG. 9, the image forming apparatus includes a controller 910, a short-range communication circuit 920, an engine controller 930, an operation panel 940, and a network I/F 950.

The controller 910 includes a CPU 901 as a main processor, a system memory (MEM-P) 902, a north bridge (NB) 903, a south bridge (SB) 904, an application specific integrated circuit (ASIC) 906, a local memory (MEM-C) 907 as a memory, a HDD controller 908, and an HD 909 as a memory. The NB 903 and the ASIC 906 are connected through an accelerated graphics port (AGP) bus 921.

The CPU 901 is a controller that controls entire operation of the image forming apparatus. The NB 903 connects the CPU 901 to the MEM-P 902, the SB 904, and the AGP bus 921. The NB 903 includes a memory controller for controlling reading or writing of various data from or to the MEM-P 902, a Peripheral Component Interconnect (PCI) master, and an AGP target.

The MEM-P 902 includes a ROM 902a as a memory that stores a program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a compact disc-read only memory (CD-ROM), compact disc-recordable (CD-R), or digital versatile disc (DVD), in an installable or executable file format for distribution.

The SB 904 connects the NB 903 to a PCI device or a peripheral device. The ASIC 906 is an integrated circuit (IC) dedicated to an image processing use and including hardware elements for image processing, and connects the AGP bus 921, a PCI bus 922, the HDD controller 908, and the MEM-C 907 to each other. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. The DMACs is capable of rotating image data with a hardware logic. The PCI unit transfers data to a scanner controller 931, a printer controller 932, and a facsimile controller 933 through the PCI bus 922. The ASIC 906 may be connected to a USB interface, or the Institute of Electrical and Electronics Engineers 1394 (IEEE 1394) interface.

The MEM-C 907 is a local memory used as a buffer for image data to be copied or a code buffer. The HD 909 stores various image data, font data for printing, and form data. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, the speed of the graphics accelerator card is improved.

The short-range communication circuit 920 is provided with a short-range communication circuit antenna 920a. The short-range communication circuit 920 is a communication circuit in compliance with a standard such as near field communication (NFC) or Bluetooth (registered trademark).

The engine controller 930 includes the scanner controller 931, the printer controller 932, and the facsimile controller 933. The operation panel 940 includes a panel display 940a and a hard keypad 940b. The panel display 940a is implemented by, for example, a touch panel that displays current settings or a selection screen to receive a user input. The hard keypad 940b includes a numeric keypad that receives set values of various image forming parameters such as an image density parameter and a start key that receives an instruction for starting copying. The controller 910 controls overall operation of the image processing apparatus. For example, the controller 910 controls drawing, communication, or user inputs to the operation panel 940. The scanner controller 931 and the printer controller 932 each performs various image processing, such as error diffusion or gamma conversion.

In response to an instruction to select a specific application through the operation panel 940, for example, using a mode switch key, the image processing apparatus selectively performs a document box function, a copier function, a printer function, and a facsimile function. When the document box function is selected, the image processing apparatus operates in a document box mode. When the copier function is selected, the image processing apparatus operates in a copy mode. When the printer function is selected, the image processing apparatus operates in a printer mode. When the facsimile function is selected, the image processing apparatus operates in a facsimile mode.

The network I/F 950 controls communication of data with an external device through the network N2. The short-range communication circuit 920 and the network I/F 950 are electrically connected to the ASIC 906 through the PCI bus 922.

Functions

Figure 10:
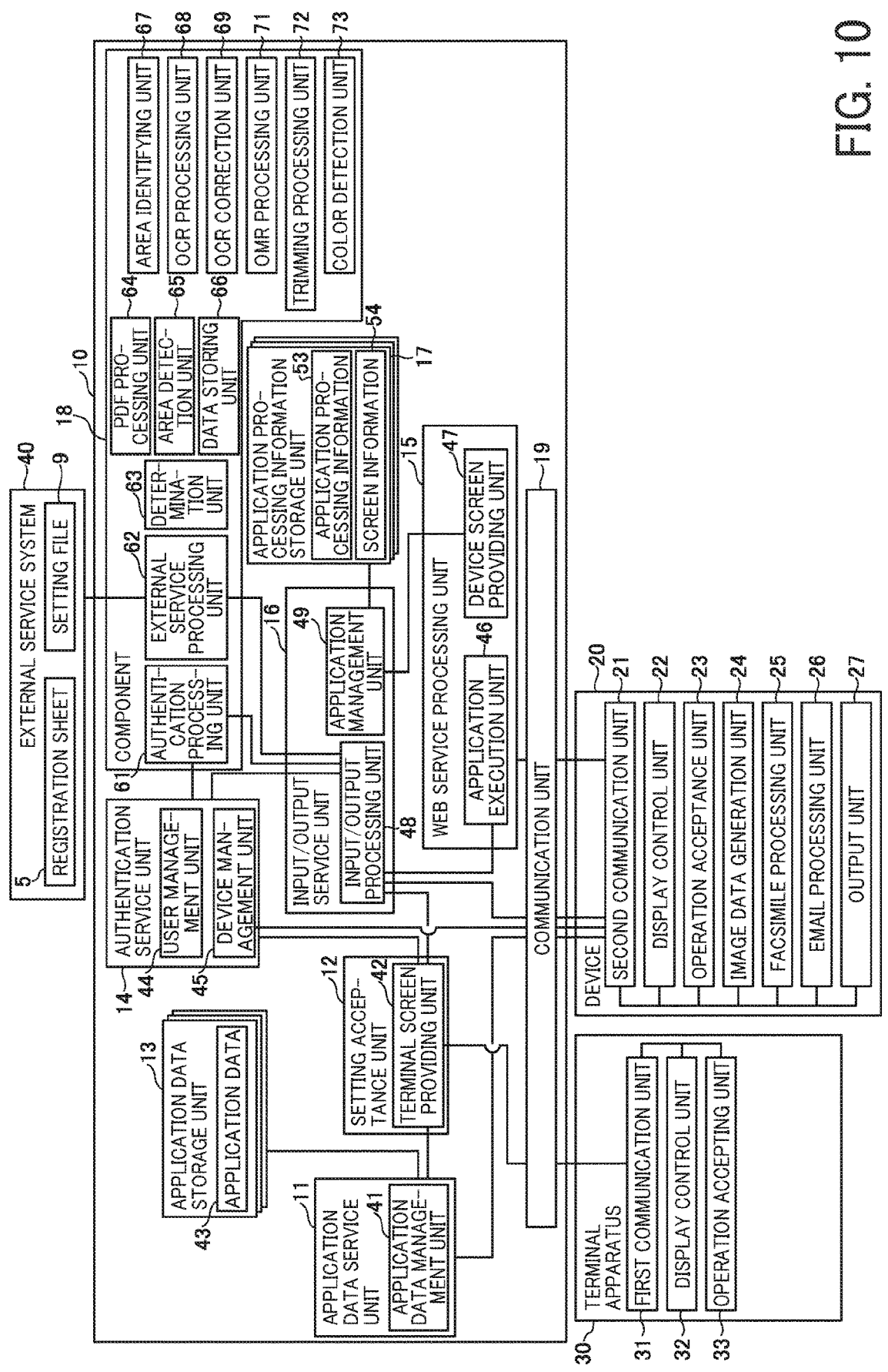
FIG. 10 is a diagram illustrating an example functional configuration of a device, the terminal apparatus, and the information processing system according to the first embodiment.

Next, the functional configuration of the data output system 100 according to this embodiment will be described with reference to FIG. 10. FIG. 10 illustrates an example functional configuration of the device 20, the terminal apparatus 30, and the information processing system 10 according to this embodiment.

Device

First, the device 20 includes a second communication unit 21, a display control unit 22, an operation acceptance unit 23, an image data generation unit 24, a facsimile processing unit 25, an email processing unit 26, and an output unit 27. The second communication unit 21, the display control unit 22, the operation acceptance unit 23, the image data generation unit 24, the facsimile processing unit 25, the email processing unit 26, and the output unit 27 are functions or means implemented by the CPU 901 executing instructions included in one or more programs installed in the device 20. For example, the second communication unit 21, the display control unit 22, and the operation acceptance unit 23 are implemented by a web browser, and the other components are implemented by individual applications (native applications).

The second communication unit 21 transmits and receives various types of information to and from the information processing system 10. In this embodiment, the second communication unit 21 receives screen information and the like of an application list screen from the information processing system 10, and transmits image data of a form, an application ID, and the like to the information processing system 10.

The display control unit 22 interprets screen information of various screens and displays the screen information on the panel display 940a. The operation acceptance unit 23 accepts various operations of the administrator 8 or the user on various screens displayed on the panel display 940a.

When the application for which selection is accepted by the operation acceptance unit 23 is for generating image data, the image data generation unit 24 scans a document with the scanner controller 931 to generate image data. The image data generation unit 24 is a scanning function. The image data generation unit 24 converts the image data into a PDF file. The image date (such as JPEG, TIFF, or PNG) may remain in the original format without conversion by the image data generation unit 24. The facsimile processing unit 25 performs processing related to reception and transmission of a facsimile message by the facsimile controller 933. In response to receipt of a facsimile message, the facsimile processing unit 25 requests the information processing system 10 to execute an application associated in advance. The image data generation unit 24 may request the information processing system 10 to execute an application corresponding to the sender (fax number) of the facsimile message.

The email processing unit 26 performs processing related to transmission and reception of an email message. In response to receipt of an email message, the email processing unit 26 requests the information processing system 10 to execute an application associated in advance. The email processing unit 26 may request the information processing system 10 to execute an application corresponding to the sender (email address) of the email message.

The output unit 27 performs an image forming process to output a sheet with an image formed thereon. The image may be formed by either electrophotography or inkjet printing.

Terminal Apparatus

The terminal apparatus 30 includes a first communication unit 31, a display control unit 32, and an operation acceptance unit 33. The first communication unit 31, the display control unit 32, and the operation acceptance unit 33 are functions or means implemented by the CPU 501 executing instructions included in one or more programs installed in the terminal apparatus 30. The program may be a web browser or dedicated software for communicating with the information processing system 10.

The first communication unit 31 transmits and receives various types of information to and from the information processing system 10 or the external service system 40. In this embodiment, the first communication unit 31 receives various types of screen information and the like from the information processing system 10 or the external service system 40, and transmits information set by the administrator 8 or the user to the information processing system 10 or the external service system 40.

The display control unit 32 interprets screen information of various screens to display screens on the display 506. The operation acceptance unit 33 accepts various operations of the administrator 8 or the user on various screens displayed on the display 506.

Information Processing System

The information processing system 10 includes an application data service unit 11, a setting acceptance unit 12, an application data storage unit 13, an authentication service unit 14, a web service processing unit 15, an input/output service unit 16, an application processing information storage unit 17, a component 18, and a communication unit 19. The application data service unit 11, the setting acceptance unit 12, the application data storage unit 13, the authentication service unit 14, the web service processing unit 15, the input/output service unit 16, the application processing information storage unit 17, the component 18, and the communication unit 19 are functions or means implemented by the CPU 501 executing instructions included in one or more programs installed in the information processing system 10. In FIG. 10, the information processing system 10 includes the function units described above for convenience of illustration. The function units may be arranged in a distributed manner in a plurality of information processing apparatuses.

The communication unit 19 transmits and receives various types of information to and from the terminal apparatus 30 and the device 20. The setting acceptance unit 12 provides a setting site to the terminal apparatus 30 and accepts settings for the setting site. The term "site" may refer to a web page or a web application, or may refer to a system on the server side that provides a web page or a web application to the terminal apparatus 30. The setting acceptance unit 12 includes a terminal screen providing unit 42. The terminal screen providing unit 42 provides an initial screen that prompts the administrator 8 to set information to be used to execute an application, an application list screen, an association screen, and the like. In response to a Hypertext Transfer Protocol (HTTP) request from the terminal apparatus 30, the terminal screen providing unit 42 generates screen information described in Hypertext Markup Language (HTML), Extensible Markup Language (XML), Cascade Style Sheet (CSS), JavaScript (registered trademark), or the like, and transmits the screen information to the terminal apparatus 30 as an HTTP response.

The application data service unit 11 includes an application data management unit 41. The application data management unit 41 manages, for each customer such as company, application data 43 of applications purchased by the customer. For example, the application data 43 associates an application with the setting file described above. The application data 43 is stored in the application data storage unit 13. An organization such as a customer viewed from the data output system 100 is referred to as "tenant".

The web service processing unit 15 provides screen information to the device 20 or accepts execution of an application from the device 20. The web service processing unit 15 includes an application execution unit 46 and a device screen providing unit 47. The application execution unit 46 accepts execution of an application from the device 20 and requests an input/output processing unit 48 to execute the application. The device screen providing unit 47 uses screen information 54 to provide the device 20 with the screen information of an application list screen and an application screen.

The input/output service unit 16 inputs and outputs data by using the authentication service unit 14, the application processing information storage unit 17, and the component 18. The input/output service unit 16 includes the input/output processing unit 48 and an application management unit 49. The input/output processing unit 48 executes the application requested by the application execution unit 46. When executing the application, the input/output processing unit 48 refers to application processing information 53 and requests the component 18 to perform processes included in the application.

The application management unit 49 manages the application processing information 53 of the application and the screen information 54, which are stored in the application processing information storage unit 17. The application processing information 53 includes settings indicating which processes and in which order the application is to perform the processes. For example, the application processing information 53 includes settings in which OCR is followed by making a request to the external service system 40 to perform processing. The screen information 54 is information on screens to be displayed on the device 20, such as icons of applications, an application list screen, and application screens. The application processing information storage unit 17 stores the application processing information 53 and the screen information 54 for each application.

The authentication service unit 14 performs a process for authenticating a user (including the administrator 8) and the device 20. The authentication service unit 14 includes a user management unit 44 and a device management unit 45. The user management unit 44 manages information related to the user. The authentication service unit 14 stores authentication information such as a user name and a password. The authentication information includes authentication information for the information processing system 10 and authentication information for the external service system 40. The device management unit 45 manages the device 20 associated with the tenant. That is, the identification information of the tenant and the device 20 are managed in association with each other such that, in response to the device 20 being identified, the tenant is also identified.

The component 18 generally refers to individual functions that actually perform the respective processes. One block in the component 18 corresponds to one process. The component 18 includes, for example, an authentication processing unit 61, an external service processing unit 62, a determination unit 63, a PDF processing unit 64, an area detection unit 65, a data storing unit 66, an area identifying unit 67, an OCR processing unit 68, an OCR correction unit 69, an OMR processing unit 71, a trimming processing unit 72, and a color detection unit 73.

The authentication processing unit 61 is the component 18 that requests the authentication service unit 14 to perform a process related to authentication.

The external service processing unit 62 is the component 18 that requests the external service system 40 to perform a process. That is, the external service processing unit 62 is a External Service System The external service system 40 stores a registration sheet 5 and a setting file 9. The registration sheet 5 is registered in advance. The setting file 9 is registered by the administrator 8.

TABLE 1

| Application ID | Application name | Screen information | Application processing information | Shared application | External service system |
|---|---|---|---|---|---|
| app001 | OCR area designation (personal) | Screen definition information A1 | Process flow information A1 | — | A |
| app002 | OCR area designation (shared) | Screen definition information A2 | Process flow information A2 | Applicable | B |
| app003 | Specification | Screen definition information A3 | Process flow information A3 | — | A |
| app004 | Expense claim form | Screen definition information A4 | Process flow information A4 | Applicable | B |
| app005 | Purchase order form | Screen definition information A3 | Process flow information A3 | — | A |
| app006 | Driver's license | Screen definition information A3 | Process flow information A3 | — | C | function of cooperating with the external service system 40. The external service processing unit 62 is prepared for each type of external service system 40.

The determination unit 63 performs various determinations and controls branches of the process flow. The PDF processing unit 64 performs processes related to a PDF file. For example, the PDF processing unit 64 extracts image data from the PDF file or creates a PDF file with transparent text. This is because the device 20 transmits image data in the format of a PDF file.

The area detection unit 65 detects a mark associated with a process from image data of a registration sheet. Further, the area detection unit 65 detects a rectangular area marked with a marker pen or the like from image data of a form and creates the coordinates (area information) of the rectangular area.

The area identifying unit 67 identifies a processing-target area from the image data of the form, based on the area information. The area identifying unit 67 acquires (for example, clips) the identified processing-target area. The OCR processing unit 68 performs OCR processing on an area and the entire image data. The OCR correction unit 69 corrects an OCR processing result. The OMR processing unit 71 performs OMR processing on an area. The trimming processing unit 72 performs trimming processing on an area. The component 18 may further include components such as a translator in addition to the illustrated ones.

The data storing unit 66 registers a color and a process in association with each other, and further registers the process and area information in association with each other in the setting file. The data storing unit 66 outputs a file including acquired data generated by the OCR processing unit 68, the OMR processing unit 71, and the trimming processing unit 72 through processing. The acquired data is data acquired from an area of the form.

The color detection unit 73 detects a color of the registration sheet that is colored by the administrator 8 using a marker pen.

Table 1 presents an example of application processing information stored in the application processing information storage unit 17. The application processing information storage unit 17 stores a list of applications that have been purchased for (or are licensed by) each tenant. The information presented in Table 1 is a list of applications for performing image processing on a portion of received image data, which will be described in this embodiment, among the applications included in the list stored in the application processing information storage unit 17, and includes the following items: application ID, application name, screen information, application processing information, shared application, and external service system. The application ID is identification information identifying an application. The application name is the name of an application assigned by the administrator 8. An application is associated with the screen information 54 (described in HTML or the like) to be used when the icon of the application or a setting screen is displayed on the device 20. Since the content and order of a series of processes (process flow) are defined for an application, each application is associated with the application process information 53. As described below, a copied application has the same flow information as that of the source application. The shared application is an application available to users of the tenant in common, whereas a typical application is an application that each user is authorized to use. In Table 1, an expense claim form application is a shared application. The expense claim form application is used by users in common. The external service system is an external service system 40 with which each application cooperates. Some applications do not cooperate with any external service system 40.

When the administrator 8 or the user logs in, the application management unit 49 acquires a list of applications that the administrator 8 or the user is authorized to use from the application processing information storage unit 17, and provides the list to the device 20. When an application is designated from the list of applications, the application management unit 49 identifies screen information and application processing information associated with the application.

TABLE 2

(a)

| User ID | User name | Email address | Password | Available application | External service system information |
|---------|-----------|---------------|----------|----------------------|-------------------------------------|
| U001 | Tokkyo Hanako | hanako@sample.com | **** | app001app003 | A |
| U002 | Tokkyo Taro | taro@sample.com | **** | app001app003app004 | A B C |
| U003 | Jitsuyo Ichiro | ichiro@sample.com | **** | app003app004 | B |

(b)

| User ID | External service system | User ID | Password |
|---------|------------------------|---------|----------|
| U001 | A | hanako | **** |
| U002 | A | taro1 | **** |
|  | B | taro2 | **** |
|  | C | taro3 | **** |
| U003 | B | ichiro | **** |

(c)

| Common application | External service system | Authentication information |
|--------------------|------------------------|----------------------------|
| app003 | B | Authentication information of U001 |
| . . . | | |

Table 2 presents an example of information related to users managed by the user management unit 44. Table 2(a) includes the following items of information related to a user in the information processing system 10: user ID, user name, email address, password, available application, and external service system information. The user also includes the administrator 8. The password and at least one of the user ID, the user name, or the email address are authentication information for the user to log in to the information processing system 10. The available application is an application that the user is authorized to use. Each user is authorized to use an application in response to the administrator 8 assigning permissions for the user to access the application for which the administrator 8 has purchased a license while designating the number of users or the like. The available application includes a personal application and a shared application. Both the personal application and the shared application are used by a plurality of users. The personal application can be accessed by an individual user using their authentication information for an external service, whereas the shared application can be accessed by a plurality of users using authentication information of the administrator 8 for the external service. In Table 2(a), app003, which is common to U001 to U003, is a shared application. The other applications are personal applications. The personal application involves registering authentication information of each user for an external service system. The external service system information is the external service system 40 with which the user has created a setting for cooperation.

The user has created a setting for cooperation with an external service system 40 upon it being confirmed that the user is allowed to log in with authentication information for the external service system 40 with which the user desires to cooperate. The user enters authentication information for the external service system 40 from the setting site. Upon successful login, the identification information for the external service system 40 is set in the external service system information in Table 2(a). Authentication information for the external service system 40 is registered in Table 2(b).

Table 2(b) represents information related to the external service system 40 for each user, and includes the following items: user ID, external service system, user ID, and password. Authentication information for the external service system 40 with which the user has created a setting for cooperation is registered in Table 2(b). The authentication information for the external service system 40 is authentication information for the user to log in to the external service system 40. Some users, such as a user with U002, may have different authentication information for each external service system 40. As a result, each user of the data output system 100 is associated with authentication information for the external service system 40. The information processing system 10 identifies the authentication information for the external service system 40 with which a setting for cooperation has been created, in accordance with authentication information for the information processing system 10 acquired from the device 20, such as the user ID and the password.

The authentication information is authentication information for the external service system 40 or authentication information to be used to cooperate with the external service system 40, and may be, instead of a user ID or a password, a token or the like acquired from the external service system 40 at the time of setting for cooperation with the external service system 40.

Table 2(c) presents authentication information for the shared application. Identification information for the shared application is associated with the external service system 40 and authentication information. Since the authentication information of the administrator 8 is used for the shared application, the identification information of the administrator 8 is registered as the identification information for the shared application.

TABLE 3

| applicationId | application Name | fileId | fileName | Upload destination folder |
|---|---|---|---|---|
| app003 | expense claim form | 6dh948y2 | /My Drive/expense claim form_setting file.csv | /My Drive/expense claim form storage site |
| app004 | purchase order form | 3oirucn9q | /My Drive/purchase order form_setting file.csv | /My Drive/purchase order form storage site |
| . . . | . . . | . . . | . . . | . . . |

Table 3 presents an example of the application data 43 stored in the application data storage unit 13. The application data 43 associates an application with a setting file (area information). An association between an application and a setting file is performed by the administrator 8. The "applicationId" is the application ID of an application that cooperates with a cooperation application. The "applicationName" is the application name of the application. The "fileId" is the identification information of a setting file created by the information processing system 10. The "fileName" is the file name of a setting file created by the information processing system 10. The setting file is stored in the external service system 40, and the file name of the setting file is set together with the folder of the setting file. The storage location may be identified by, for example, uniform resource locator (URL). The "Upload destination folder" is the external service system 40 and a folder in which the setting file is stored. The "Upload destination folder" may include, for example, a URL. The administrator 8 sets an upload destination folder.

"ID" is identification information of area information. The IDs are automatically numbered without the administrator 8 or the user having to pay attention to them.

"Marker color" is the color of a cell (illustrated in FIG. 13) read from the registration sheet (an example of identification information identifying the content of a process). The color of the cell is registered in, for example, the HSV color space. In the HSV color space, "H" refers to hue and indicates a "color". The range of "H" is 0 to 360 degrees. "S" refers to saturation and indicates a level of "vividness". The range of "S" is 0 to 100%. "V" refers to value and indicates a level of "brightness". The range of "V" is 0 to 100%. The color space representing the marker color may be HSB for hue, saturation, brightness, RGB for red, green, and blue, Lab, XYZ, or the like.

"Process" is the content of a process associated with a cell in the registration sheet. Examples of the process include OCR, OMR, and trimming. Other examples may include translation, masking (filling), and encryption.

"Start point (X coordinate)", "start point (Y coordinate)", "end point (X coordinate)", and "end point (Y coordinate)" are included in area information. These points represent the diagonal vertices of a marked rectangular area of the form. The coordinates, width, and height of one point may be designated. The coordinates may be expressed in units of cm, pixels, or the like, for example.

The information described above is automatically set by the information processing system 10. The following information is entered by the administrator 8.

"Format" is a data format of the area. Examples of the data format include text, Y/N, image, date (YYYY/MM/DD), and numerical value (NUMERIC). Since the data format is specified, the OCR processing unit 68 can perform OCR processing with higher accuracy. The format can be selected from a pull-down menu. As described above, a data type is set for each area.

TABLE 4

| A ID | B Marker color | C Process | D Start point X coordinate | E Start point Y coordinate | F End point X coordinate | G End point Y coordinate | H Format | I CSV column name | J CSV position (column) | K CSV position (start row) | L OCR language | M Order of use for file name |
|---|---|---|---|---|---|---|---|---|---|---|---|---|
| 1 | H = 61 to 180° (green) | OCR | 47 | 171 | 87 | 151 | Text | Document name | | | Japanese | 1 |
| 2 | H = 181 to 300° (blue) | OMR | 30 | 130 | 60 | 70 | Y/N | Preliminary application | 3 | 2 | | |
| 3 | H = 0 to 60°, 301 to 360° (red) | Trimming | 5 | 30 | 150 | 5 | Image | Remarks | 4 | 2 | | |

Table 4 presents an example of the setting file 9 stored in the external service system 40. The setting file 9 is a file including area information to be subjected to OCR processing. The setting file 9 is in a tabular format (e.g., a CSV format), and has cells whose locations are each designated by a column number and a row number. The items in columns A to M will be described hereinafter. The item names in the first row of the setting file 9 are automatically set by the information processing system 10 upon creation of the setting file 9.

"CSV column name" is a name assigned to the area. In the case of a form, for example, the title of a rectangular frame is input. The administrator 8 can enter any value. The CSV column name (if the CSV position is designated) is output to a file together with the data.

"CSV position (column)" designates in which column of the file the information processing system 10 writes the data extracted from the area.

"CSV position (start row)" designates in which row of the file the information processing system 10 writes data extracted from the area. The row number increases with each reading of the form, and thus the "start row" when no data is described in the file is set. For example, data acquired from the first form is set in the second row, and data acquired from the second form is set in the third row. In contrast, the column positions may be fixed.

"OCR language" indicates the language in which data is described in the area. Since the language is specified, the OCR processing unit 68 can perform OCR processing with higher accuracy. The OCR language can be selected from a pull-down menu. As described above, a data type is set for each area.

"Order of use for file name" is used for the file name of a file to which data acquired from the area is output in this embodiment. The order of use for a file name is the order of data to be used for the file name of a file to be output from the information processing system 10. For example, if the "document name" is assigned the first place in the order, the file name is "expense claim form.csv" in accordance with the data (expense claim form) acquired from the "document name" area.

Application Processing Information

Next, the application process information will be described in detail with reference to FIG. 11. FIG. 11 illustrates an example of the application processing information 53 stored in the application processing information storage unit 17.

The application processing information 53 illustrated in FIG. 11 is information related to a series of processes for implementing a service for requesting the "external service system B" to process image data generated by the device 20 through scanning.

The application process information 53 includes a flow ID 1201A indicating identification information of the application process information 53, a flow name 1202A indicating the name of the application process information 53, and flow details 1203A indicating the content of the series of processes. The flow name 1202A is also the name of the application.

Further, the flow details 1203A include a process content 1223A indicating that a request is made to the "external service system B" to perform processing.

The process content 1223A specifies the component ID "ExService_B" of the component 18 that executes a process in cooperation with the "external service system B", and the parameters "AppId" and "Folder". The "ExService_B" corresponds to the external service processing unit 62 for the external service system B. The "AppId" stores the cooperation application ID. The correspondence between the application and the cooperation application is determined in advance. The "Folder" stores the folder for storing the file, i.e., the upload destination folder. The upload destination folder set by the administrator 8 is set as the folder in the storage location. As a result, the information processing system 10 can store the scanned image data in the "external service system B".

In the case of an application having no cooperation application, "AppId" is omitted. The illustrated parameters are some of parameters that may be included in the application processing information.

While a single component is designated in FIG. 11 for simplicity of illustration, a series of process contents 1223A specifying processes to be performed by the application, the number of which is equal to the number of processes (components), are registered in the application process information 53.

Figures 12A, 12B, 12C:
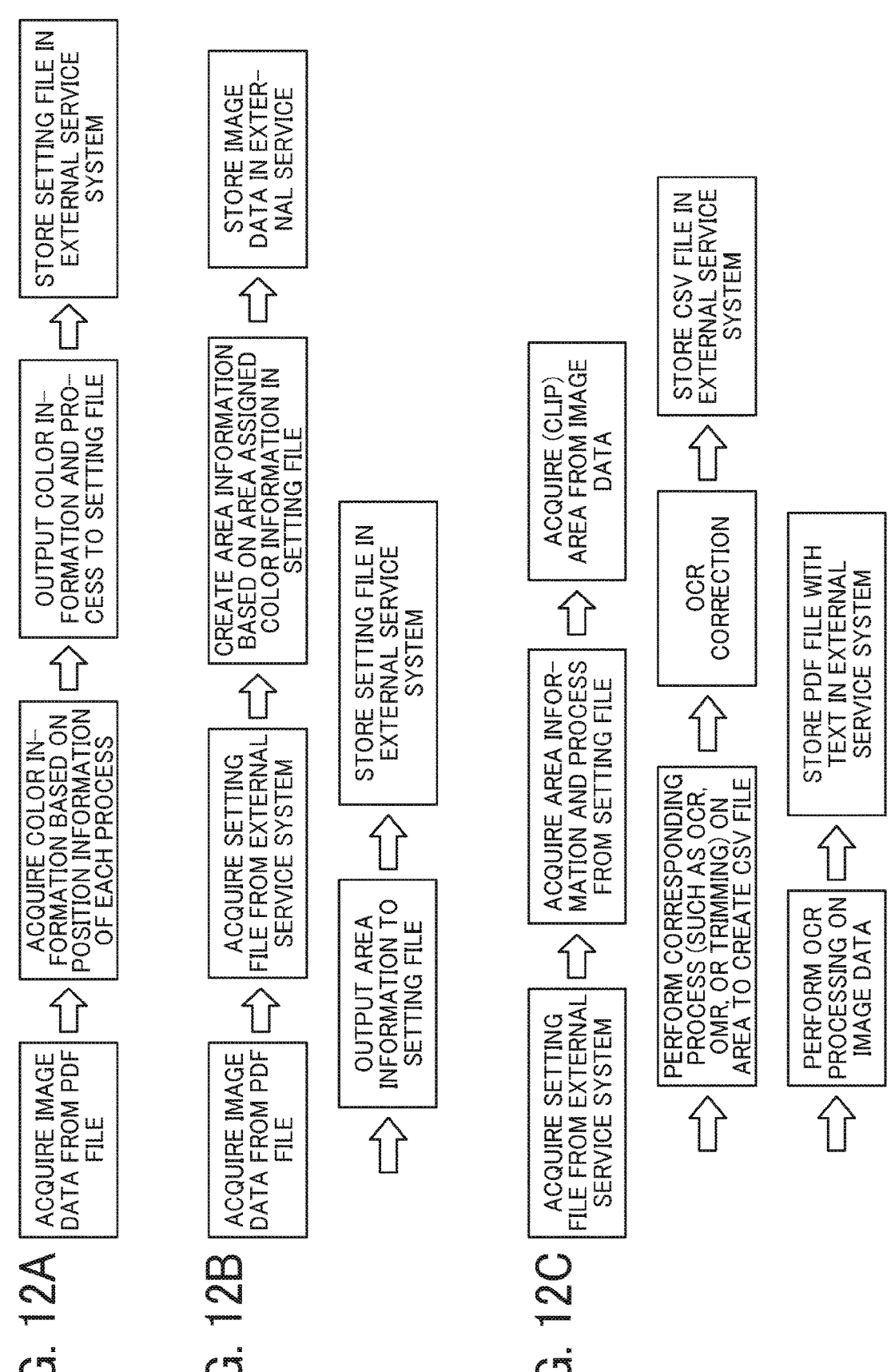
FIG. 12A is a view schematically illustrating a series of processes performed by an application according to the first embodiment.
FIG. 12B is a view schematically illustrating a series of processes performed by an application according to the first embodiment.
FIG. 12C is a view schematically illustrating a series of processes performed by an application according to the first embodiment.

FIGS. 12A to 12C schematically illustrate series of processes performed by applications. FIG. 12A illustrates a series of processes of an application (an application corresponding to a color registration button 112 described below) for registering a correspondence between a marker color and a process in a setting file. One block corresponds to a process content 1223A. The details of the processes will be described with reference to FIG. 15.

FIG. 12B illustrates a series of processes of an application (an application corresponding to a form registration button 113 described below) for registering area information in a marker color and a process in a setting file. The details of the processes will be described with reference to FIG. 25.

FIG. 12C illustrates a series of processes of an application (e.g., an expense claim form application) for outputting data from an area of a form. The details of the processes will be described with reference to FIGS. 37A and 37B.

Registration of Correspondence between Color and Process in Setting File

Next, setting of a correspondence between a color and a process by the administrator 8 and creation of a setting file will be described with reference to FIGS. 13 to 20.

Figure 13:
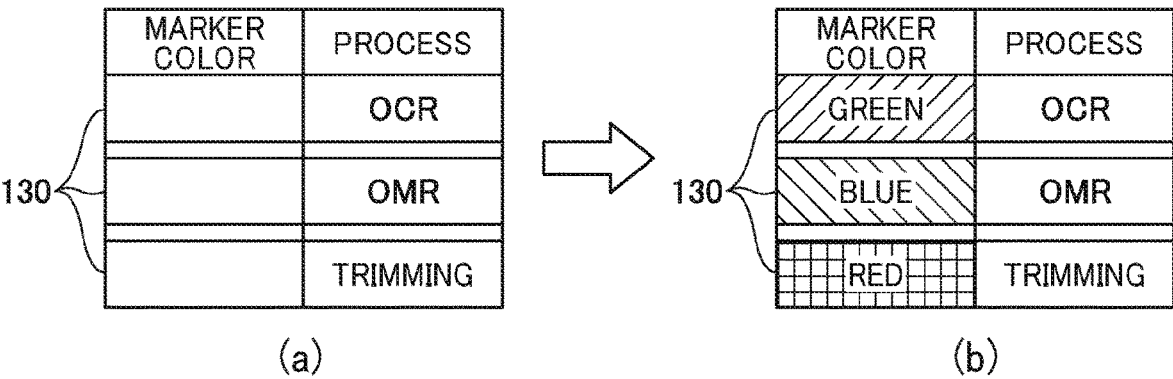
FIG. 13 is a view illustrating a method for setting a correspondence between a color and a process using a registration sheet according to the first embodiment.

FIG. 13 illustrates a method for setting a correspondence between a color and a process using a registration sheet. FIG. 13(a) illustrates a registration sheet before the administrator 8 colors the registration sheet with marker pens. The original of the registration sheet is registered in the external service system 40.

The first row of the registration sheet specifies items of the respective columns (marker color in the first column, and process in the second column). This embodiment includes three "processes" (OCR, OMR, and trimming), and the processes are set in the registration sheet in advance in the following order: OCR in the second row; OMR in the third row; and trimming in the fourth row. In the original of the registration sheet, cells 130 designating marker colors are blank.

FIG. 13(b) is a view in which the administrator 8 colors the cells 130 with marker pens for the respective processes. For example, the administrator 8 uses green, blue, and red marker pens among the owned marker pens. The administrator 8 assigns green to OCR processing, blue to OMR processing, and red to trimming processing. The original of the registration sheet includes predetermined spacings between rows to avoid mixture of color inks due to spreading of the color inks.

The administrator 8 colors each of the cells 130 of the registration sheet with a marker pen among the owned marker pens in accordance with the assignment of the desired marker color to the process, which is determined by the administrator 8. The device 20 scans the registration sheet to register the correspondence between the marker colors and the processes in the information processing system 10.

While the cells 130 are filled in with colors in FIG. 13, each of the cells 130 may be marked with any mark. For example, the cells 130 may be marked with signs such as triangles or circles, alphabets, borders, or the like. In this case, the information processing system 10 registers such marks and the processes in the setting file. The information processing system 10 may or may not consider the colors of the marks.

Instead of filling in the cells 130 with colors using marker pens, the administrator 8 may enter text or signs indicating the respective marker colors, such as "green or G", "blue or B", or "red or R". In this case, the information processing system 10 performs character recognition to associate a marker color with the content of a process.

Alternatively, the administrator 8 may connect the terminal apparatus 30 to the information processing system 10, and may enter text or the like to a web page displayed on the terminal apparatus 30 to specify a color.

In addition, the administrator 8 may be allowed to register the registration sheet itself. The administrator 8 connects the terminal apparatus 30 to the information processing system 10, and registers the content of processes in a web page displayed on the terminal apparatus 30 to create a registration sheet illustrated in FIG. 13(*a*).

Screen Example on Device

Figure 14:
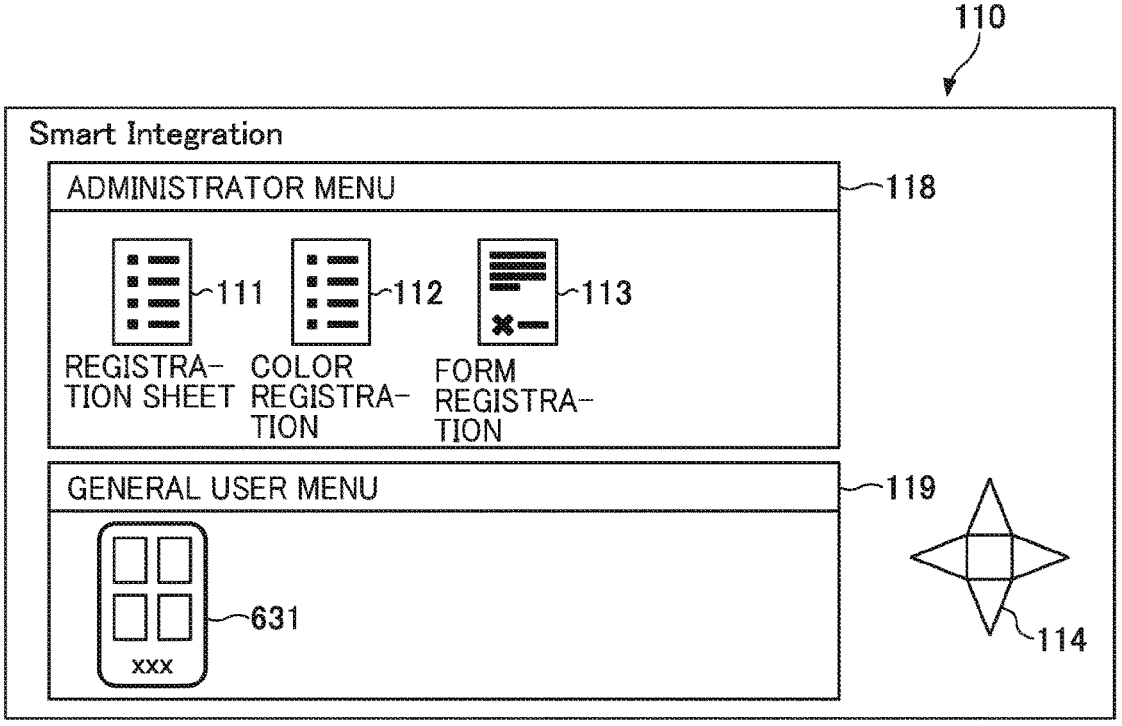
FIG. 14 is a view illustrating an example of an administrator screen displayed in response to an administrator logging in to the device according to the first embodiment.

FIG. 14 illustrates an example of an administrator screen 110 displayed in response to the administrator 8 logging in to the device 20. The administrator screen 110 includes an administrator menu 118 and a general user menu 119. The administrator menu 118 is a menu for the administrator 8 to register the setting file. The general user menu 119 is a list of applications available to the administrator 8 as a user.

In the administrator menu 118, a registration sheet button 111 is a button for the administrator 8 to print a registration sheet. A color registration button 112 is a button for the administrator 8 to scan a registration sheet with the device 20 and register a correspondence between marker colors and processes in the setting file. The form registration button 113 is a button for the administrator 8 to scan a marked form with the device 20 and register a correspondence between processes and area information in the setting file.

The registration sheet button 111, the color registration button 112, and the form registration button 113 are web applications. The administrator 8 performs tasks in accordance with the respective web applications to register the setting file.

In response to pressing of the registration sheet button 111 of the administrator menu 118, the device 20 displays a registration sheet. The administrator 8 prints the registration sheet and colors the registration sheet with marker pens. Then, in response to the administrator 8 pressing the color registration button 112 of the administrator menu 118 and executing scanning of the registration sheet colored using the marker pens, image data of the registration sheet is transmitted to the information processing system 10. The information processing system 10 registers the correspondence between the marker colors and the processes in the setting file.

Then, the administrator 8 presses the form registration button 113 of the administrator menu 118, and the device 20 scans the original of the form colored using the marker pens. Image data of the form is transmitted to the information processing system 10, and the information processing system 10 registers the correspondence between the processes and the area information in the setting file.

In response to pressing of the form registration button 113, the device 20 may display the correspondence between the marker colors and the processes, which is received from the information processing system 10. For example, the device 20 displays the information illustrated in FIG. 13(*b*) on the operation panel 940. To change the correspondence between the colors and the processes, the administrator 8 presses an up/down button 114 on the operation panel 940. Each time the up/down button 114 is pressed, the device 20 shifts one row in the column for the process. This enables the administrator 8 to change the correspondence between the colors and the processes.

In response to the administrator 8 pressing, as a user, an application in the general user menu 119, the application is activated. In response to the user scanning the filled in form with the device 20, the information processing system 10 executes, on each area, a process associated with the area identified by the area information in the setting file.

Figure 15:
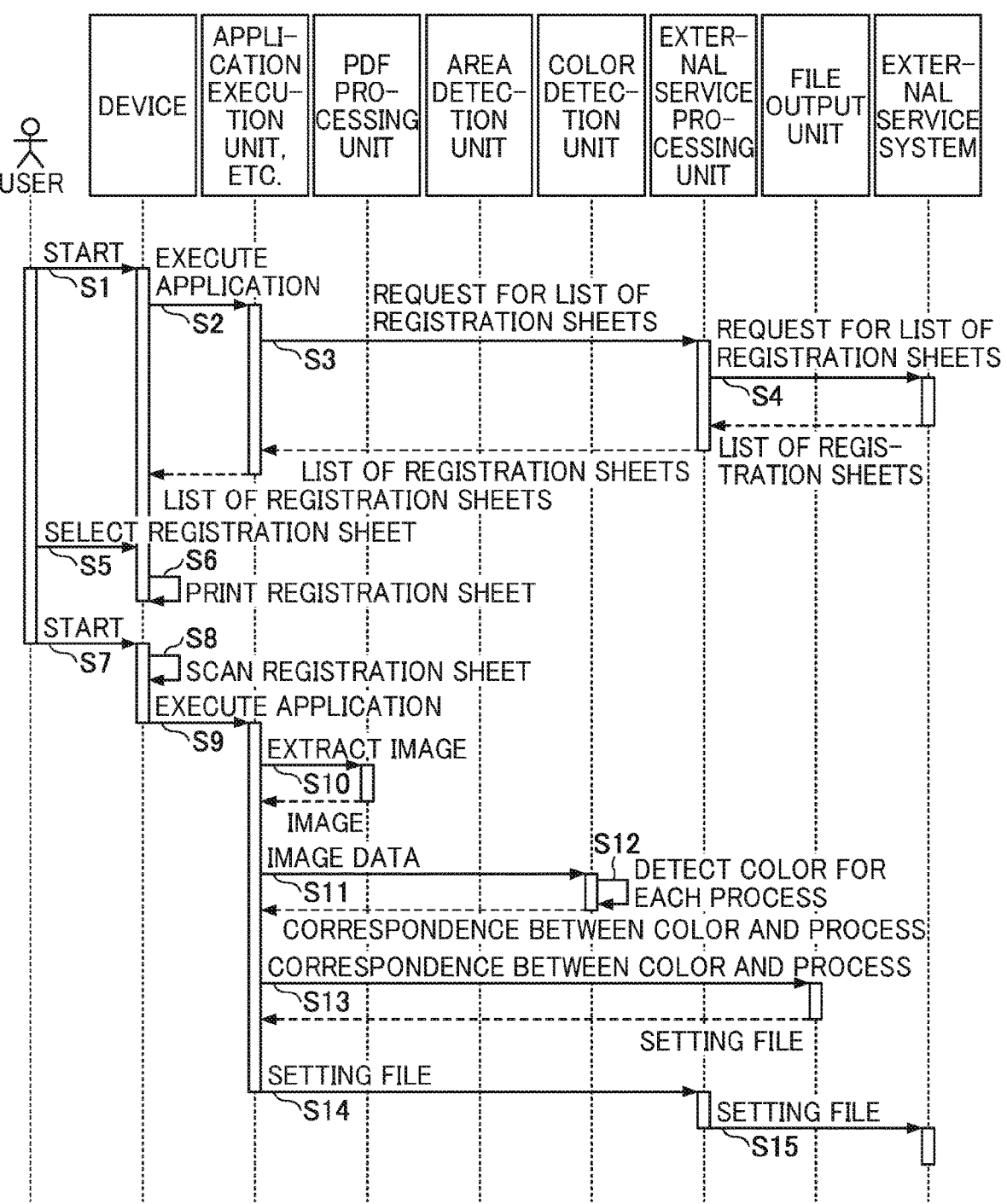
FIG. 15 is a sequence chart illustrating an example procedure for the administrator to register a correspondence between a color and a process in a setting file using a registration sheet according to the first embodiment.

FIG. 15 is a sequence chart illustrating an example procedure for the administrator 8 to register a correspondence between a color and a process in a setting file using a registration sheet.

S1: The administrator 8 operates the device 20 to log in to the information processing system 10, and presses the registration sheet button 111 in the administrator menu 118.

S2: The second communication unit 21 of the device 20 transmits a request to the information processing system 10 to execute an application corresponding to the registration sheet button S3: The communication unit 19 of the information processing system 10 receives the request for executing the application. The application execution unit 46 designates the application ID of the application corresponding to the registration sheet button 111 and requests the input/output processing unit 48 to execute the application. The input/output processing unit 48 refers to the application processing information 53 associated with the application ID of the application corresponding to the registration sheet button 111 and executes the application. First, the input/output processing unit 48 requests the external service processing unit 62 to provide a list of registration sheets.

S4: The external service processing unit 62 communicates with the external service system 40 using the authentication information of the administrator 8 and requests the external service system 40 to provide a list of registration sheets available to the administrator 8.

S5: The second communication unit 21 of the device 20 receives the list of registration sheets, and the display control unit 22 displays the list of registration sheets. The administrator 8 selects a registration sheet in which a process to be executed is registered. The operation acceptance unit 23 accepts the selection of a registration sheet. If a single registration sheet is included, the user provides a printing instruction instead of selection.

S6: The output unit 27 of the device 20 prints the registration sheet selected by the administrator 8. In the sequence chart, a process for the device 20 to acquire the registration sheet from the external service system 40 is omitted. On the registration sheet, identification information of the registration sheet or position information of the cells 130 to be colored may be provided in form of barcode or the like. The details will be described with reference to FIGS. 16A and 16B.

S7: The administrator 8 colors the cells 130 associated with processes in the printed registration sheet with marker pens. Then, the administrator 8 presses the color registration button 112 in the administrator menu 118.

S8: The operation acceptance unit 23 of the device 20 accepts pressing of the color registration button 112, and the image data generation unit 24 scans the registration sheet to generate a PDF file.

S9: The second communication unit 21 of the device 20 transmits the PDF file and a request for executing the application corresponding to the color registration button 112 to the information processing system 10.

S10: The communication unit 19 of the information processing system 10 receives the PDF file. The application execution unit 46 designates the application ID of the application corresponding to the color registration button 112 and requests the input/output processing unit 48 to execute the application. The input/output processing unit 48 refers to the application processing information 53 associated with the application ID of the application corresponding to the color registration button 112 and executes the application. First, the input/output processing unit 48 designates the PDF file and requests the PDF processing unit 64 to extract image data. The PDF processing unit 64 extracts the image data of the registration sheet from the PDF file.

S11: Then, the input/output processing unit 48 transmits the image data to the color detection unit 73 to make a request to detect the correspondence between the colors and the processes.

S12: The color detection unit 73 detects color information from the cells 130 determined in advance in the image data.

FIGS. 16A and 16B schematically illustrate detection of color information. The registration sheet has a barcode 101 at a corner thereof such as the upper left corner, and the barcode 101 indicates the orientation of the registration sheet. The color detection unit 73 rotates the image data such that the barcode 101 is located at the upper left corner. Then, the color detection unit 73 detects color information from the cells 130 determined (in position) in advance for the respective processes.

As illustrated in FIG. 16A, the process of OCR is determined by the fill color of a rectangular cell defined by two position coordinate points A and B (an example of position information) indicating diagonal corners. The process of OMR is determined by the fill color of a rectangular cell defined by position coordinate points C and D. The process of trimming is determined by the fill color of a rectangular cell defined by position coordinate points E and F. The correspondence between the sets of position coordinate points A and B, position coordinate points C and D, and position coordinate points E and F and the respective processes may be stored in the barcode 101 or in the application data management unit 41. Also in this case, the barcode 101 may include at least identification information of a registration sheet; the identification information may be omitted if a single type of registration sheet is present.

As illustrated in FIG. 16B, the barcode 101 or the application data management unit 41 stores the processes and the sets of position coordinate points of the respective cells 130 to be colored in association with each other. The color detection unit 73 acquires the H value of the HSV color system from each of the cells 130, based on the position coordinate points illustrated in FIG. 16B. Upon detection of the color (H=(0 to 60°, 301 to 360°)) corresponding to red from the cell 130 associated with trimming, the color detection unit 73 registers H=(0 to 60°, 301 to 360°) of the HSV color system in the setting file in association with trimming. Upon detection of the color (H=(61 to 180°)) corresponding to green from the cell 130 associated with OCR, the color detection unit 73 registers H=(61 to 180°) in the setting file in association with OCR. Upon detection of the color (H=(181 to 300°)) corresponding to blue from the cell 130 associated with OMR, the color detection unit 73 registers H=(181 to 300°) in the setting file in association with OMR. In this manner, instead of registering the entire ranges of the H values of red, blue, and green, the color detection unit 73 may register, in the setting file, colors (the H values) obtained by adding a margin such as ±10% to the detected H values.

The colors and the processes may be associated with each other by the administrator 8 using the management site 150 illustrated in FIG. 4. The sequence of the setting using the management site 150 is as follows. The communication unit 19 transmits screen information of the management site 150 to the terminal apparatus 30, and receives the correspondence between the marks and the processes, which is accepted by the terminal apparatus 30. The data storing unit 66 stores the processes and the marks in the setting file in association with each other.

Referring back to FIG. 15, the operation will still be described. S13: The application execution unit 46 acquires the correspondence between the colors and the processes from the color detection unit 73. The application execution unit 46 transmits the correspondence between the colors and the processes to the data storing unit 66, and makes a request to generate a setting file. The data storing unit 66 numbers IDs and creates a setting file in which the marker colors and the processes are associated with each other. The data storing unit 66 transmits the setting file to the application execution unit 46. At this time, Table 4 contains information in the columns A to C. The correspondence between the marker colors and the processes may be stored not in the setting file but in a separate independent file.

S14, S15: The application execution unit 46 transmits the setting file to the external service system 40 via the external service processing unit 62. The external service processing unit 62 acquires, from the user management unit 44, authentication information of the administrator 8 for the external service system 40. As a result, the external service processing unit 62 logs in to the external service system 40, and stores the setting file in the top folder of the administrator 8 (or a folder designated by the administrator 8). If the administrator 8 designates the file name of the setting file, the external service processing unit 62 assigns the file name to the setting file. If no file name is set, the current date and time or the like is used as the file name.

As described above, the setting file in which the marker colors and the processes are associated with each other is registered in the external service system 40.

Designation of File Name using Process

In this embodiment, the administrator 8 sets the file name of a CSV file in which the acquired data is to be stored. The administrator 8 may set the file name of the CSV file by coloring the registration sheet.

Figure 17:
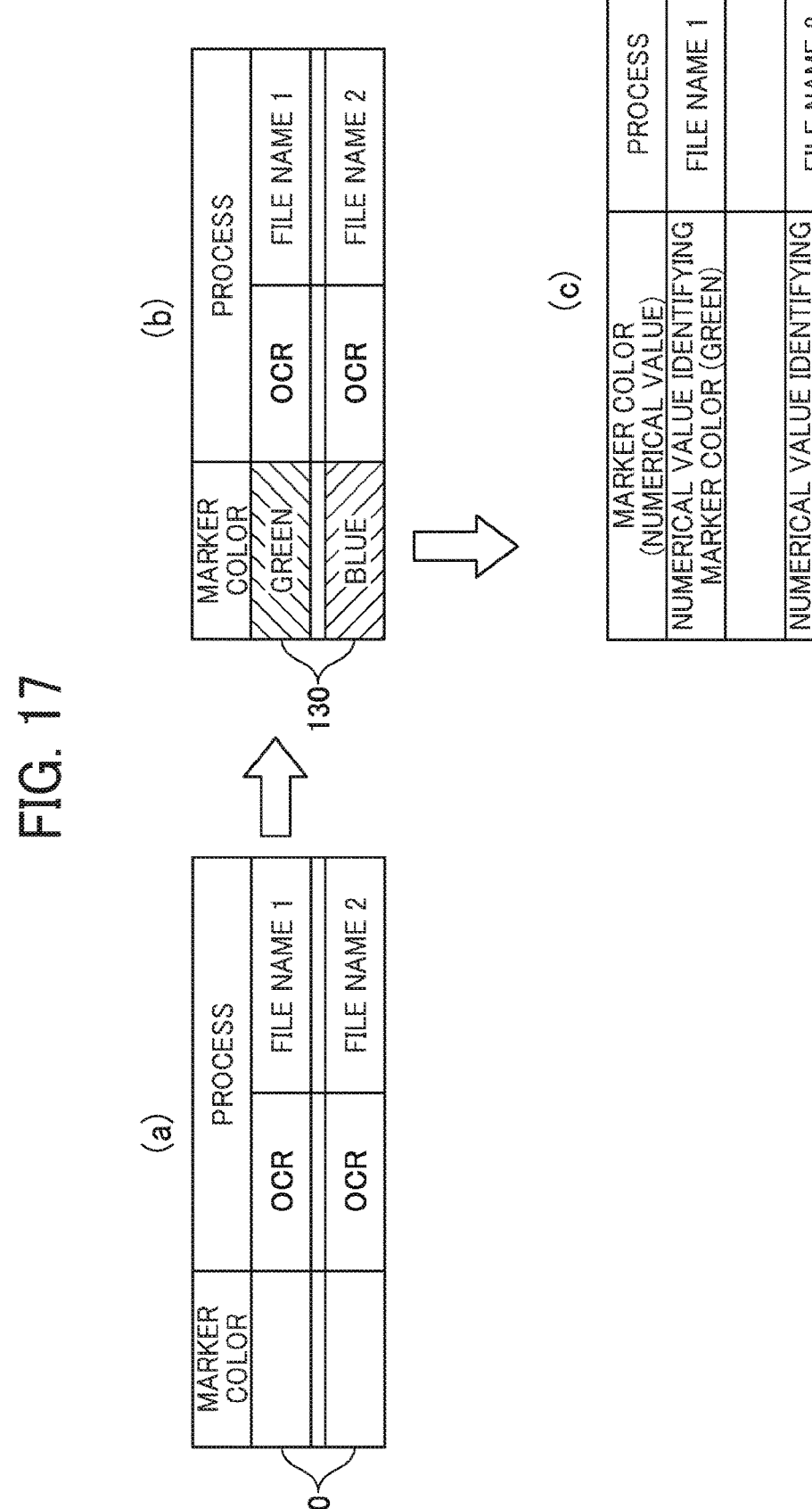
FIG. 17 is a view illustrating an example of use of a registration sheet in which a process is applied to the setting of a file name according to the first embodiment.

FIG. 17 illustrates an example of use of a registration sheet in which a process is applied to the setting of a file name. In FIG. 17, the process is limited to OCR, and the data storing unit 66 is enabled to use a plurality of pieces of acquired data for file names. The administrator 8 colors the registration sheet with colors of marker pens to be designated for the respective file names. In the registration sheet illustrated in FIG. 17(a), OCR is set as a process, and the order of use for the file names, that is, "File name 1" and "File name 2", is set.

As illustrated in FIG. 17(b), the administrator 8 uses marker pens to designate the color (e.g., green) of the marker pen to be used for File name 1 and the color (e.g., blue) of the marker pen to be used for File name 2.

As illustrated in FIG. 17(c), a numerical value indicating a color and a process (to be used for a file name) are associated with each other in the setting file. Two methods are conceivable for associating colors with processes.

In a first method, information indicating whether to associate the coordinates (in the registration sheet) at which a color is acquired and the process obtained from the coordinates is stored in the information processing system 10 in advance. The color extracted at the coordinates (X coordinates: 100, 200; Y coordinates: 1, 50) is associated with file name 1. The color extracted at the coordinates (X coordinates: 100, 200; Y coordinates: 51, 100) is associated with file name 2.

Figure 18:
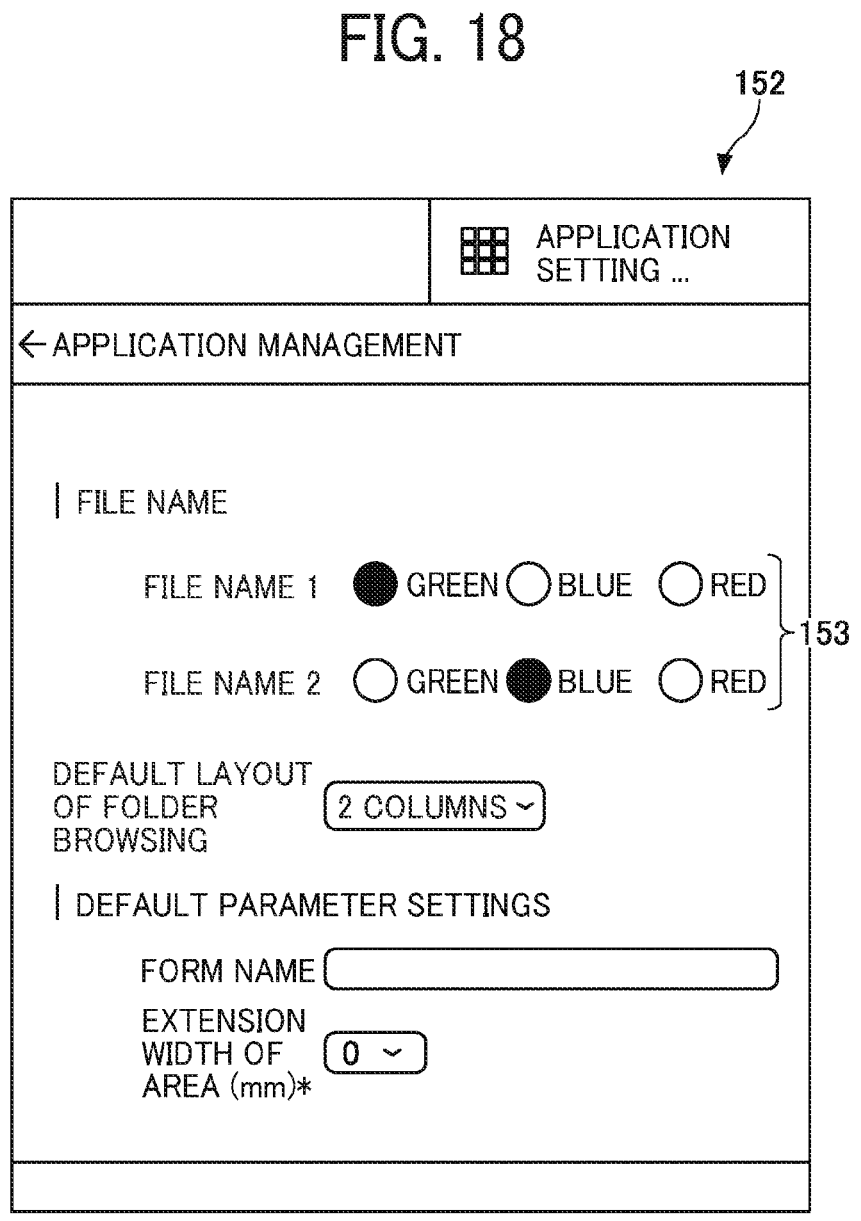
FIG. 18 is a view illustrating an example of a management site according to the first embodiment.

In a second method, the administrator 8 associates colors with processes on a management site. FIG. 18 illustrates an example of a management site 152 for associating a color with a process. The administrator 8 can use radio buttons 153 to register colors to be used to designate file names. In the illustrated example, the user uses three marker pen colors.

In either method, as illustrated in FIG. 17(*c*), a numerical value identifying the marker color (green) and File name 1 are associated with each other. A numerical value identifying the marker color (blue) and File name 2 are associated with each other. File names 1 and 2 indicate the order of use for the file names.

FIGS. 19A and 19B illustrate an example of a form in which the administrator 8 designates two areas using marker pens. FIG. 19A illustrates the original of the form, and FIG. 19B illustrates the form colored with marker pens. The device 20 scans the form illustrated in FIG. 19B, and the information processing system 10 identifies the colored areas in the form and registers area information in the setting file.

In FIG. 19B, the "expense claim form" area, which is the title of the form, is designated by a green marker pen, and the area corresponding to the application date is designated by a blue marker pen. For example, when the application date is "2020/10/10", the file name of the CSV file obtained when the form illustrated in FIG. 19B is scanned by the device 20 is "expense claim form20201010.csv". Three or more marker pen colors may be used to specify file names.

The order of areas to be used for file names (file 1, file 2) may not necessarily be registered. In this case, the data storing unit 66 sets the file names in the order of registration of the colors in the setting file. As a result, colors of marker pens are not changed from cell to cell of the registration sheet.

Modification of Registration Sheet

As illustrated in FIG. 20, a CSV position may be registered in advance in the registration sheet. FIG. 20 illustrates a modification of the registration sheet. FIG. 20(*a*) illustrates the registration sheet before coloring is applied. The registration sheet includes columns of a CSV column name 154 and a CSV position 155, and the administrator 8 does not manually set a CSV position in the setting file.

FIG. 20(*b*) illustrates the registration sheet after coloring is applied. The registration sheet illustrated in FIG. 20(*b*) is scanned by the device 20.

FIG. 20(*c*) illustrates a portion of a setting file in which colors, processes, and area information are associated with each other.

Registration of Area Information

Next, registration of the area information will be described with reference to FIGS. 21A to 21C and the like. FIGS. 21A to 21C illustrate a method for marking areas in a form. FIG. 21A illustrates the form (original) before areas are designated using marker pens. The administrator 8 designates, on the original of the form, an area on which a process registered in the registration sheet is to be executed, using a marker pen of a registered color. For example, the administrator 8 is to set OCR for the title area 140, OMR for the preliminary application area 141, and trimming for the remarks area 142.

FIG. 21B illustrates a form sheet on which areas are colored with colors of marker pens. The title area 140 representing "expense claim form", which is the title of the form, is colored with a green marker pen. The preliminary application area 141 is colored with a blue marker pen.

The remarks area 142 located in the lower portion of the form is colored with a red marker pen. The device 20 scans the form sheet to register the relationship between the areas of the form and the processes in the setting file.

According to the setting file presented in Table 4, the OCR processing unit 68 performs OCR processing on the title area 140 representing "expense claim form", which is the title of the form, to generate acquired data. The OMR processing unit 71 performs OMR processing on the preliminary application area 141 to generate acquired data. The trimming processing unit 72 performs trimming on the remarks area 142 to generate acquired data (e.g., "I apologize for late application"). The acquired data obtained by trimming is image data (such as JPEG, Graphic Interchange Format (GIF), PNG, TIFF, or BMP data).

FIG. 21C illustrates an example of a form with items filled in by the user. From the colored areas illustrated in FIG. 21B, "expense claim form", "preliminary application applicable", and "I apologize for late application" are acquired data.

As illustrated in FIG. 22A, the areas may not necessarily be filled in with colors. In FIG. 22A, circle lines 602 surrounding areas are drawn with a marker pen. The area detection unit 65 detects pixels other than black and white and detects rectangles circumscribing the pixels other than black and white (the circle lines 602).

The method for marking areas is not limited to the method illustrated in FIGS. 21A to 21C or 22A and 22B. For example, an area may be designated by a double line or an area may be designated within a range surrounded by a predetermined symbol such as %, $, or # or by a predetermined shape such as a triangle.

As illustrated in FIG. 22B, one form may include a plurality of areas colored with the same color. For example, as illustrated in FIG. 22B, in response to the administrator 8 designating areas 143 of data in the form using a green marker pen, all of the areas 143 are subjected to OCR processing.

Then, the administrator 8 presses the form registration button 113 illustrated in FIG. 14. The administrator 8 logs in to the information processing system 10 from the device 20 and selects the form registration button 113.

Figure 23A:
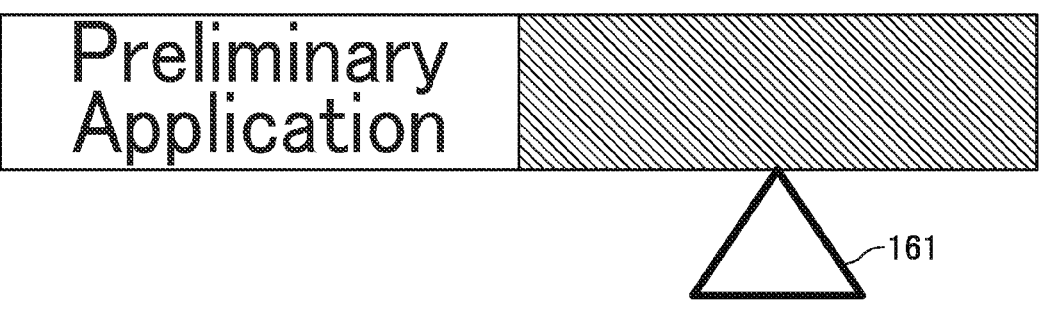
FIG. 23A is a view illustrating a comparative example of a method for designating an area in a form according to the first embodiment.
Figure 23B:
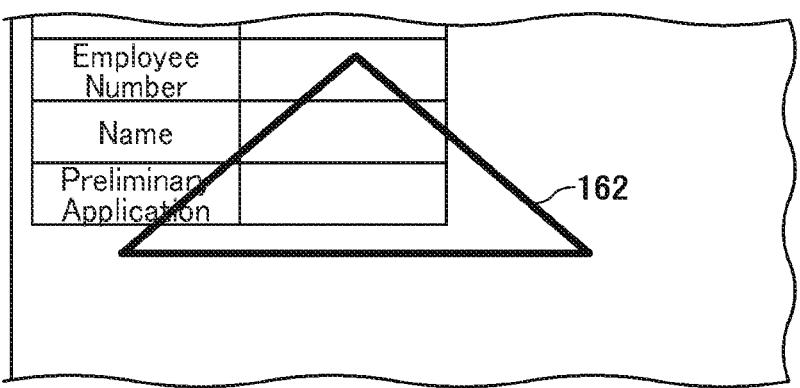
FIG. 23B is a view illustrating a comparative example of a method for designating an area in a form according to the first embodiment.

The effect of the administrator 8 filling in an area with a color to designate the area will be described with reference to FIGS. 23A and 23B. FIGS. 23A and 23B illustrate comparative examples of a method for designating an area in a form.

FIG. 23A illustrates a designation method in which the administrator 8 colors an area with a marker pen and adds a triangle mark 161 to the colored area by handwriting. This method, however, is a waste of time.

FIG. 23B illustrates a designation method in which the administrator 8 handwrites a triangle mark 162 so as to surround an area using a marker pen. This method, however, fails to completely determine an area and involves complicated processing for recognizing the area. For example, after recognizing the triangle mark 162, the information processing system 10 recognizes the area indicated by the rectangle.

In contrast, coloring (filling in) an area with a marking pen enables the administrator 8 to perform "designation of an area" and "designation of a process" at the same time in a simple way.

Designation of an area: a shape, such as a rectangle

Designation of a process: a feature other than shapes, such as a color

Area Registration Screen

Figure 24:
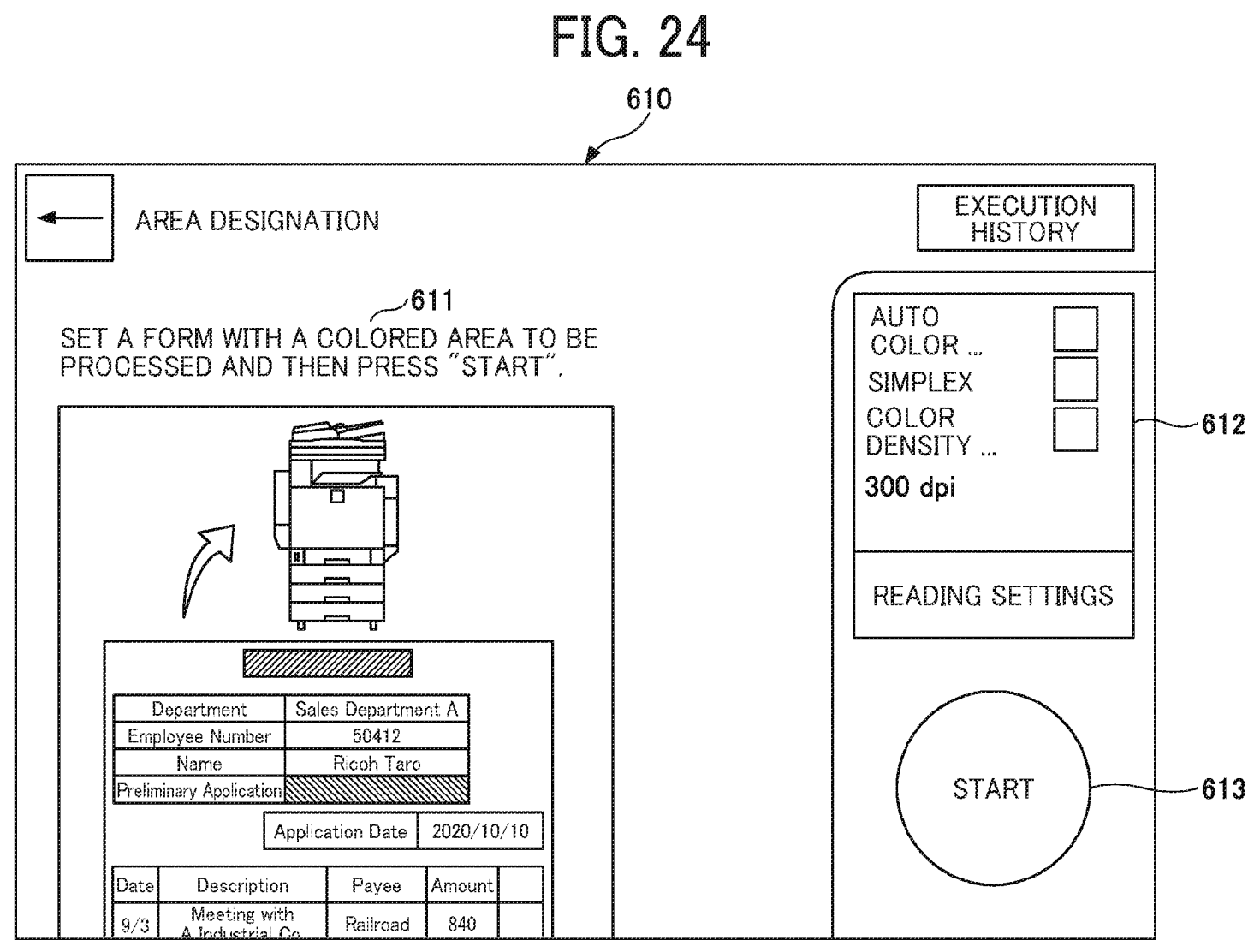

FIG. 24 illustrates an example of an area registration screen 610 displayed on the device 20 upon registration of area information. The area registration screen 610 includes a message 611 indicating "Set a form with a colored area to be processed and then press 'start'", a reading settings field 612, and a start button 613. The user sets a document (form) on the contact glass and presses the start button 613. The user may set reading conditions, such as color/monochrome, simplex/duplex, orientation, and resolution, in the reading settings field 612, as appropriate. The color/monochrome setting may be fixed to color to prevent the user from erroneously setting monochrome.

The administrator 8 may be able to designate the file name of the setting file from the area registration screen 610 illustrated in FIG. 24. This facilitates searching for the setting file from the external service system 40. In addition, the administrator 8 may be able to set the folder for storing the setting file.

Figure 25:
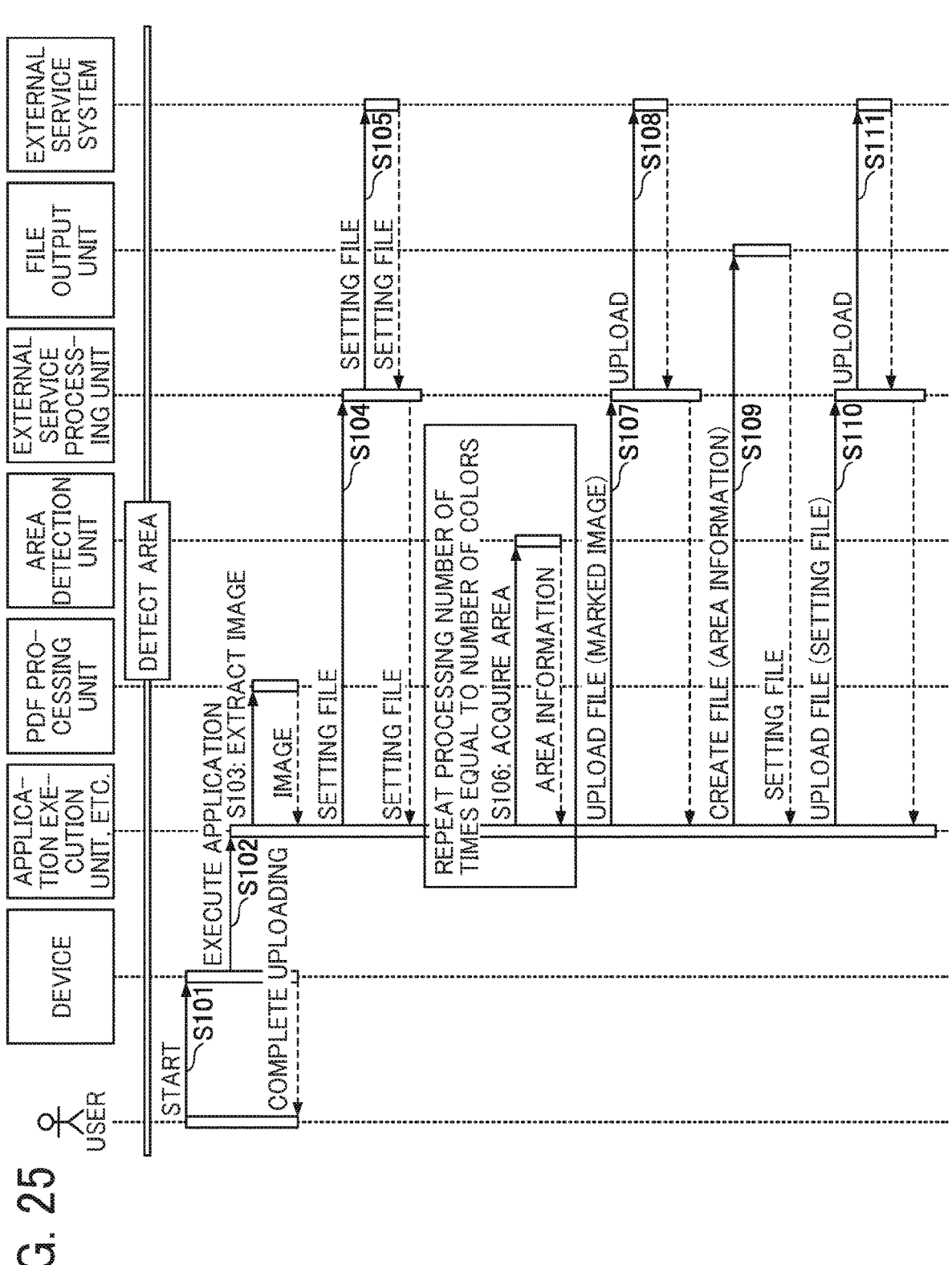
FIG. 25 is a sequence chart illustrating an example procedure for the information processing system to acquire area information from a form with an area marked by the administrator and create a setting file according to the first embodiment.

FIG. 25 is a sequence chart illustrating an example procedure for the information processing system 10 to acquire area information from a form with an area marked by the administrator 8 and create a setting file.

S101: The administrator 8 operates the device 20 to log in to the information processing system 10, and presses the form registration button 113 in the administrator menu 118. Accordingly, the display control unit 22 of the device 20 displays the area registration screen 610. The administrator 8 places the form with the marked area on the contact glass and presses the start button 613. The image data generation unit 24 generates image data of the form and converts the image data into a PDF file.

S102: The second communication unit 21 of the device 20 transmits the PDF file to the information processing system 10 together with a request for executing the application corresponding to the form registration button 113.

S103: The communication unit 19 of the information processing system 10 receives the PDF file. The application execution unit 46 designates the application ID of the application corresponding to the form registration button 113 and requests the input/output processing unit 48 to execute the application. The input/output processing unit 48 refers to the application processing information 53 associated with the application ID of the application corresponding to the form registration button 113 and executes the application. First, the input/output processing unit 48 designates the PDF file and requests the PDF processing unit 64 to extract image data. The PDF processing unit 64 extracts the image data of the form from the PDF file.

S104: To determine a color to be extracted from the image data, the application execution unit 46 requests the external service processing unit 62 to provide a setting file.

S105: The external service processing unit 62 acquires, from the external service system 40, a setting file that can be acquired using the authentication information of the admin-istrator 8. The administrator 8 may select a desired setting file from a list of setting files.

S106: Then, the input/output processing unit 48 designates a marker color registered in the image data and the setting file and requests the area detection unit 65 to acquire an area. The area detection unit 65 acquires an area from the image data, based on the color of the image data.

FIGS. 26A to 26C illustrate detection of an area from the image data. As illustrated in FIG. 26A, a colored portion 601 designated with a marker pen has a color corresponding to the marker pen. For example, in the HSV color space, the range of red is H=(0 to 60° , 301 to 360°), the range of green is H=(61 to 180°), and the range of blue is H=(181 to 300°).

For example, the area detection unit 65 searches the image data for a color included in the range H of the marker color in the setting file. The area detection unit 65 detects only a continuous colored area having an area greater than or equal to a certain value. This prevents detection of a portion erroneously colored by the user.

FIG. 26B illustrates the detected colored portion 601. The area detection unit 65 sets a rectangle 620 circumscribing the detected colored portion 601. Then, the area detection unit 65 sets margins on the upper, lower, left, and right sides of the circumscribing rectangle 620 and determines an area 621 including the margins. In FIG. 26B, margins of a (in mm) are set to the left and right, and margins of b (in mm) are set to the top and bottom. The margins are set to avoid a position shift or the like caused when the device 20 reads a form. In FIG. 26B, the coordinates of an upper left corner 622 are the start point X coordinate and the start point Y coordinate of the area information, and the coordinates of a lower right corner 623 are the end point X coordinate and the end point Y coordinate of the area information.

As illustrated in FIG. 26C, the area detection unit 65 may detect a box line 625 outside the colored portion 601 detected based on the range H of the HSV color space. The area detection unit 65 searches for black pixels toward the outside of the colored portion 601 (the circumscribing rectangle 620) in the vertical direction, traces black pixels found, and determines that the box line 625 outside the colored portion 601 has been detected in response to the initially found black pixel being reached. This enables detection of the largest area in which data is to be written, and enables the area identifying unit 67 to easily identify the data even if a position shift or the like occurs when the device 20 reads a form.

The administrator 8 can set, for example, how much margin the area detection unit 65 provides for an area to be identified with a marker pen. The details will be described with reference to an association screen 640-2 illustrated in FIG. 31. The area detection unit 65 sets area information based on the settings of the association screen 640-2.

Referring back to FIG. 25, the operation will still be described. S107: Then, the input/output processing unit 48 designates the image data for which the area is designated with a marker pen, and requests the external service processing unit 62 to upload the image data to the external service system 40.

S108: The external service processing unit 62 acquires, from the user management unit 44, authentication information of the administrator 8 for the external service system 40. As a result, the external service processing unit 62 logs in to the external service system 40, and stores the image data in the top folder of the administrator 8 (or a folder designated by the administrator 8). If the administrator 8 designates the file name of the setting file on the area registration screen 610, the external service processing unit 62 assigns the same file name to the file of the image data. If no file name is set, the current date and time or the like is used as the file name.

S109: Then, the input/output processing unit 48 designates the area information detected by the area detection unit 65 and requests the data storing unit 66 to create a setting file. The data storing unit 66 arranges the area information in a determined column of a CSV file to generate a setting file. At this time, Table 4 contains information in the columns A to G.

S110: Then, the input/output processing unit 48 designates the setting file and requests the external service processing unit 62 to upload the setting file to the external service system 40.

S111: The external service processing unit 62, which has logged in to the external service system 40, stores the setting file (by overwriting old data) in the top folder of the administrator 8 (or a folder designated by the administrator 8). Since the image data and the setting file have the same file name, the administrator 8 can easily determine from which image data the setting file is generated.

Registration of Other Information in Setting File

Figure 27:
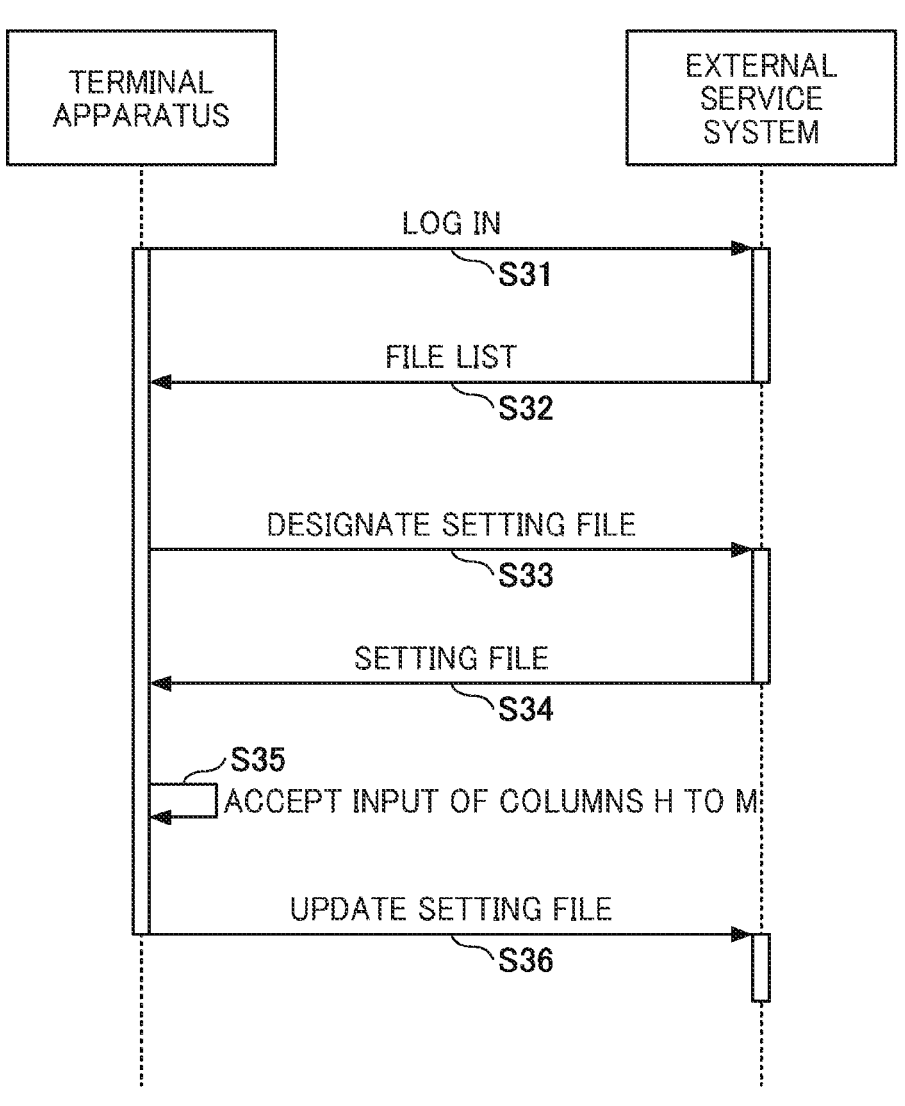
FIG. 27 is a sequence chart illustrating an example procedure for the administrator to set information in columns H to M of the setting file according to the first embodiment.

The setting of the columns H to M of the setting file (Table 4) will be described with reference to FIGS. 27 and 28. FIG. 27 is a sequence chart illustrating an example procedure for the administrator 8 to set information in the columns H to M of the setting file.

S31: After registering the setting file in the external service system 40, the administrator 8 operates the terminal apparatus 30 and connects the terminal apparatus 30 to the external service system 40. The administrator 8 inputs their authentication information and logs in to the external service system 40.

S32: The external service system 40, which is a storage service, transmits a list of files registered by the administrator 8 to the terminal apparatus 30. For example, a list of files in the top folder is transmitted. If no file is contained in the top folder, the administrator 8 designates a hierarchy. The list of files also includes the setting file and the file of the image data registered by the administrator 8 from the device 20.

S33: The administrator 8 selects a setting file to check the content of the setting file or set information in the columns H to M. The operation acceptance unit 33 of the terminal apparatus 30 accepts the selection, and the first communication unit 31 designates the file ID of the setting file and sends a request for the setting file to the external service system 40.

S34: The communication unit 19 of the external service system 40 receives the request for the setting file and transmits the setting file to the terminal apparatus 30.

S35: The administrator 8 checks the content of the setting file and sets information in the columns H to M. The operation acceptance unit 33 of the terminal apparatus 30 accepts the settings.

S36: For example, in response to the administrator 8 performing an operation of uploading the setting file, the first communication unit 31 transmits the setting file in which information is set in the columns H to M to the information processing system 10.

As described above, the setting file is registered in the external service system 40.

FIG. 28 illustrates a correspondence between a setting file and a form. As described in Table 4, the administrator 8 sets the format, the CSV column name, the CSV position (column), the CSV position (row), the OCR language, and the order of use for a file name. Not all of the columns may be set by the administrator 8. The designation of the columns H to M is ignored depending on the content of the process in the column C.

In the example illustrated in FIG. 28, the data acquired from the area information with ID=1 corresponds to "document name" in the CSV column name. The item "document name" is used first in the file name. The data acquired from the area information with ID=2 corresponds to "preliminary application" in the CSV column name. Since the CSV position indicating the preliminary application is set to column 3 and row 2, the data acquired from the area information with ID=2 is written to the third column and second row of the file. The data acquired from the area information with ID=3 corresponds to "remarks" in the CSV column name. Since the CSV position indicating the remarks is set to column 4 and row 2, the data acquired from the area information with ID=3 is written to the fourth column and second row of the file.

Association between Application and Setting File

Figure 29:
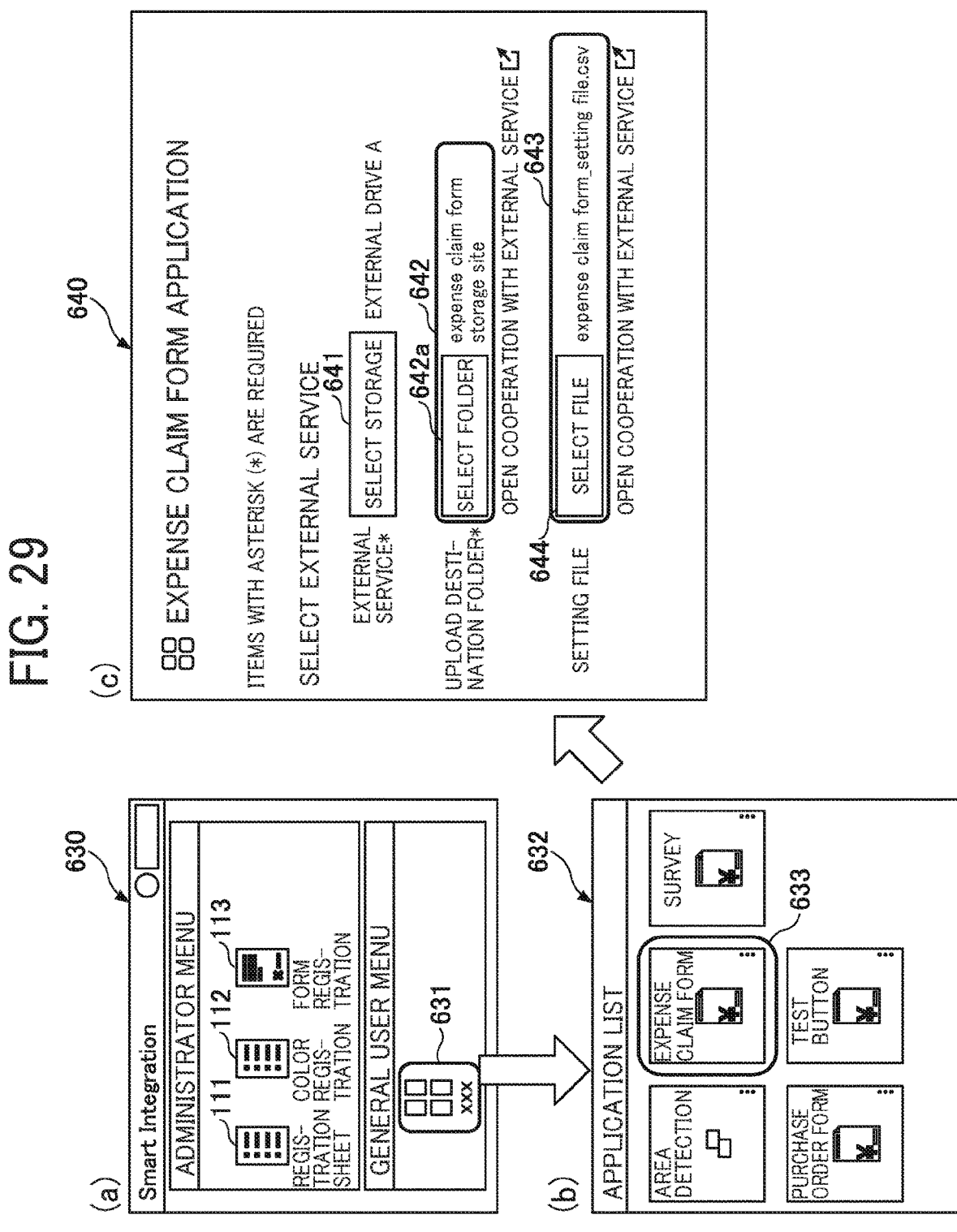
FIG. 29 is a view illustrating an example of screens displayed on the terminal apparatus for associating an application and a setting file with each other according to the first embodiment.

Next, the association between an application and a setting file will be described with reference to FIGS. 29 and 30. FIG. 29 illustrates an example of screens displayed on the terminal apparatus 30 for associating an application and a setting file with each other. The administrator 8 operates the terminal apparatus 30 and causes the terminal apparatus 30 to communicate with the information processing system 10.

FIG. 29(a) illustrates an initial screen 630 displayed in response to the administrator 8 logging in to the information processing system 10. An operation menu permitted for the administrator 8 is displayed. To associate an application with a setting file, the administrator 8 selects an icon 631 for displaying a list of applications.

As presented in Table 2, since applications available to each user and external service system information are registered in the user management unit 44, the information processing system 10 can provide, to the terminal apparatus 30, a list of applications available to the administrator 8 for each external service system 40.

FIG. 29(b) illustrates an example of an application list screen 632. The application list screen 632 displays a list of applications available to the administrator 8. The administrator 8 selects, from the application list screen 632, an application 633 (e.g., an expense claim form application) to be associated with a setting file 9 registered in the external service system 40. In response to the operation acceptance unit 33 accepting the selection of the application 633, an association screen 640 illustrated in FIG. 29(c) is displayed. The association screen 640 includes an external service system selection field 641, an upload destination folder field 642, and a setting file field 643.

The external service system selection field 641 is a field for the administrator 8 to set the external service system 40 as the storage location of a file to which data acquired from the area is to be written. Accordingly, the administrator 8 can change the external service system 40 associated with the application in advance or set a new external service system 40.

The upload destination folder field 642 is a field for the administrator 8 to set a folder for storing the file to which data acquired from the area is to be written in the external service system 40. In response to the administrator 8 pressing a folder selection button 642a, the information processing system 10 logs in to the external service system 40 using the authentication information of the administrator 8 for the external service system 40, and the top folder accessible to the administrator 8 in the external service system 40 is displayed on the terminal apparatus 30. The administrator 8 can select any folder.

The setting file field 643 is a field for the administrator 8 to select a setting file to be associated with the application. In response to the administrator 8 pressing a file selection button 644, the information processing system 10 logs in to the external service system 40 using the authentication information of the administrator 8 for the external service system 40, and the top folder accessible to the administrator 8 in the external service system 40 is displayed on the terminal apparatus 30. The top folder (or a folder set by the administrator 8) includes a setting file registered by the information processing system 10 and updated by the administrator 8. If the top folder does not include the setting file, the administrator 8 can search for the setting file from a folder below the top folder.

Figure 30:
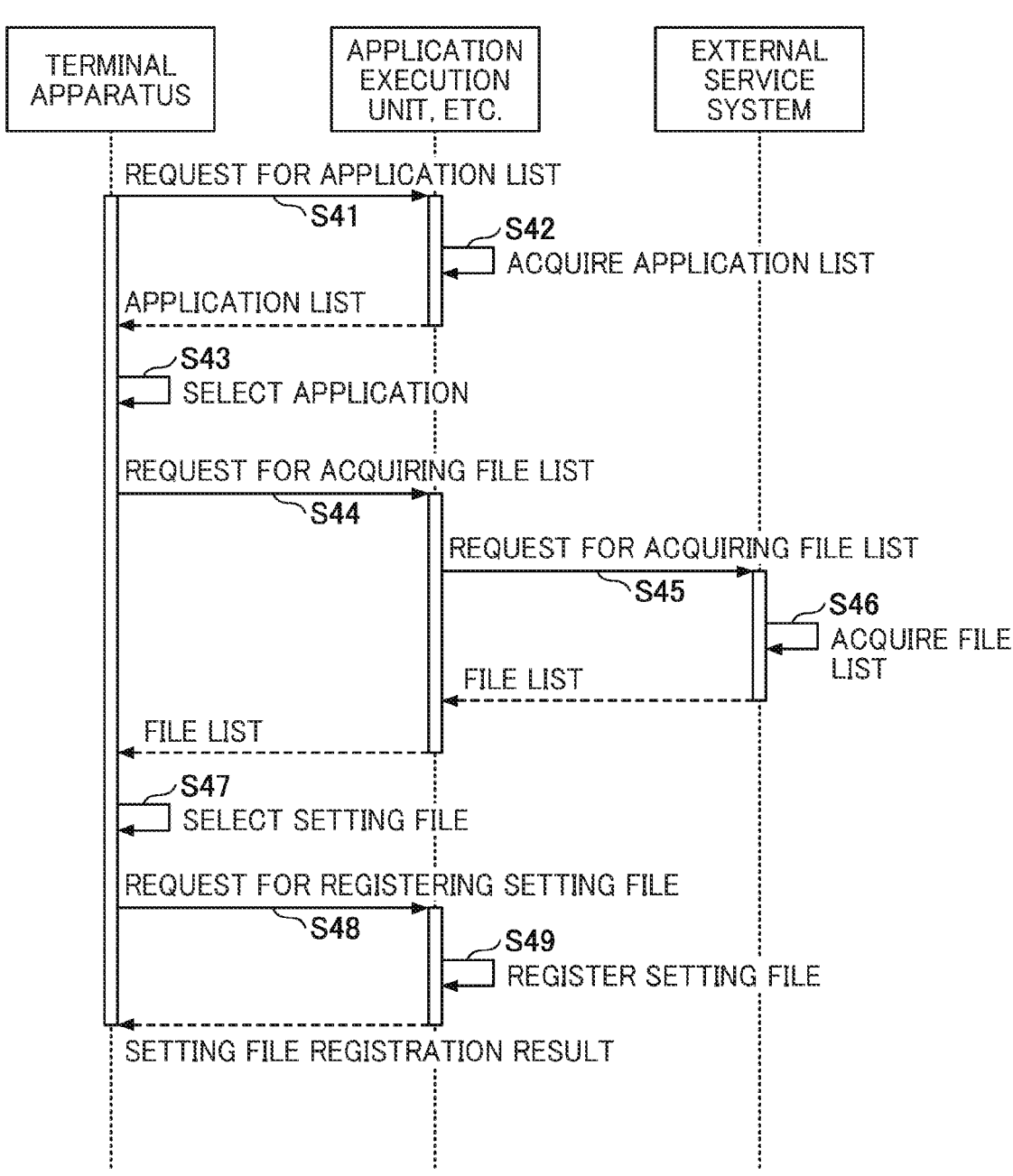
FIG. 30 is a sequence chart illustrating an example process for the administrator to associate an application with a setting file according to the first embodiment.

FIG. 30 is a sequence chart illustrating an example process for the administrator 8 to associate an application with a setting file via the screens illustrated in FIG. 29. The process illustrated in FIG. 30 starts when the screen illustrated in FIG. 29(a) is displayed.

S41: The administrator 8 logs in to the information processing system 10 and inputs an operation of displaying a list of applications from the initial screen 630 to the terminal apparatus 30. The operation acceptance unit 33 of the terminal apparatus 30 accepts the operation, and the first communication unit 31 sends a request for a list of applications to the information processing system 10.

S42: The communication unit 19 of the information processing system 10 receives the request for a list of applications, and the terminal screen providing unit 42 acquires, from the user management unit 44, an application associated with the user ID of the administrator 8. The terminal screen providing unit 42 creates screen information of an application list screen including an application available to the administrator 8 for each external service system 40. The communication unit 19 transmits the screen information of the application list screen to the terminal apparatus 30.

S43: The administrator 8 selects an application to be associated with a setting file. The operation acceptance unit 33 of the terminal apparatus 30 accepts the selection. After that, as described above, the terminal apparatus 30 displays the association screen 640.

S44: The administrator 8 presses the file selection button 644 on the association screen 640. The operation acceptance unit 33 accepts the pressing, and the first communication unit 31 transmits to the information processing system 10 a request for a list of files stored in the external service system 40 set on the association screen 640.

S45: The communication unit 19 of the information processing system 10 receives the request for the list of files, and the application execution unit 46 designates the external service system 40 and causes the input/output processing unit 48 to make a request for the list of files. The input/output processing unit 48 sends a request for the list of files to the external service processing unit 62 corresponding to the external service system 40. The external service processing unit 62 acquires, from the user management unit 44, the authentication information of the administrator 8 for the external service system 40 associated with the application or set by the user on the association screen, and transmits a request for the list of files to the external service system 40.

S46: The external service system 40 permits the login of the administrator 8 based on the authentication information of the administrator 8, and acquires a list of files associated with the administrator 8. The list of files is transmitted to the terminal apparatus 30. In the process illustrated in FIG. 30, the external service system 40 that stores the setting file and the external service system 40 that stores the file of the data acquired from the area are the same. However, both external service systems 40 may be different. In a case where both external service systems 40 are different, after selecting a setting file, the administrator 8 changes the external service system 40 on the association screen 640.

S47: The display control unit 32 of the terminal apparatus 30 displays the list of files. The administrator 8 selects a setting file to be associated with the application. The operation acceptance unit 33 of the terminal apparatus 30 accepts the selection.

S48: The first communication unit 31 of the terminal apparatus 30 designates the identification information of the setting file, the identification information of the application, the external service system 40, and the upload destination folder, and transmits a request for associating the setting file with the application to the information processing system 10.

S49: The communication unit 19 of the information processing system 10 receives the request for associating the setting file with the application, and the application data management unit 41 registers the setting file and the application in the application data 43 in association with each other. That is, the application data management unit 41 registers the pieces of information in the "applicationId", "applicationName", "fileId", "filename", and "Upload destination folder" field in association with each other (see Table 3). The external service system 40 is registered in the application processing information 53.

As described above, the application and the setting file are associated with each other. After that, the general user can output data of an area of the form to a file simply by pressing the icon from the device 20.

While FIG. 30 illustrates a method in which the administrator 8 associates an application with area information on the association screen 640, an application and area information may be associated with each other upon registration of the area information.

In this case, for example, the area registration screen 610 illustrated in FIG. 24 displays a field for entering an application name. The administrator 8 enters the application name of an application to be associated with a setting file. After the setting file is created, the information processing system 10 can associate the application having the entered application name with the setting file. That is, in response to the administrator 8 setting an application name and causing a form to be read, a setting file is generated, and the source file and the setting file are associated with each other.

The administrator 8 can set the extension width of the area on the association screen 640 illustrated in FIG. 29(c). FIG. 31 illustrates a modification of the association screen 640. The difference between the association screen 640 illustrated in FIG. 29(c) and the association screen 640-2 illustrated in FIG. 31 will mainly be described.

The association screen 640-2 illustrated in FIG. 31 further includes a field 645 for setting the extension width of the area. The administrator 8 can set, in the field 645 for setting the extension width of the area, how much the area information (OCR area) is to be extended from the area identified with the marker pen. As a result, the area indicated by the area information in Table 4 is wider than the area colored with the marker pen. The OCR processing unit 68 can perform OCR processing on the characters in the area even when the area designated by the administrator 8 with the marker pen is narrower than the area to be marked or the user writes outside the area of the form.

However, without being limited to this example, the administrator 8 may set, on the association screen 640-2, whether the area is limited to the inside of borders given by a marker (e.g., when the OCR area is surrounded by marker lines, a portion corresponding to the marker lines is excluded from the area) or whether the area includes a portion corresponding to the marker lines.

In addition, the color, the pen type, the shape, and the like to be used by the administrator 8 to designate an area may be accepted on the association screen 640-2. For example, the administrator 8 can perform setting such that the area is surrounded by a square using a yellow marker, circled with a red pen, or filled in with a green marker.

Copying of Application

Forms have various formats, and areas to be filled in with data by users are located in different places depending on the form. In this embodiment, the administrator 8 can register area information in accordance with the format of each form. A method for registering area information for each form will be described in context of copying of an application by the administrator 8.

Figure 32:
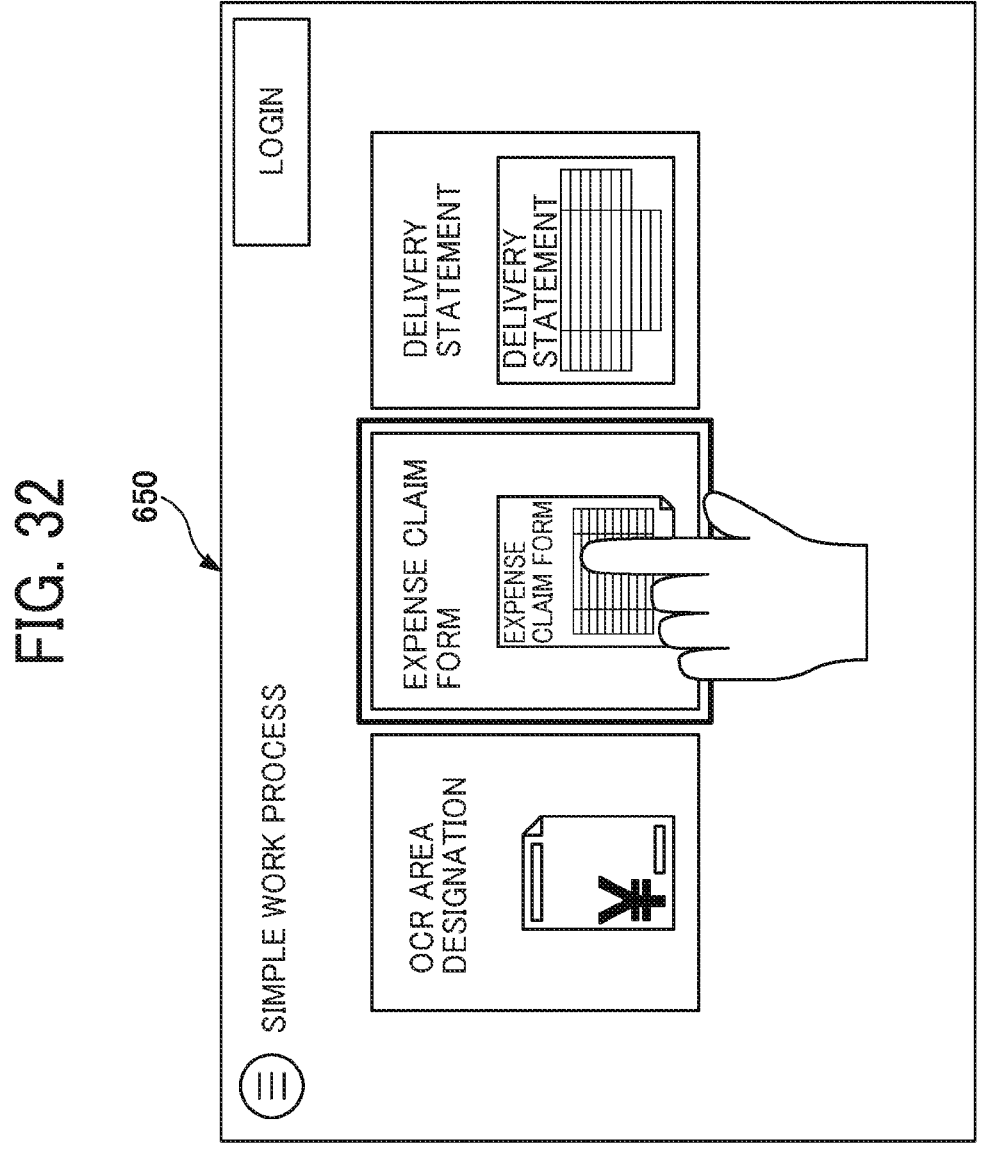
FIG. 32 is an example view illustrating a selection screen for several applications according to the first embodiment.

FIG. 32 illustrates a selection screen 650 for several applications. In one example, the applications include a specification application, a delivery statement application, and an OCR designation area application. The specification application is associated with area information of the specification in the application data 43, and the delivery statement application is associated with area information of the statement of payment. A user who desires to acquire data from an area of the specification can activate the specification application and scan the specification to output data of the expected area. A user who desires to acquire data from an area of the delivery statement can activate the delivery statement application and scan the statement of payment to output data of the expected area.

The processes to be performed by the respective applications are described in the application processing information 53. The process to be performed by the specification application and the process to be performed by the delivery statement application are executed by the same component although the storage locations of files, the upload destination folders, and the setting files are different. Accordingly, the administrator 8 copies the specification application or the delivery statement application, which allows the information processing system 10 to create an application corresponding to a desired form upon designation of an area, acquisition of an area, creation of a setting file, and association of the setting file with the copied application.

Figure 33:
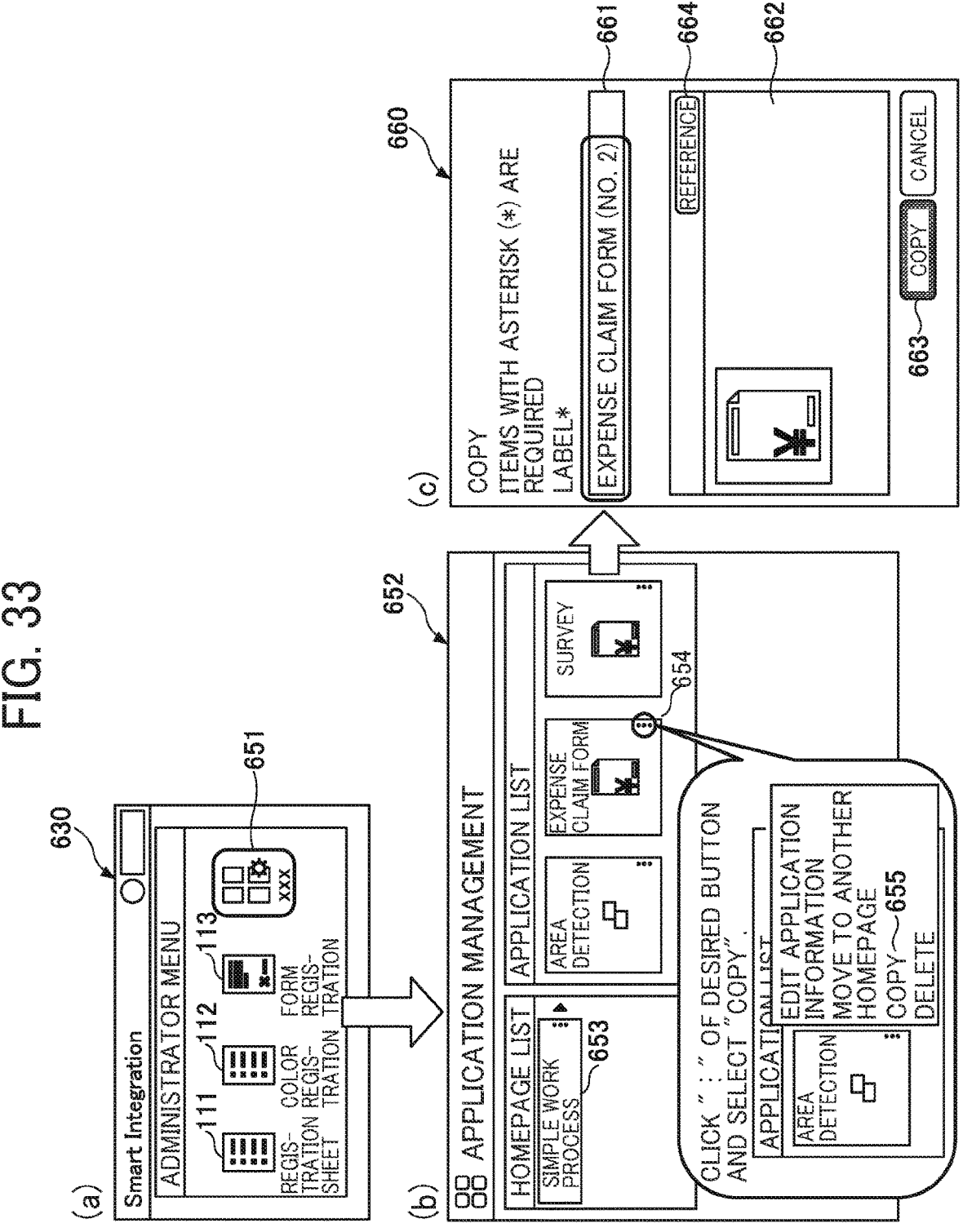
FIG. 33 is a view illustrating an example of screens operated by the administrator to copy an application according to the first embodiment.

Copying of an application will be described with reference to FIG. 33. FIG. 33 illustrates an example of screens operated by the administrator 8 to copy an application. FIG. 33(*a*) illustrates the initial screen 630 displayed on the terminal apparatus 30 in response to the administrator 8 logging in to the information processing system 10. The initial screen 630 displays a setting button 651 for the administrator 8 to perform various settings.

FIG. 33(*b*) illustrates an application management screen 652 displayed after the setting button 651 is pressed. The application management screen 652 displays a group name 653 of a group of several applications. The illustrated screen transition is an example for description, and any of the illustrated screens may be omitted or a new screen may be added.

A list of applications in the group is displayed to the right of the group name 653. The applications displayed in the list are applications that the administrator 8 is authorized to use. The applications include an application dedicated to the administrator 8, and an application to be used by other users. The administrator 8 presses a setting button 654 of an application from which a copy is created. In response to pressing of the setting button 654, a menu is displayed. The menu includes a "copy" button 655.

In response to the administrator 8 pressing the "copy" button 655, a copy application setting screen (pop-up screen) 660 illustrated in FIG. 33(*c*) is displayed. The copy application setting screen 660 includes an application name setting field 661, an icon list field 662, and a copy request button 663. In the application name setting field 661, the administrator 8 enters an application name for a new application created by copying. The application name may be any name, where the same application name is rejected or is followed by a number such as "(2)". The application name may also be referred to as an icon name or a setting name instead of the application name.

The icon list field 662 displays a list of icons. The administrator 8 can select a desired icon. Pressing a reference button 664 may cause another icon to be displayed. In response to the administrator 8 pressing the copy request button 663, the application ID, the application name, and the icon of the source application from which a copy is created are transmitted to the information processing system 10. The information processing system 10 receives the application ID, the application name, and the icon, and the application management unit 49 registers a new application by using the application processing information 53 and the screen information 54 of the source application. An application ID that does not overlap with the application IDs in the application processing information 53 is used, and an application name entered by the administrator 8 is set as the application name. The same screen information as the screen information 54 of the source application is used, but the icon is selected by the administrator 8. The "application processing information", "shared application", and "external service system" items are the same as those of the source application. For example, if the user is able to identify an application using the name of the application or the like, not all applications may be assigned different icons.

In this embodiment, the setting of a new image processing area is added to copy an application. Alternatively, the administrator 8 may perform setting of associating addition of a new image processing area with identification information for which selection is accepted by a device, by, instead of copying an application, adding a setting or adding an icon.

Figure 34:
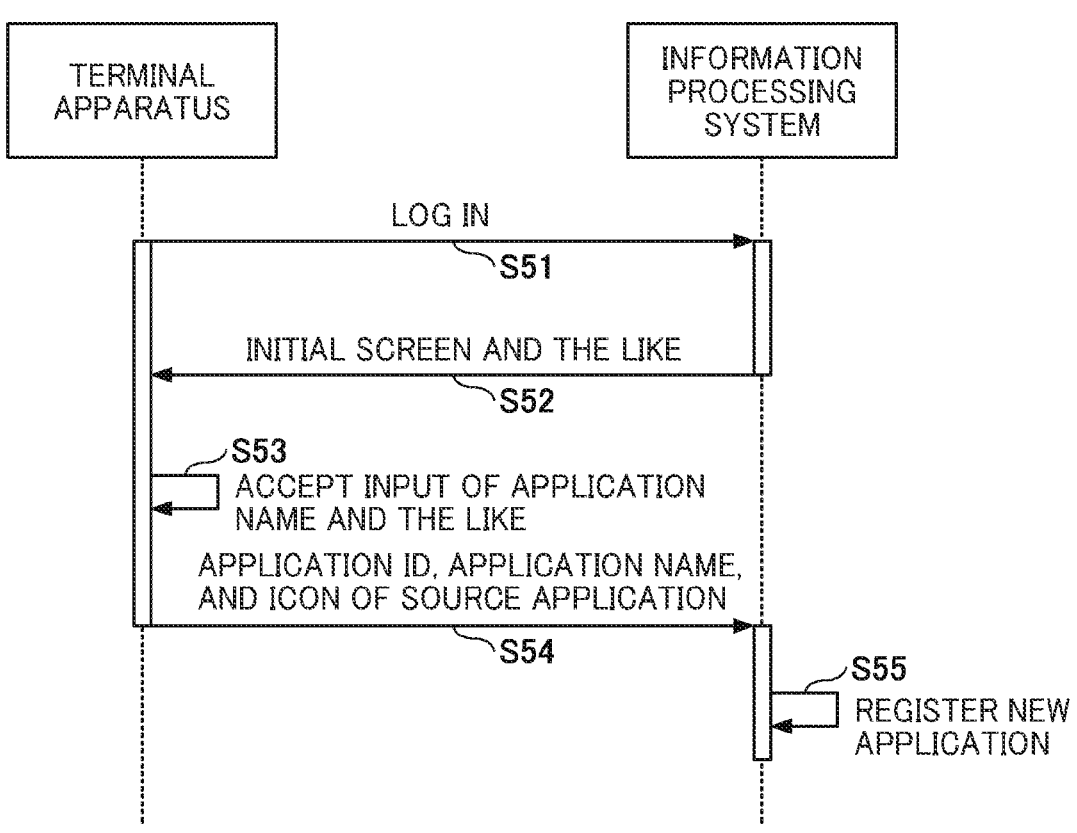
FIG. 34 is a sequence chart illustrating an example procedure for the information processing system to register a copied application according to the first embodiment.

FIG. 34 is a sequence chart illustrating an example procedure for the information processing system 10 to register a copied application.

S51: The administrator 8 inputs authentication information for the information processing system 10 to the terminal apparatus 30. The operation acceptance unit 33 of the terminal apparatus 30 accepts the input of the authentication information, and the first communication unit 31 transmits the authentication information to the information processing system 10. As a result, the administrator 8 logs in to the information processing system 10.

S52: In response to the login, the terminal screen providing unit 42 of the information processing system 10 transmits screen information of an initial screen to the terminal apparatus 30 via the communication unit 19. Then, in response to an operation by the administrator 8, the terminal screen providing unit 42 transmits screen information of the screens illustrated in FIG. 33 to the terminal apparatus 30.

S53: The administrator 8 inputs the application name and the like to the terminal apparatus 30, and the operation acceptance unit 33 accepts the input.

S54: The first communication unit 31 of the terminal apparatus 30 transmits the application ID, the application name, and the icon of the source application from which a copy is created to the information processing system 10.

S55: The communication unit 19 of the information processing system 10 receives the application ID, the application name, and the icon, and the application management unit 49 registers a new application by using the application processing information 53 and the screen information 54 of the source application.

As a result, the administrator 8 can copy the application. The administrator 8 can associate a setting file with the new application generated by copying and acquire data from a predetermined area of a desired form.

The administrator 8 can create a plurality of new applications from one source application, and the information processing system 10 can accept selection of different setting files for the plurality of new applications. Copying of an application is an example. In this embodiment, any identification information may be assigned to the same process flow. In some embodiments, addition of an icon or addition of a setting may be implemented to assign identification information to the same process flow.

Acquisition of Data from Form using Association between Application and Setting File After the association between the application and the setting file is completed, the user causes the device 20 to read the form. As a result, the information processing system 10 can acquire data from the form.

Figure 35:
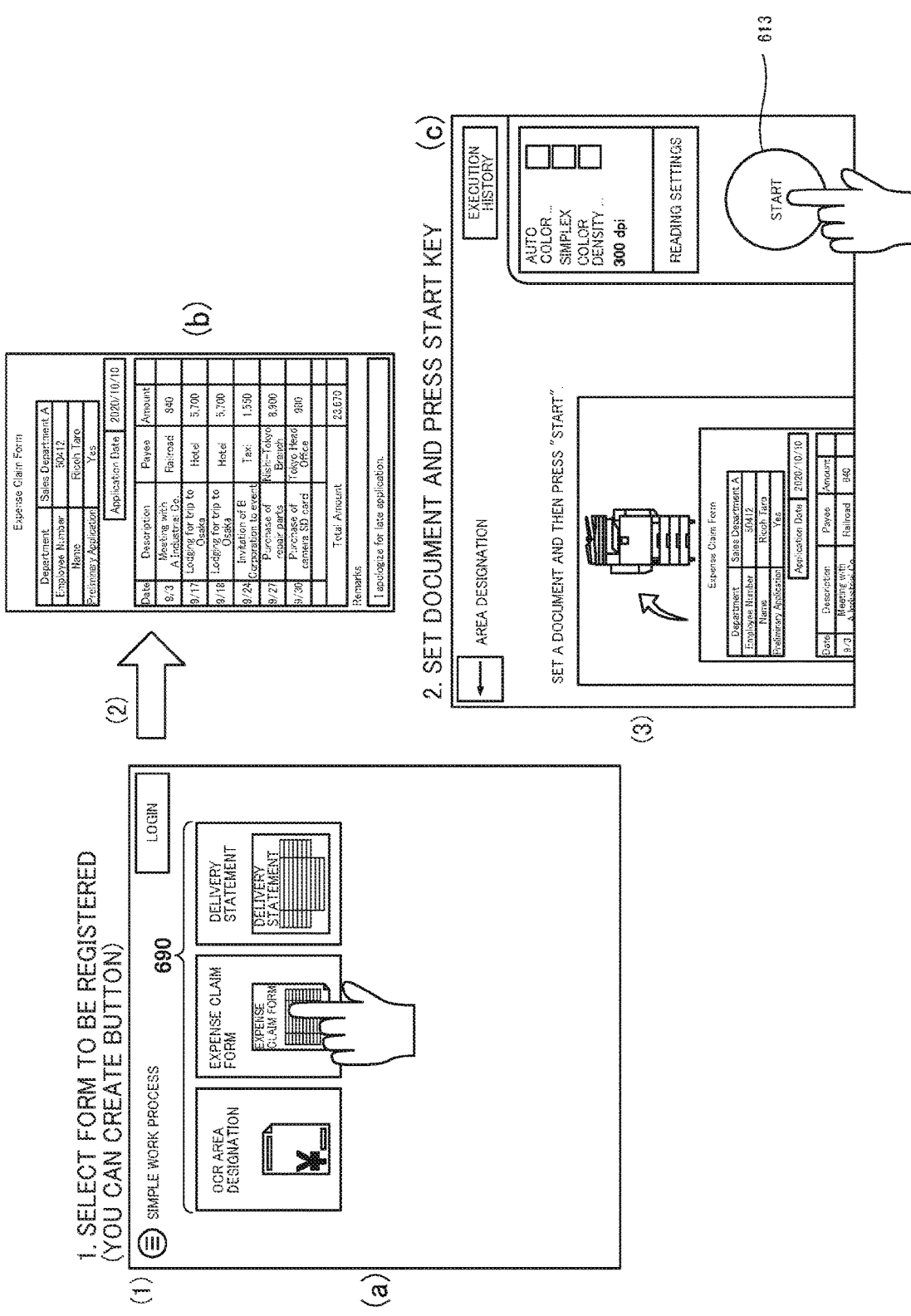
FIG. 35 is a view illustrating an example transition of screens displayed on the device according to the first embodiment.

Acquisition of data from a form will be described with reference to FIGS. 35 and 36. FIG. 35 illustrates an example transition of screens displayed on the device 20.

(1) As illustrated in FIG. 35(*a*), the user causes the device 20 to display an application list screen. For example, a user who desires to reimburse expenses selects the icon of the expense claim form application. While the user knows which form corresponds to which application, it is desirable that application names displayed on icons 690 of applications coincide with the names of forms (documents). The application names may also be referred to as icon names or setting names. That is, the icons 690 may include the names of forms. Further, the icons 690 may include thumbnails of the forms. This may prevent the user from selecting an icon that does not correspond to a form. Alternatively, in response to the user pressing one of the icons 690, the thumbnail of the corresponding form may be displayed. The user can check the pressed icon 690 by enlarging the thumbnail or displaying a portion of the thumbnail.

Each of the icons 690 may have an embedded link. The link includes, for example, a URL including the corresponding application ID or a URL associated with the corresponding application ID by the information processing system 10. The device 20 connects to the URL upon pressing of the icon 690 to notify the information processing system 10 of the corresponding application ID.

In response to the user selecting a form that does not correspond to any of the icons 690, the device 20 may provide a warning to the user. For example, the device 20 compares the image data of a read form with the image data associated with the icons 690. If the image data of the read form does not match the image data associated with any of the icons 690, the device 20 displays a message or the like to inquire of the user whether to continue the processing. The image data of the read form and the image data associated with the icons 690 may be compared by the information processing system 10. In one example method for comparison, the device 20 or the information processing system 10 performs pattern matching of the image data of the read form against the image data associated with the icons 690. In an alternative method, the device 20 or the information processing system 10 may compare an application ID printed on a barcode or the like on a form with the application IDs associated with the icons 690.

Alternatively, the user may select an icon, and the device 20 may transmit a character string such as an application ID or a setting number to the information processing system 10. That is, an application ID (identification information) may not necessarily be selected.

(2) When the device 20 is to scan an expense claim form, the user prepares the expense claim form (FIG. 35(*b*)). The expense claim form may be prepared by the user by handwriting or may be printed from the device 20. The expense claim form may not necessarily be printed by the user. Examples of such a document not printed by the user include an officially issued document and a document sent from another company.

(3) An application selected by the user displays a screen illustrated in FIG. 35(*c*), based on the screen information 54. The screen illustrated in FIG. 35(*c*) is the same as the area registration screen 610 illustrated in FIG. 24. The user sets a printed expense claim form on the contact glass and presses the start button 613 to cause the device 20 to read the expense claim form.

The image data of the form is transmitted to the information processing system 10, and a file is output through a process described below.

Figure 36:
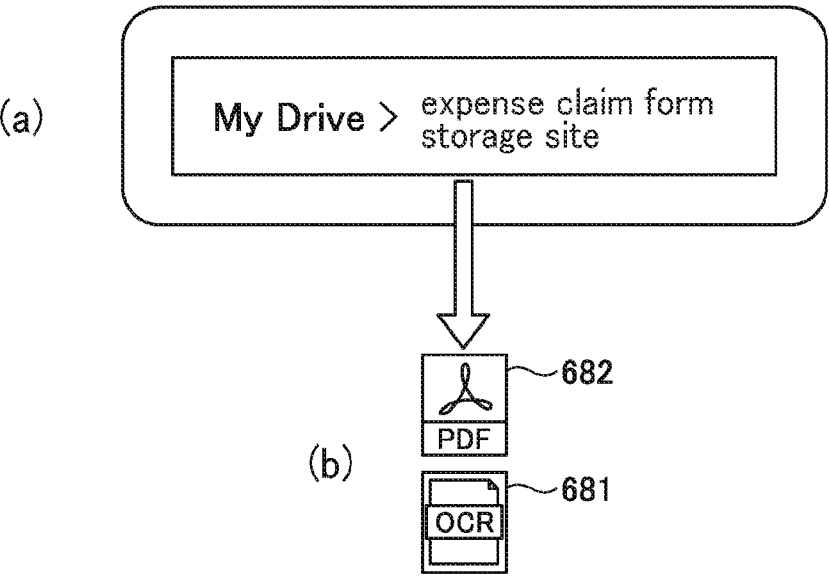
FIG. 36 is an example view illustrating a file stored in an external service system according to the first embodiment.

FIG. 36 illustrates a file stored in the external service system 40. FIG. 36(*a*) illustrates an example of an upload destination folder in the external service system 40. That is, the file output from the information processing system 10 is stored in the upload destination folder set by the administrator 8 on the association screen 640 illustrated in FIG. 29. The file hierarchy "My Drive>expense claim form storage site" in FIG. 36(*a*) is an example, and the administrator 8 can designate a folder for which the administrator 8 has the access right.

FIG. 36(*b*) illustrates two files to be stored in the upload destination folder. Two files are generated in a single read operation.

A. A CSV file 681 in which data acquired from an area of the form is to be stored.

B. A PDF file 682 including image data of the form.

A different CSV file is created by the same application each time a read operation is performed. The file is not overwritten with the latest one because file names with serial numbers or dates are used. However, the user may desire to add pieces of data acquired by the same application to the same CSV file even if the pieces of data are read at different timings. This method will be described below. Thus, once accessing one CSV file, a person in charge such as a general affairs clerk can perform reimbursement or other processing on the data of the employees.

Case Where Device Does Not Scan Form

In FIG. 35, the device 20 scans an expense claim form. The information processing system 10 may receive image data of the form from the terminal apparatus 30 or the like and acquire data from an area of the image data. In this case, the terminal apparatus 30 transmits the image data of the form to the information processing system 10 in the following way.

The user fills in items on an expense claim form displayed in a word processor operating on the terminal apparatus 30. Accordingly, the items are represented by character code. The user connects the terminal apparatus 30 to the information processing system 10 and logs in to the information processing system 10, and an application list is displayed on the terminal apparatus 30. A screen similar to the screen illustrated in FIG. 35(*a*) is displayed on the terminal apparatus 30, and the user selects a desired application. The terminal screen providing unit 42 of the information processing system 10 transmits to the terminal apparatus 30 screen information that can accept the expense claim form. In response to the user selecting a PDF file or the like including the image data of the expense claim form on the screen, the terminal apparatus 30 can transmit the PDF file to the information processing system 10.

As a result, the information processing system 10 can acquire data from the form without causing the user to print the form. In this case, the processing of the device 20 in the processes illustrated in FIGS. 37A and 37B is performed by the terminal apparatus 30.

Operation Procedure

Figure 37A:
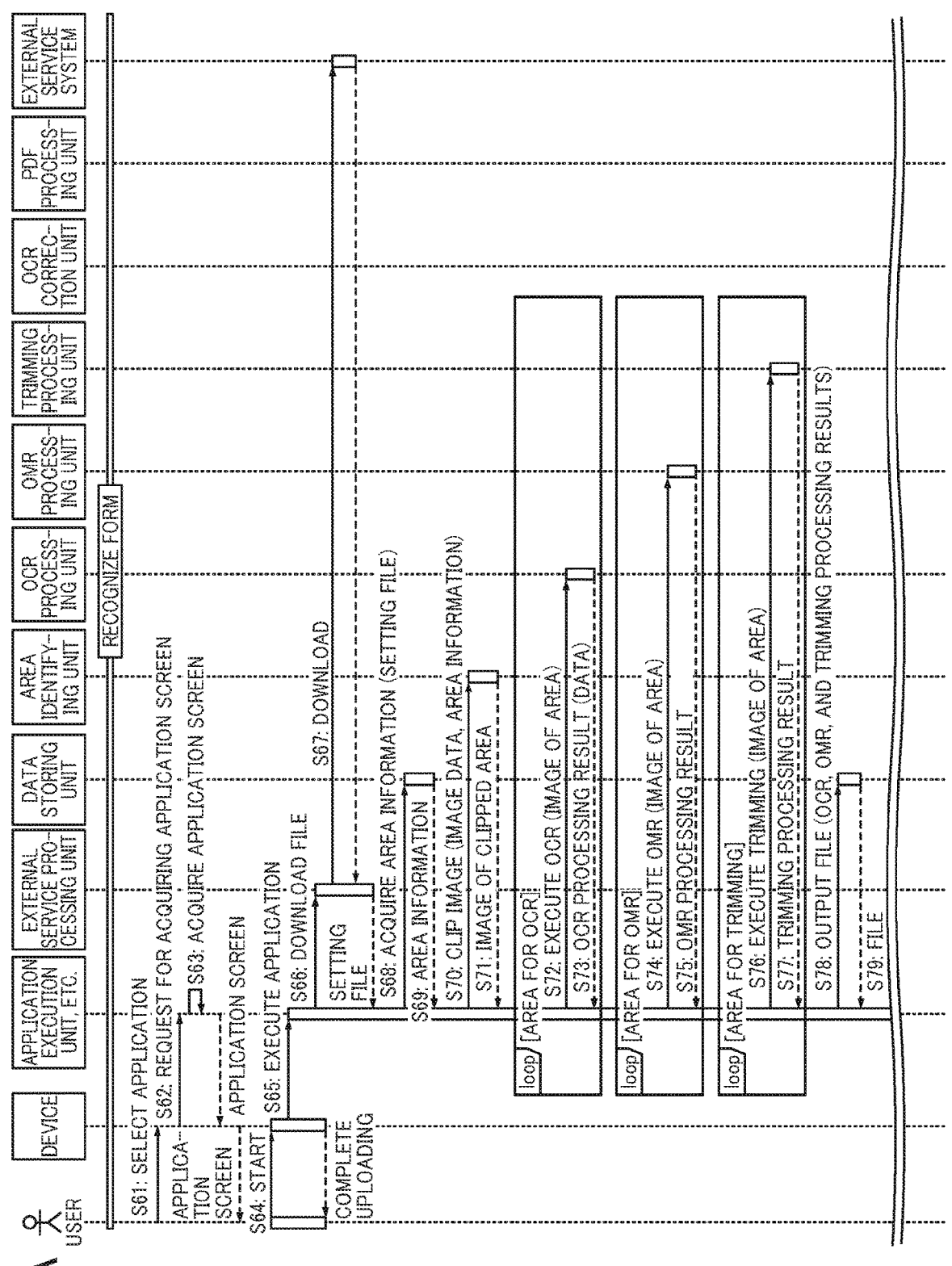
FIG. 37A is a sequence chart of an example procedure for the information processing system to receive a PDF file including image data of a form from the device and acquire data from an area of the form according to the first embodiment.
Figure 37B:
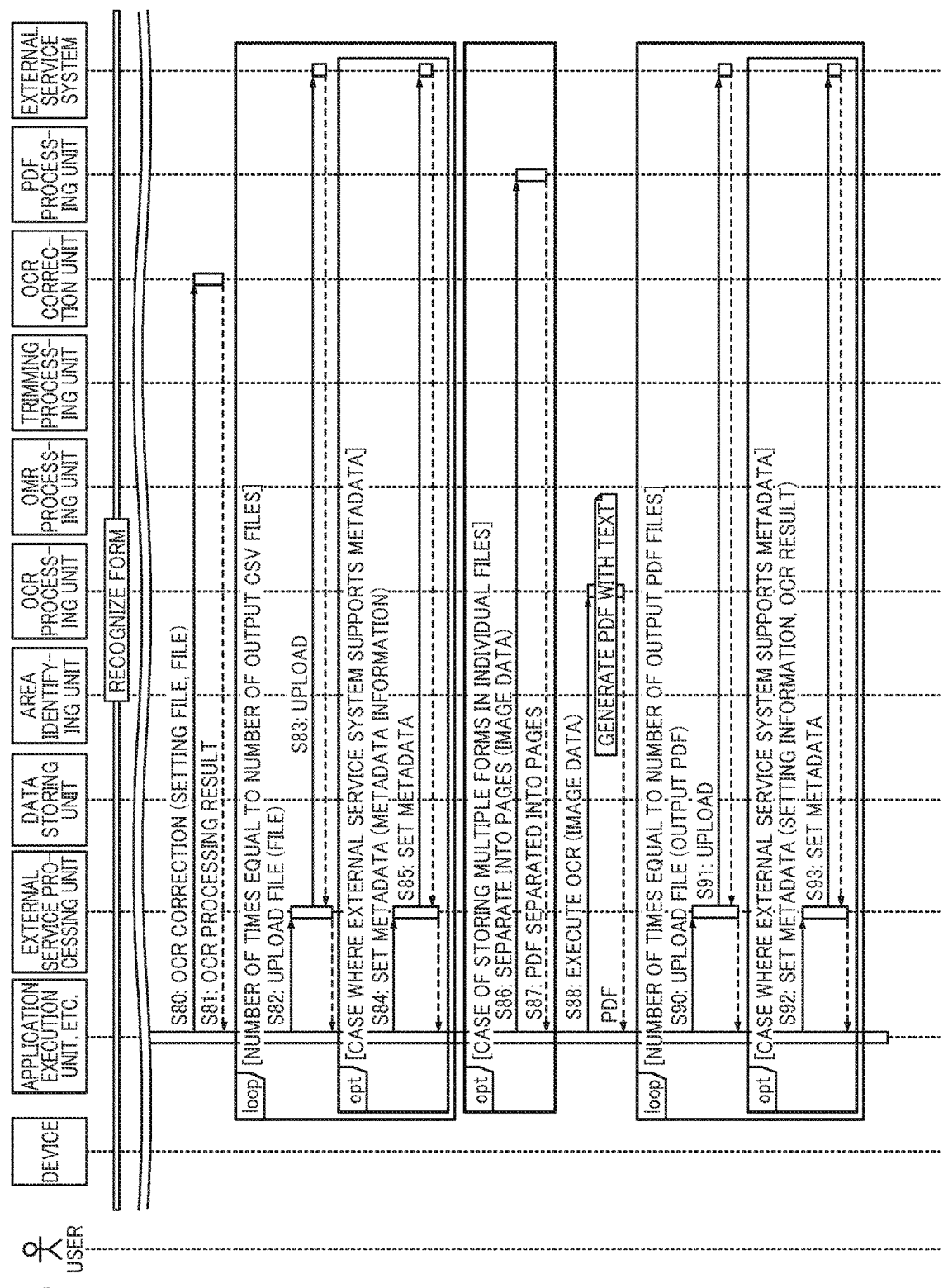
FIG. 37B is a sequence chart of an example procedure for the information processing system to receive a PDF file including image data of a form from the device and acquire data from an area of the form according to the first embodiment.

FIGS. 37A and 37B are sequence charts of an example procedure for the information processing system 10 to receive a PDF file including image data of a form from the device 20 and obtain acquired data from an area of the form.

S61: After printing the form, the user operates the device 20 to input their authentication information for the information processing system 10. The operation acceptance unit 23 of the device 20 accepts the input of the authentication information, and the second communication unit 21 transmits the authentication information to the information processing system 10. Accordingly, the user logs in to the information processing system 10. In response to the login, the display control unit 22 of the device 20 displays a list of applications that the user is authorized to use (FIG. 35(*a*)). For example, the user selects an application having an application name that coincides with the name of the printed form. The operation acceptance unit 23 accepts the selection.

S62: The second communication unit 21 of the device 20 designates an application ID and transmits an application screen acquisition request to the information processing system 10.

S63: The communication unit 19 of the information processing system 10 receives the application screen acquisition request, and the device screen providing unit 47 acquires, from the application management unit 49, the screen information 54 of the application identified by the application ID. Screen information of an application screen of the application is transmitted to the device 20. Accordingly, the display control unit 22 of the device 20 displays the application screen (FIG. 35(*c*)).

S64: The user sets the printed form on the contact glass and presses the start button 613. The operation acceptance unit 23 of the device 20 accepts the pressing, and the image data generation unit 24 generates image data of the form and converts the image data into a PDF file. A plurality of forms may be used.

S65: The second communication unit 21 of the device 20 designates the application ID of the application and the PDF file and requests the information processing system 10 to execute the application.

S66: The communication unit 19 of the information processing system 10 receives the request to execute the application, and the application execution unit 46 starts executing the application. The application execution unit 46 designates an application ID and requests the input/output service unit 16 to execute the application. The input/output service unit 16 acquires the application processing information 53 via the application management unit 49. As a result, the processing flow of the application is obtained. The input/output processing unit 48 further acquires the application data 43 associated with the application ID from the application data storage unit 13. Accordingly, the input/output processing unit 48 can identify the setting file associated with the application.

The input/output processing unit 48 requests the external service processing unit 62 to acquire a setting file, based on the application data 43 and the application processing information 53.

S67: The external service processing unit 62 connects to the URL in the "fileName" field registered in the application data 43 and acquires the setting file from the external service system 40. If the application for which execution is requested is not a shared application, the external service processing unit 62 logs in to the external service system 40 using the authentication information of the user for the external service system 40. When the application for which execution is requested is a shared application, the external service processing unit 62 logs in to the external service system 40 using the authentication information of the administrator 8 for the external service system 40.

S68: Then, the input/output processing unit 48 requests the data storing unit 66 to acquire area information from the setting file, based on the application processing information 53.

S69: The data storing unit 66 acquires all pieces of area information from predetermined rows and columns of the setting file and returns the acquired pieces of area information to the input/output processing unit 48. The pieces of area information are registered on a process by process basis, and as many pieces of area information as the number of processes are acquired.

S70: Then, the input/output processing unit 48 designates the image data and the area information, based on the application processing information 53, and requests the area identifying unit 67 to acquire (clip) an area from the image data.

S71: The area identifying unit 67 identifies and acquires a processing-target area designated by the area information from the image data, and returns a number of images of processing-target areas equal to the number of processes to the input/output processing unit 48. The area identifying unit 67 may not necessarily acquire (clip) processing-target areas to be subjected to OCR processing and OMR processing, from the image data. In this case, the OCR processing unit 68 and the OMR processing unit 71 perform OCR processing and OMR processing on the processing-target areas of the image data identified by the area information, respectively.

In response to a plurality of processing-target areas to be subjected to OCR processing, steps S72 and S73 are repeatedly executed the number of times equal to the number of processing-target areas.

S72: The input/output processing unit 48 designates an image of a processing-target area, based on the application processing information 53, and requests the OCR processing unit 68 to perform OCR processing on the processing-target area. At this time, the input/output processing unit 48 may designate the format and the OCR language acquired from the setting file in association with the processing-target area.

S73: The OCR processing unit 68 performs OCR processing on the processing-target area using a recognition engine supporting the format and the OCR language. The OCR processing unit 68 returns the data converted into character code data (OCR processing result) to the input/output processing unit 48.

The recognition engine is, for example, an identifier that learns the correspondence between images of characters and character code sets using training data including pairs of the images and the character code sets and that outputs an OCR processing result (character code data) from an image. Simple training data, such as training data including only Japanese text, training data including only English (alphabetic) text, training data including only numerical values, or training data including only dates, is used to increase the identification accuracy of the identifier. In contrast, use of training data including a plurality of types such as Japanese text, English (alphabetic) text, numerical values, and dates tends to decrease the identification accuracy although various types of data can be recognized. Accordingly, the OCR processing unit 68 can use a recognition engine supporting the format and the OCR language to improve the recognition accuracy.

As used herein, machine learning is a technique that enables a computer to acquire human-like learning ability. Machine learning refers to a technology in which a computer autonomously generates an algorithm to be used for determination such as data identification from training data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of those learning methods. Further, the recognition engine may not necessarily be generated by machine learning.

In response to a plurality of processing-target areas to be subjected to OMR processing, steps S74 and S75 are repeatedly executed the number of times equal to the number of processing-target areas.

S74: The input/output processing unit 48 designates an image of a processing-target area, based on the application processing information 53, and requests the OMR processing unit 71 to perform OMR processing on the processing-target area.

S75: The OMR processing unit 71 performs OMR processing on the processing-target area. The OMR processing unit 71 returns acquired data (OMR processing result), which is converted into information indicating the presence or absence of a mark, to the input/output processing unit 48.

In response to a plurality of processing-target areas to be subjected to trimming processing, steps S76 and S77 are repeatedly executed the number of times equal to the number of processing-target areas.

S76: The input/output processing unit 48 designates an image of a processing-target area, based on the application processing information 53, and requests the trimming processing unit 72 to perform trimming processing on the processing-target area.

S77: The trimming processing unit 72 performs trimming processing on the processing-target area. The trimming processing unit 72 returns image data (trimming processing result) to the input/output processing unit 48 as acquired data obtained from the processing-target area.

S78: Then, the input/output processing unit 48 designates the acquired data, the CSV column name, the CSV position, and the file name (acquired from the setting file), which are acquired from each processing-target area, based on the application processing information 53, and requests the data storing unit 66 to output a file including the acquired data.

S79: The data storing unit 66 writes the CSV column name to the beginning of the column, writes the acquired data to a cell of a CSV file designated by the CSV position, and returns the CSV file to the input/output processing unit 48. The CSV file is assigned a designated file name. The acquired data may not necessarily be output to a CSV file and may be output to a file in tabular format, a text file, or a file of any other application.

S80: Then, the input/output processing unit 48 designates the OCR processing result (CSV file), the format, and the OCR language, based on the application processing information 53, and requests the OCR correction unit 69 to correct the OCR processing result. The format is acquired from the setting file presented in Table 4 and is set by the administrator 8.

FIG. 38 illustrates correction of the OCR processing result. When the format is set in the setting file, the OCR correction unit 69 can correct the OCR processing result. As illustrated in FIG. 38, rules for designated character strings and converted characters are defined in the OCR correction unit 69. A conversion rule 2201 illustrated in FIG. 38 is a rule for the numeric format. For example, I, B, Z, which are not numeric, are corrected to 1, 8, and 2, respectively. A conversion rule 2202 illustrated in FIG. 38 is a rule for the alphabetic format. For example, 1, 2, and 8, which are not alphabetic, are corrected to I, Z, and B, respectively.

S81: Referring back to FIG. 37B, the OCR correction unit 69 returns the corrected OCR processing result (CSV file) to the input/output processing unit 48.

Steps S82 to S85 are executed the number of times equal to the number of CSV files. The number of CSV files to be created in a single read operation is one, regardless of the number of forms, or the same as the number of pages of the form. The number of CSV files to be created in a single read operation is set in the application.

S82: Then, the input/output processing unit 48 requests the external service processing unit 62 to upload the OCR processing result (CSV file), based on the application processing information 53. The upload destination folder is set in the application data 43.

S83: The external service processing unit 62 stores the CSV file in the upload destination folder in the external service system 40.

S84: If the metadata can be set, step S84 is executed. When the external service system 40 supports setting of metadata (items set by the user on an external service system, such as a character string and a date), the user can set the metadata to be associated with the CSV file to be uploaded. The user can input metadata from a screen displayed on the device 20. The input/output processing unit 48 requests the external service processing unit 62 to upload the metadata. The upload destination folder is the same as that of the CSV file.

S85: The external service processing unit 62 stores the metadata in the upload destination folder in the external service system 40.

S86: In response to a plurality of pieces of form data being read, some users may desire to store the plurality of pieces of form data in individual files. In this case, the input/output processing unit 48 sends a request together with the image data of the plurality of pages to the PDF processing unit 64 to separate the pages, based on the application processing information 53. This processing is optional. When this processing is omitted, the input/output processing unit 48 may store the plurality of pieces of data as a single file.

S87: The PDF processing unit 64 returns the PDF file decomposed into pages to the input/output processing unit 48.

S88: The input/output processing unit 48 designates a PDF file, based on the application processing information 53, and requests the OCR processing unit 68 to perform OCR processing.

S89: The OCR processing unit 68 performs OCR processing on the PDF file to generate character code data, and sets the character code data in the PDF file as transparent text.

Steps S90 to S93 are executed the number of times equal to the number of PDF files.

S90: The input/output processing unit 48 requests the external service processing unit 62 to upload the PDF file with text, based on the application processing information 53. The upload destination folder is set in the application data 43.

S91: The external service processing unit 62 stores the PDF file with text in the upload destination folder in the external service system 40.

S92: When the external service system 40 supports the metadata described above (items set by the user on an external service system, such as a character string and a date), the user can input the metadata from a screen displayed on the device 20. The input/output processing unit 48 requests the external service processing unit 62 to upload the metadata. The upload destination folder is the same as the PDF file.

S93: The external service processing unit 62 stores the metadata in the upload destination folder in the external service system 40.

As described above, the CSV file and the PDF file, which is different from the CSV file, are registered in the upload destination folder in the external service system 40.

In FIGS. 37A and 37B, the image data to be processed is a PDF file. Image data in any format such as JPEG, PNG, TIFF, or BMP may be to be processed.

In this embodiment, the device 20 is assumed to collectively scan and process a large volume of forms and the like. However, a form having the same format may be used by a user once, or the area to be processed may be changed each time a form having the same format is used. In this case, the registration of area information in a setting file is time-consuming to the administrator 8. Accordingly, the task of registering area information may be omitted, and areas of a form filled in by the user may be directly retouched and read by the device 20. The information processing system 10 performs a process on each area in accordance with the correspondence between colors and processes registered in the setting file.

Display of CSV File and PDF File Registered in External Service System

A person in charge of a company operates the terminal apparatus 30 and connects to the external service system 40 to calculate expenses or the like incurred by employees. The person in charge, who is notified of the upload destination folder, can acquire the CSV file and the PDF file using the terminal apparatus 30.

Figure 39:
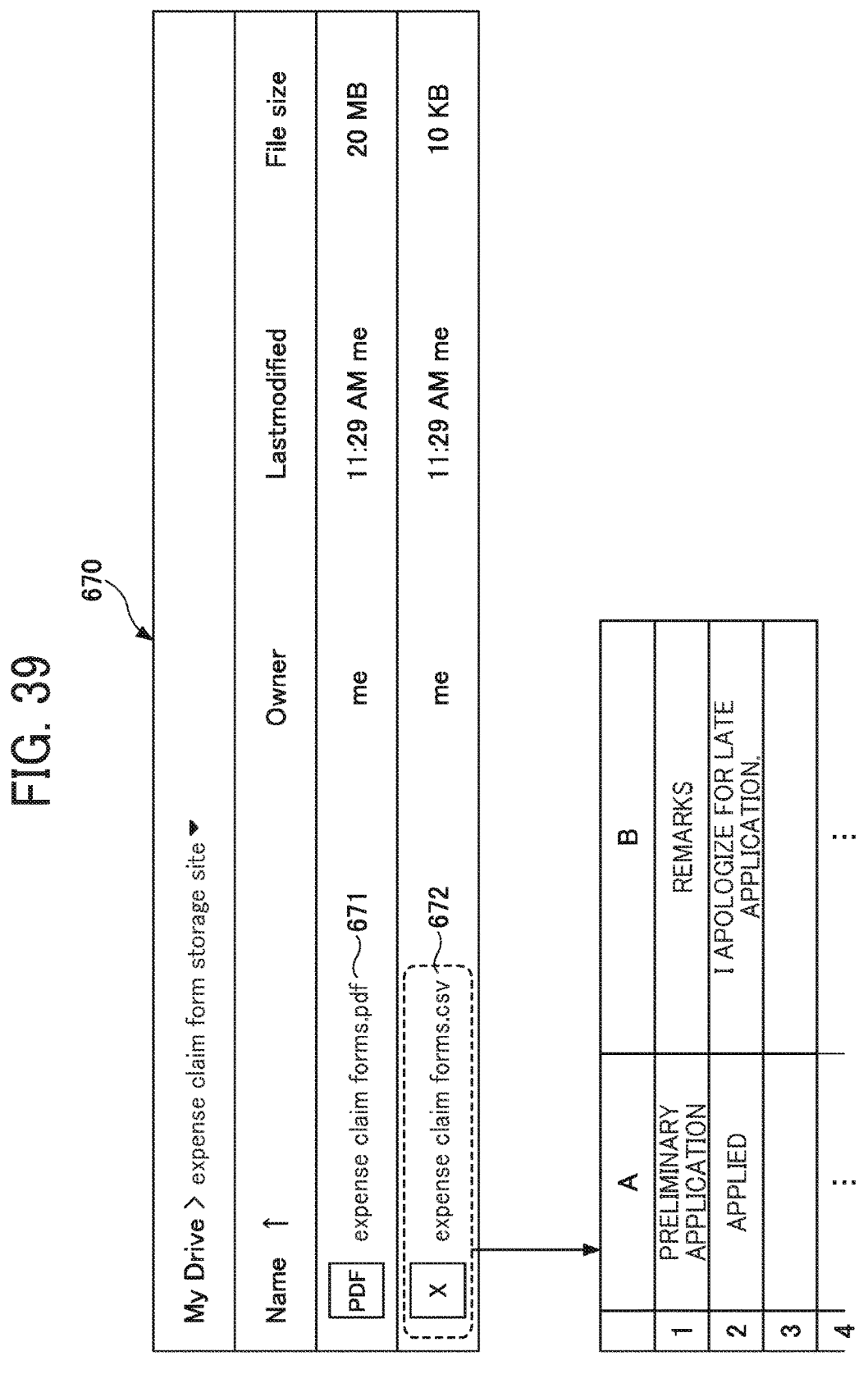
FIG. 39 is a view illustrating an example of a file list screen of the external service system, which is displayed on the terminal apparatus, according to the first embodiment.

FIG. 39 illustrates an example of a file list screen 670 of the external service system 40, which is displayed on the terminal apparatus 30. As illustrated in FIG. 39(a), a PDF file 671 and a CSV file 672 are stored in the upload destination folder. FIG. 39(b) illustrates the content of the CSV file 672 displayed on the terminal apparatus 30. That is, FIG. 39(b) illustrates data output from the form. In FIG. 39(b), data acquired from two areas is stored. Each column specifies a CSV column name set in the setting file, which allows the user to determine the data in the column.

As illustrated in FIG. 40, it is preferable that the device 20 also displays the processing result. FIG. 40 illustrates an example of an output data display screen 691 displayed on the device 20. The output data display screen 691 displays an application name 692 of an application that has been executed, and a list 693 of files output from the application. The application name 692 and the list 693 are transmitted from the information processing system 10 to the device 20. The CSV file includes the content of the CSV file, and the user clicks the CSV file to cause the device 20 to display data 694 acquired from the areas of the form and stored in the CSV file.

The user checks the file name and the data to determine whether the form has been processed correctly.

Case where Multiple Forms Are Read

A case where a plurality of forms are read in a single read operation will be described with reference to FIG. 41. FIG. 41 illustrates a plurality of forms and an output file. As illustrated in FIG. 41(a), a plurality of forms are read in a single read operation in response to execution of the application. A single read operation refers to one click of the start button 613. The device 20 sequentially reads the plurality of forms, and the information processing system 10 acquires a plurality of pieces of data from the same area in the image data of the respective forms.

FIG. 41(b) illustrates a CSV file obtained in response to a plurality of forms being read in a single read operation. The first row specifies data acquired from the first form, and the second row specifies data acquired from the second form. In this manner, the plurality of pieces of data of the plurality of forms are integrated into a single CSV file, which allows the person in charge to easily tabulate or graph the results.

When a plurality of forms are read in a single read operation, the data storing unit 66 increments the CSV position (start row) in the setting file one by one. That is, the data storing unit 66 may shift a row down for each form and write the data of the form in the row.

When a plurality of forms are read in a single read operation, the information processing system 10 may output a number of CSV files equal to the number of forms.

Alternatively, when a plurality of forms are read in a plurality of read operations (when a plurality of forms are read at different timings), the information processing system 10 may output data to the same CSV file. The CSV files may be merged by the external service system 40 or the information processing system 10.

In a case where CSV files are merged by the external service system 40, the external service processing unit 62 requests the external service system 40 to merge the CSV files. Since CSV files output from the same application have file names including the same character string (e.g., "expense claim form"), the external service processing unit 62 can designate a file name and request the external service system 40 to merge the CSV files. The external service system 40 adds data in column numbers of a requested CSV file to the corresponding column numbers of a stored CSV file.

In a case where CSV files are merged by the information processing system 10, the external service processing unit 62 designates a file name and downloads a CSV file from the external service system 40. The external service processing unit 62 adds data in column numbers of a newly created CSV file to the corresponding column numbers of the acquired CSV file. The external service processing unit 62 uploads a CSV file obtained by merging the CSV files to the external service system 40.

As described above, the information processing system 10 can acquire the same area from a plurality of pieces of received image data, the OCR processing unit 68 can perform OCR processing on the same area in the plurality of pieces of image data, and the data storing unit 66 can output a plurality of pieces of data generated from the same area in the plurality of pieces of image data to one file.

Advantages

As described above, the data output system 100 according to this embodiment enables the administrator 8 to associate a mark and a process with each other on a registration sheet using a marker pen. The device 20 reads a form with a marked area, and the information processing system 10 stores a process and area information for each form. Then, the information processing system 10 acquires an area from the image data of the form transmitted from the device 20, and performs a process set for the area. As a result, it is possible to easily create a file in which a specific area is extracted from a plurality of forms of the same type.

Second Embodiment

This embodiment presents an information processing system 10 for recognizing a different recognition target using OCR in accordance with the color of an area.

An overview of processes or operation performed by the data output system 100 will be described with reference to FIGS. 42, 43A, and 43B. In the description of FIGS. 42, 43A, and 43B, differences from FIGS. 1, 2A, and 2B will mainly be described.

In the processes illustrated in FIG. 42, the process (2) is different from that illustrated in FIG. 1.

(2) An administrator 8 of the data output system 100 prints a registration sheet registered in an information processing system 10 using a device 20, and colors the registration sheet with a color corresponding to a process using a marker pen. For example, the administrator 8 can associate processes with certain colors such that "OCR of Kanji characters" is associated with green, "OCR of dates" is associated with blue, and "OCR of alphanumeric characters" is associated with red. The device 20 scans a registration sheet to generate image data (first image data), and transmits the image data to the information processing system 10.

Next, a description will be given with reference to FIGS. 43A and 43B. FIG. 43A illustrates setting of area information in a form, and FIG. 43B illustrates acquisition of data from the form using the area information. The processes illustrated in FIGS. 43A and 43B are similar to the processes illustrated in FIGS. 2A and 2B, and differences therebetween will be described.

(4) The administrator 8 uses a form 7, which is usually used by users in the organization, and designates, with a marker pen, which of the processes (e.g., OCR of Kanji characters, OCR of dates, and OCR of alphanumeric characters) is to be performed on each area of the form 7.

The subsequent processes (5) to (11) may be similar to those illustrated in FIGS. 2A and 2B.

The data output system 100 according to this embodiment provides the advantages of the first embodiment and enables the administrator 8 to register more detailed content of a process and a mark (color). It is known that the recognition rate of OCR greatly varies depending on whether to limit the recognition targets. For example, when the OCR processing unit 68 performs OCR on the Japanese postal code mark " 〒 ", the mark may be incorrectly recognized as the character "T" unless it is understood in advance that the recognition target is the postal code. In this embodiment, a target to be recognized by OCR is set for each area, and OCR recognition accuracy can be improved.

While it is possible to adopt a method in which the administrator 8 uses a web site to set what is to be filled in an area of a form, this embodiment adopts a simple method in which the administrator 8 marks a registration sheet to set a target to be recognized by OCR for each area.

Supplementary Information Related to Correspondence between Color and Process The series of processes described with reference to FIGS. 42, 43A, and 43B will be divided into tasks 1 to 3 to provide supplementary information. FIG. 44 illustrates registration (task 1) of a correspondence between a color and a process using a registration sheet.

FIG. 44(*a*) illustrates the registration sheet before coloring is applied.

FIG. 44(*b*) illustrates the registration sheet after coloring is applied. The registration sheet illustrated in FIG. 44(*b*) is scanned by the device 20.

FIG. 44(*c*) illustrates a portion of a setting file in which colors and processes are associated with each other. Two methods are conceivable for associating colors with processes.

Figure 45:
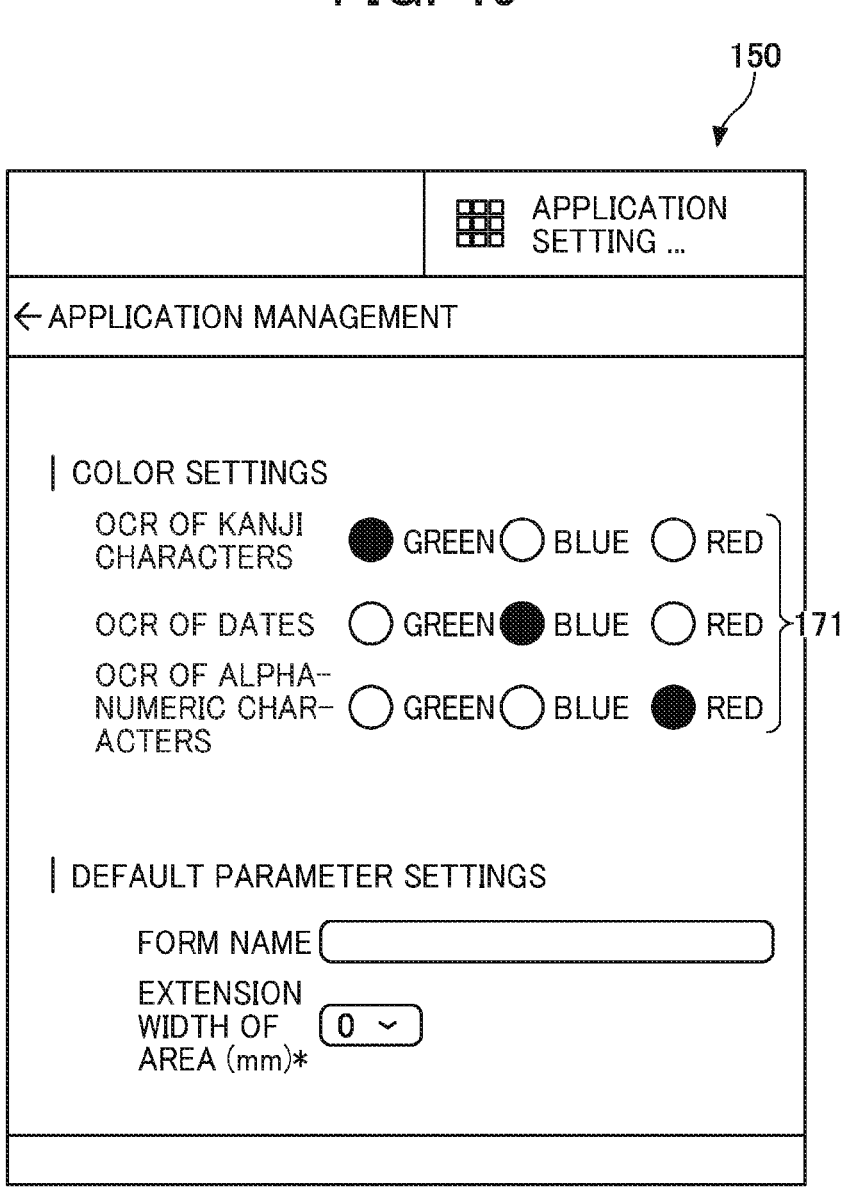
FIG. 45 is a view illustrating an example of a management site according to the second embodiment.

In a first method, information indicating whether to associate the coordinates (in the registration sheet) at which a color is acquired with the process obtained from the coordinates is stored in the information processing system 10 in advance. Example parameters prepared in advance are as follows: Color extracted at coordinates (X coordinates: 100, 200; Y coordinates: 1, 50) for "OCR of Kanji characters"; Color extracted at coordinates (X coordinates: 100, 200; Y coordinates: 51, 100) for "OCR of dates"; and Color extracted at coordinates (X coordinates: 100, 200; Y coordinates: 101, 150) for "OCR of alphanumeric characters". In a second method, the administrator 8 associates colors with processes on the management site. FIG. 45 illustrates an example of a management site 150 for associating a color with a process. The management site 150 is provided as a web page or a web application from the information processing system 10 to the terminal apparatus 30. The administrator 8 can register colors for processes using radio buttons 171. In the illustrated example, the user uses three marker pen colors.

In either method, as illustrated in FIG. 44(*c*), a numerical value identifying the marker color (green) and "OCR of Kanji characters" are associated with each other. A numerical value identifying the marker color (blue) and "OCR of dates" are associated with each other. A numerical value identifying the marker color (blue) and "OCR of alphanumeric characters" are associated with each other.

FIG. 46 illustrates a correspondence (task 2) between area information and a process using the original of a form. FIG. 46(a) illustrates the original of the form.

FIG. 46(b) illustrates the form after coloring is applied. The form illustrated in FIG. 46(b) is scanned by the device 20. FIG. 46(c) illustrates a portion of a setting file in which area information and processes are associated with each other.

As illustrated in FIG. 46(d), colors and processes are associated with each other in the setting file. The information processing system 10 detects a color of the registration sheet (registered in the setting file) from the form, and associates the coordinates of the area where the color is detected with the process in the setting file as area information.

In this embodiment, accordingly, the administrator 8 can change a color used for an area of the form to change the content of OCR processing to be performed on the area.

Ex1: colored in blue→OCR of Kanji characters, colored in red→OCR of dates

Ex2: colored in blue→OCR of postal code marks, colored in red→OCR of URLs

FIG. 47 illustrates a process (task 3) to be performed on an area in a form using the form.

FIG. 47(a) illustrates the original with items filled in by the user.

FIG. 47(b) illustrates processes to be performed on respective areas of the form. Since a process of performing OCR of Kanji characters is registered in a name area 172 of the form as OCR1, an entered name is identified as Kanji characters (including katakana and hiragana characters) and is subjected to OCR. Since a process of performing OCR of diagram illustrated in FIG. 10 according to the first embodiment described above are applied.

Figure 48:
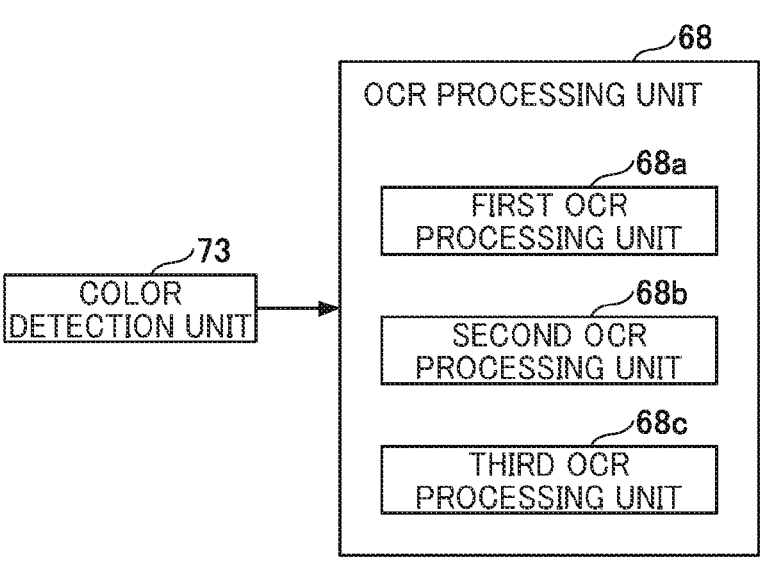
FIG. 48 is a diagram illustrating the functional configuration of an OCR processing unit according to the second embodiment.

FIG. 48 illustrates the functional configuration of the OCR processing unit 68 according to this embodiment. The OCR processing unit 68 includes a first OCR processing unit 68a, a second OCR processing unit 68b, and a third OCR processing unit 68c.

The first OCR processing unit 68a performs character recognition of a Kanji character. The second OCR processing unit 68b performs character recognition of a date. The third OCR processing unit 68c performs character recognition of an alphanumeric character. The first OCR processing unit 68a, the second OCR processing unit 68b, and the third OCR processing unit 68c are identification devices that have learned the correspondence between images of Kanji characters and character codes, the correspondence between images of dates and character codes, and the correspondence between images of alphanumeric characters and character codes, respectively, by using machine learning.

Machine learning is a technique that enables a computer to acquire human-like learning ability. Machine learning refers to a technology in which a computer autonomously generates an algorithm to be used for determination such as data identification from training data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of those learning methods.

As presented in Table 5, in this embodiment, a color of an area and an OCR language are associated with each other in a setting file.

TABLE 5

| A ID | B Marker color | C Process | D Start point X coordinate | E Start point Y coordinate | F End point X coordinate | G End point Y coordinate | H Format | I CSV column name | J CSV position (column) | K CSV position (start row) | L OCR language | M Order of use for file name |
|---|---|---|---|---|---|---|---|---|---|---|---|---|
| 1 | H = 61 to 180° (green) | OCR 1 | 47 | 171 | 87 | 151 | Text | Name | | | Kanji character | 1 |
| 2 | H = 181 to 300° (blue) | OCR 2 | 30 | 130 | 60 | 70 | Text | Application date | 3 | 2 | Date | |
| 3 | H = 0 to 60°, 301 to 360° (red) | OCR 3 | 5 | 30 | 150 | 5 | Text | Employee number | 4 | 2 | Alphanumeric character | | dates is registered in an application date area 173 of the form as OCR2, an entered application date is identified as the date and time and is subjected to OCR. Since a process of performing OCR of alphanumeric characters is registered in an employee number area 174 as OCR3, an entered employee number is identified as alphanumeric characters and is subjected to OCR.

Functions

In this embodiment, the hardware configuration diagrams illustrated in FIGS. 8 and 9 and the functional configuration Table 5 presents an example of the setting file 9 stored in the external service system 40 according to this embodiment. In the description of Table 5, differences from Table 4 will mainly be described. In the setting file presented in Table 5, the "process" item specifies OCR1, OCR2, and OCR3. The "OCR language" item specifies recognition targets corresponding to colors of areas. In Table 5, for example, "Kanji character" is set for green, "date" is set for blue, and "alphanumeric character" is set for red.

The first OCR processing unit 68a performs character recognition of a Kanji character in an area colored in green.

The second OCR processing unit 68b performs character recognition of a date in an area colored in blue. The third OCR processing unit 68c performs character recognition of an alphanumeric character in an area colored in red.

In this embodiment, accordingly, the recognition targets are limited in accordance with Kanji characters, dates, and alphanumeric characters in the corresponding areas, and recognition accuracy can be improved.

The type (recognition target) of OCR is not limited to those described above, and examples thereof include a postal code, an email address, a single-byte alphanumeric character, a number (such as a telephone number or a postal code in a format without a hyphen between numbers), a number (such as a telephone number or a postal code in a format with a hyphen between numbers), and a URL. In this embodiment, Kanji characters include character strings in hiragana and katakana. Text in various languages (such as English, French, German, Chinese, and Arabic) may be recognition targets.

Application Processing Information

Next, application process information will be described in detail. The application processing information illustrated in FIG. 11 is also applied to this embodiment.

Figure 49:
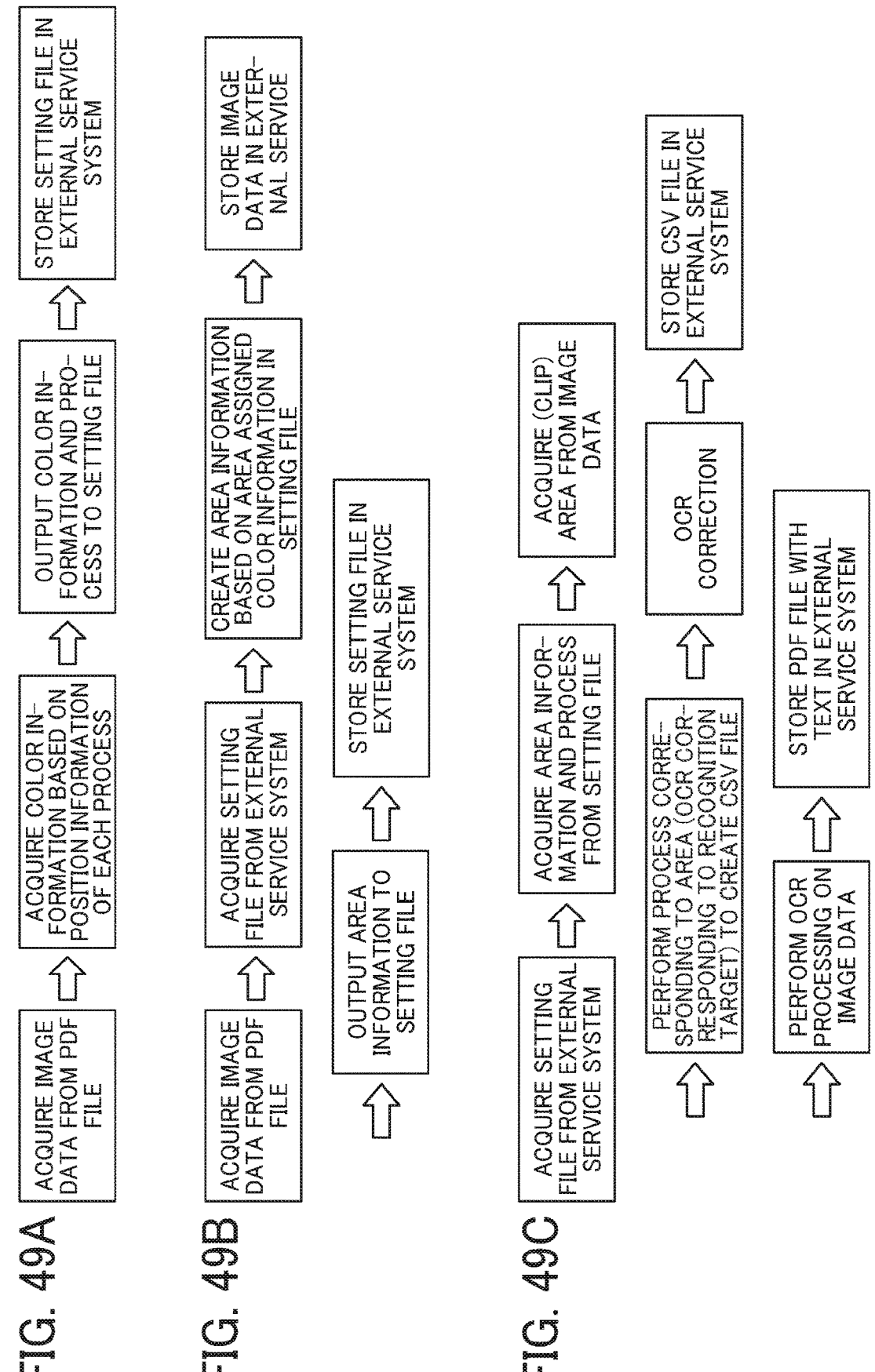
FIG. 49A is a view schematically illustrating a series of processes performed by an application according to the second embodiment.
FIG. 49B is a view schematically illustrating a series of processes performed by an application according to the second embodiment.
FIG. 49C is a view schematically illustrating a series of processes performed by an application according to the second embodiment.

FIGS. 49A to 49C schematically illustrate series of processes performed by applications. In the description of FIGS. 49A to 49C, differences from FIGS. 12A to 12C will mainly be described. FIG. 49C illustrates a series of processes of an application (e.g., an expense claim form application) for outputting data from an area of a form. In this embodiment, OCR of Kanji characters, dates and times, or alphanumeric characters is performed in accordance with the OCR language (recognition target) set in the setting file.

Registration of Correspondence between Color and Process in Setting File

Next, setting of a correspondence between a color and a process by the administrator 8 and creation of a setting file will be described with reference to FIG. 50.

FIG. 50 illustrates a method for setting a correspondence between a color and a process using a registration sheet. In the description of FIG. 50, differences from FIG. 13 will mainly be described. FIG. 50(a) illustrates a registration sheet before the administrator 8 colors the registration sheet with marker pens. The original of the registration sheet is registered in the external service system 40.

The first row of the registration sheet specifies items of the respective columns (marker color in the first column, and process in the second column). This embodiment includes three "processes" (OCR of Kanji characters, OCR of dates, and OCR of alphanumeric characters), and the following processes are set in the registration sheet in advance: OCR of Kanji characters in the second row; OCR of dates in the third row; and OCR of alphanumeric characters in the fourth row. In the original of the registration sheet, cells 130 designating marker colors are blank.

FIG. 50(b) is a view in which the administrator 8 colors the cells 130 with marker pens for the respective processes. For example, the administrator 8 uses green, blue, and red marker pens among the owned marker pens. The administrator 8 assigns green to OCR of Kanji characters, blue to OCR of dates, and red to OCR of alphanumeric characters. The original of the registration sheet includes predetermined spacings between rows to avoid mixture of color inks due to spreading of the color inks.

The administrator 8 colors each of the cells 130 of the registration sheet with a marker pen among the owned marker pens in accordance with the assignment of the desired marker color to the process, which is determined by the administrator 8. The device 20 scans the registration sheet to register the correspondence between the marker colors and the processes in the information processing system 10.

Screen Example on Device

An example screen on the device 20 may be similar to that illustrated in FIG. 14. A sequence chart illustrating an example procedure for the administrator 8 to register a correspondence between a color and a process in a setting file using a registration sheet may be similar to that in FIG. 15. However, the processing of step S12 is different.

S12: The color detection unit 73 detects color information from the cells 130 determined in advance in the image data. FIGS. 51A and 51B schematically illustrate detection of color information. In the description of FIGS. 51A and 51B, differences from FIGS. 16A and 16B will mainly be described. As illustrated in FIG. 51A, the process of OCR of Kanji characters is determined by the fill color of a rectangular cell defined by two position coordinate points A and B (an example of position information) indicating diagonal corners. The process of OCR of dates is determined by the fill color of a rectangular cell defined by position coordinate points C and D. The process of OCR of alphanumeric characters is determined by the fill color of a rectangular cell defined by position coordinate points E and F.

As illustrated in FIG. 51B, the barcode 101 or the application data management unit 41 stores the processes and the sets of position coordinate points of the respective cells 130 to be colored in association with each other. The color detection unit 73 acquires the H value of the HSV color system from each of the cells 130, based on the position coordinate points illustrated in FIG. 51B. Upon detection of the color (H=(0 to 60°, 301 to 360°)) corresponding to red from the cell 130 associated with OCR of alphanumeric characters, the color detection unit 73 registers H=(0 to 60°, 301 to 360°) of the HSV color system in the setting file in association with OCR of alphanumeric characters. Upon detection of the color (H=(61 to 180°)) corresponding to green from the cell 130 associated with OCR of Kanji characters, the color detection unit 73 registers H=(61 to 180°) in the setting file in association with OCR of Kanji characters. Upon detection of the color (H=(181 to 300°)) corresponding to blue from the cell 130 associated with OCR of dates, the color detection unit 73 registers H=(181 to 300°) in the setting file in association with OCR of dates.

The colors and the processes may be associated with each other by the administrator using the management site 150 illustrated in FIG. 45.

Designation of File Name using Process

Also in this embodiment, the administrator 8 may set the file name of the CSV file by coloring the registration sheet.

FIG. 52 illustrates an example of use of a registration sheet in which a process is applied to the setting of a file name. In the description of FIG. 52, differences from FIG. 17 will mainly be described. As in FIG. 17, the processes are limited to OCR. In the registration sheet illustrated in FIG. 52(a), OCR1 and OCR2 are set as processes, and the order of use for the file names, that is, "File name 1" and "File name 2", is set.

As illustrated in FIG. 52(*b*), the administrator 8 uses marker pens to designate the color (e.g., green) of the marker pen to be used for File name 1 and the color (e.g., blue) of the marker pen to be used for File name 2.

As illustrated in FIG. 52(*c*), a numerical value indicating a color and a process (to be used for a file name) are associated with each other in the setting file. Two methods similar to those in FIG. 17 for associating colors with processes may be used.

Figure 53:
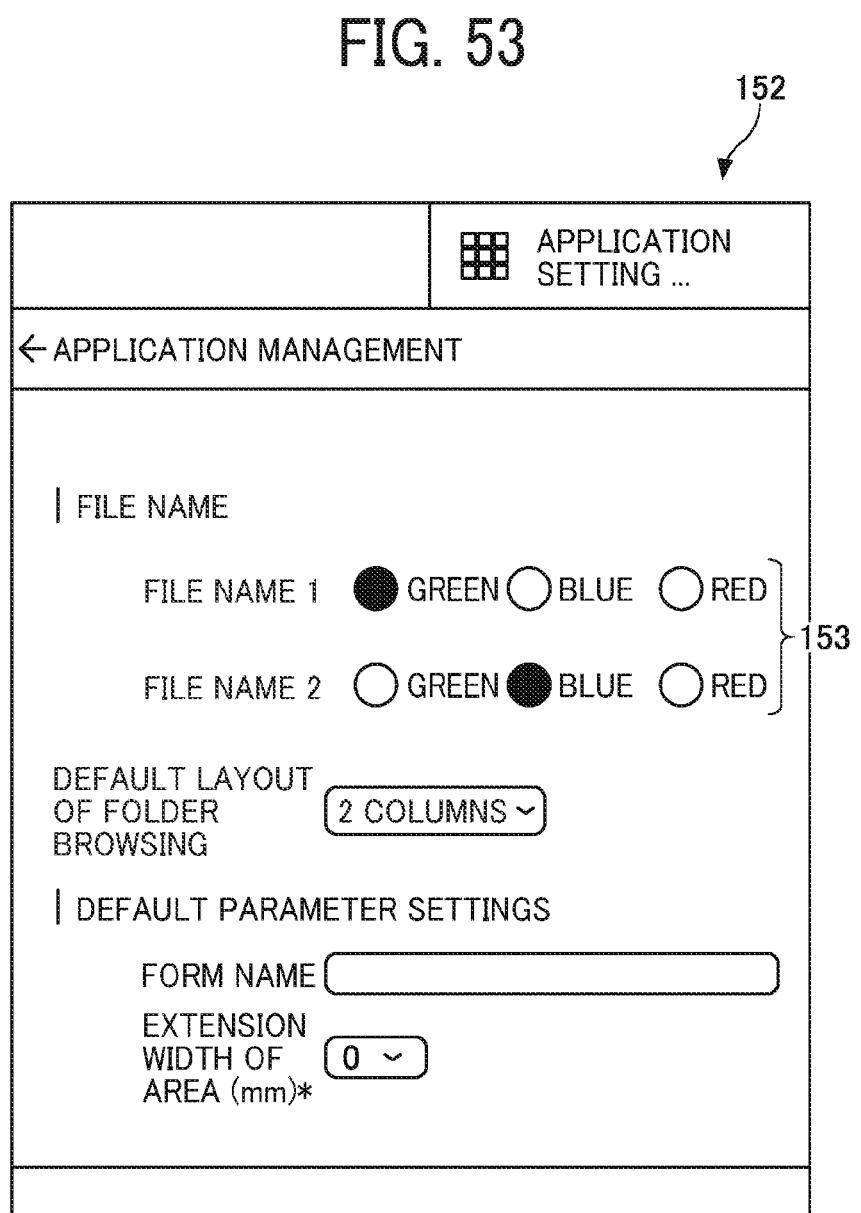
FIG. 53 is a view illustrating an example of a management site according to the second embodiment.

FIG. 53 illustrates an example of a management site 152 for associating a color with a process. The administrator 8 can use radio buttons 153 to register colors to be used to designate file names. In the illustrated example, the user uses three marker pen colors.

As illustrated in FIG. 52(*c*), a numerical value identifying the marker color (green) and File name 1 are associated with each other. A numerical value identifying the marker color (blue) and File name 2 are associated with each other. File names 1 and 2 indicate the order of use for the file names.

FIGS. 54A and 54B illustrate an example of a form in which the administrator 8 designates two areas using marker pens. FIG. 54A illustrates the original of the form, and FIG. 54B illustrates the form colored with marker pens. The device 20 scans the form illustrated in FIG. 54B, and the information processing system 10 identifies the colored areas in the form and registers area information in the setting file.

In FIG. 54B, the name area 172 is designated by a green marker pen, and the application date area 173 is designated by a blue marker pen. For example, when the name is "Ricoh Taro" and the application date is "2020/10/10", the file name of the CSV file obtained when the form illustrated in FIG. 54B is scanned by the device 20 is "Ricoh Taro20201010.csv". Three or more marker pen colors may be used to specify file names.

The order of areas to be used for file names (file 1, file 2) may not necessarily be registered. In this case, the data storing unit 66 sets the file names in the order of registration of the colors in the setting file. As a result, colors of marker pens are not changed from cell to cell of the registration sheet.

Modification of Registration Sheet

As illustrated in FIG. 55, a CSV position may be registered in advance in the registration sheet. In the description of FIG. 55, differences from FIG. 20 will mainly be described. FIG. 55(*a*) illustrates the registration sheet before coloring is applied. The registration sheet includes columns of a CSV column name 154 and a CSV position 155, and the administrator 8 does not manually set a CSV position in the setting file.

FIG. 55(*b*) illustrates the registration sheet after coloring is applied. The registration sheet illustrated in FIG. 55(*b*) is scanned by the device 20. FIG. 55(*c*) illustrates a portion of a setting file in which colors, processes, and area information are associated with each other.

Registration of Area Information

Next, registration of the area information will be described with reference to FIGS. 56A to 56C and the like. FIGS. 56A to 56C illustrate a method for marking areas in a form. FIG. 56A illustrates the form (original) before areas are designated using marker pens. The administrator 8 designates, on the original of the form, an area on which a process registered in the registration sheet is to be executed, using a marker pen of a registered color. For example, the administrator 8 is to set the name area 172 as an area to be subjected to OCR of Kanji characters, the application date area 173 as an area to be subjected to OCR of dates, and the employee number area 174 as an area to be subjected to OCR of alphanumeric characters.

FIG. 56B illustrates a form sheet on which areas are colored with colors of marker pens. The name area 172 is colored with a green marker pen. The application date area 173 is colored with a blue marker pen. The employee number area 174 is colored with a red marker pen. The device 20 scans the form sheet to register the relationship between the areas of the form and the processes in the setting file.

According to the setting file presented in Table 5, the first OCR processing unit 68*a* performs OCR processing on the name area 172 such that Kanji characters are to be recognized to generate acquired data. The second OCR processing unit 68*b* performs OCR processing on the application date area 173 such that a date and time are to be recognized to generate acquired data. The third OCR processing unit 68*c* performs OCR processing on the employee number area 174 such that alphanumeric characters are to be recognized to generate acquired data.

FIG. 56C illustrates an example of a form with items filled in by the user. From the colored areas illustrated in FIG. 56B, "Ricoh Taro", "2020/10/10", and "50412" are acquired data.

Area Registration Screen

Figure 57:
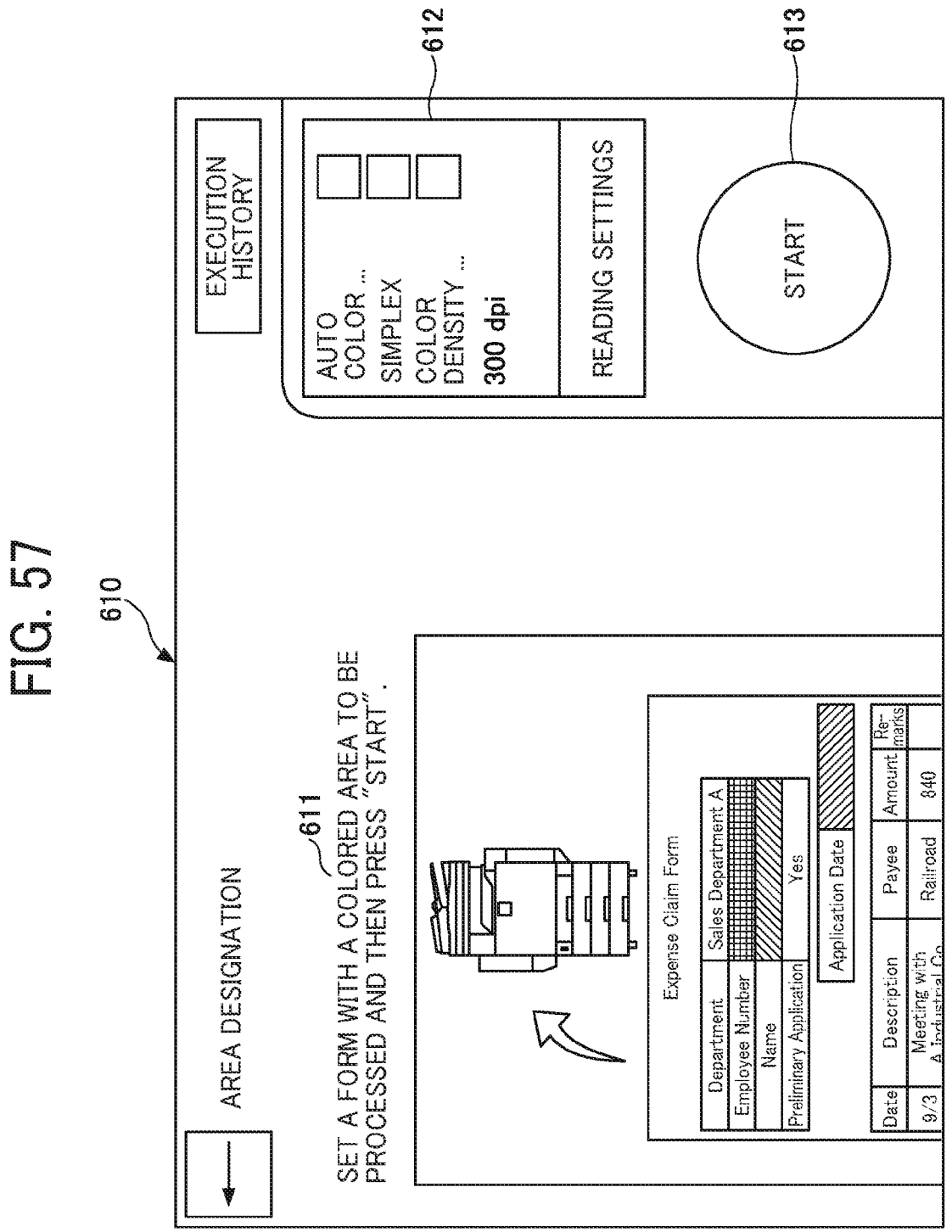
FIG. 57 is a view illustrating an example of an area registration screen displayed on the device upon registration of area information according to the second embodiment.

FIG. 57 illustrates an example of an area registration screen 610 displayed on the device 20 upon registration of area information. In the description of FIG. 57, differences from FIG. 24 will mainly be described. In FIG. 57, areas marked on the form are different from those in FIG. 24.

A sequence chart illustrating an example procedure for the information processing system 10 to acquire area information from a form with an area marked by the administrator 8 and create a setting file may be similar to that in FIG. 25. The examples illustrated in FIGS. 26A to 26C and 27 according to the first embodiment are also applied.

FIG. 58 illustrates a correspondence between a setting file and a form. In the example illustrated in FIG. 58, the data acquired from the area information with ID=1 corresponds to the CSV column name "name". The item "name" is used first in the file name. The data acquired from the area information with ID=2 corresponds to the CSV column name "application date". Since the CSV position indicating the application date is set to column 3 and row 2, the data acquired from the area information with ID=2 is written to the third column and second row of the file. The data acquired from the area information with ID=3 corresponds to the CSV column name "employee number". Since the CSV position indicating the employee number is set to column 4 and row 2, the data acquired from the area information with ID=3 is written to the fourth column and second row of the file.

The examples illustrated in FIGS. 29 to 36 according to the first embodiment are also applied.

Operation Procedure

Figure 59A:
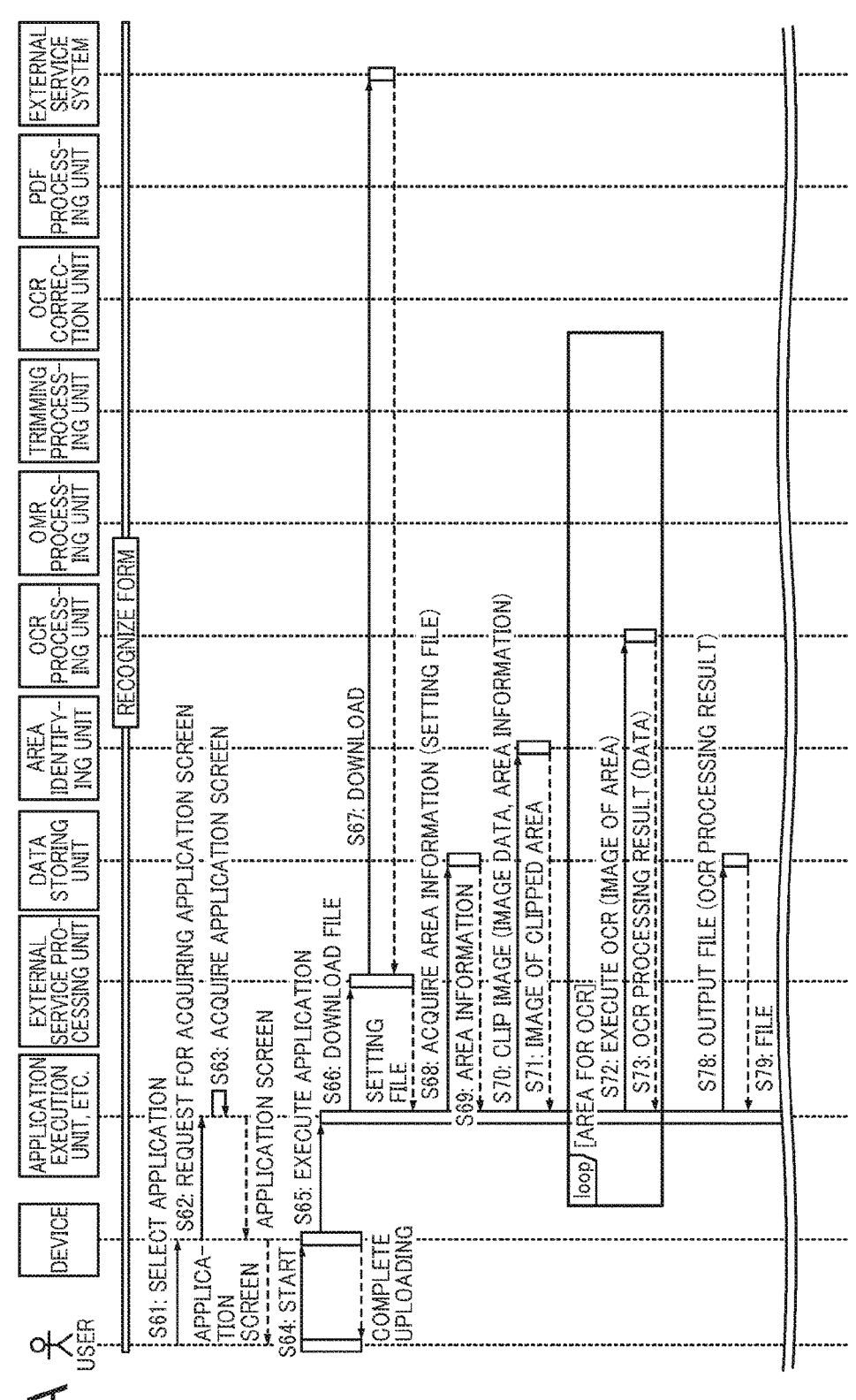
FIG. 59A is a sequence chart of an example procedure for the information processing system to receive a PDF file including image data of a form from the device and acquire data from an area of the form according to the second embodiment.
Figure 59B:
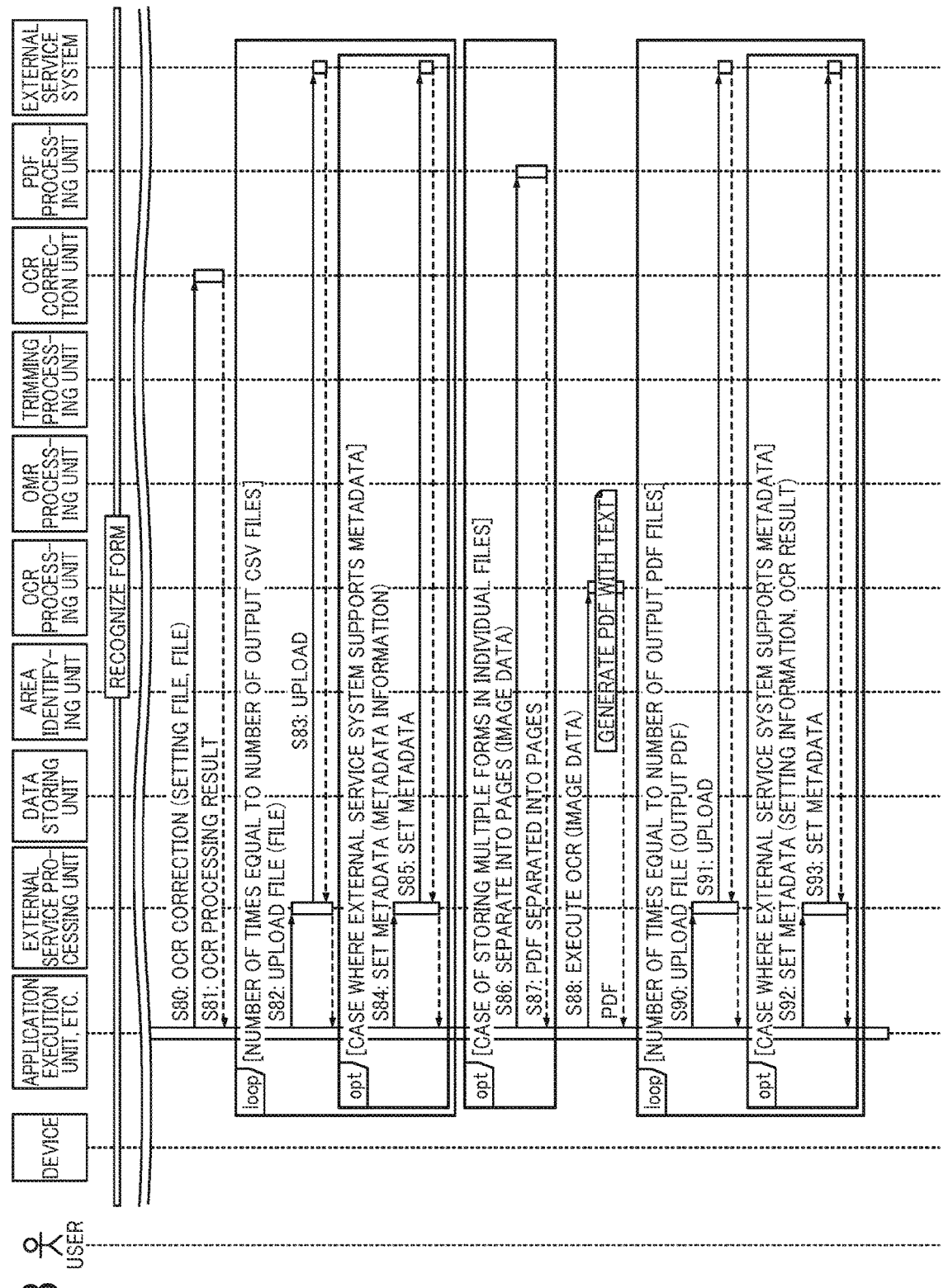
FIG. 59B is a sequence chart of an example procedure for the information processing system to receive a PDF file including image data of a form from the device and acquire data from an area of the form according to the second embodiment.

FIGS. 59A and 59B are sequence charts of an example procedure for the information processing system 10 to receive a PDF file including image data of a form from the device 20 and obtain acquired data from an area of the form.

In the description of FIGS. 59A and 59B, differences from FIGS. 37A and 37B will mainly be described.

The processing of steps S61 to S71 may be similar to that in FIG. 37A.

In response to a plurality of processing-target areas to be subjected to OCR processing, steps S72 and S73 are repeatedly executed the number of times equal to the number of processing-target areas.

S72: The input/output processing unit 48 designates an image of a processing-target area, based on the application processing information 53, and requests the OCR processing unit 68 to perform OCR processing on the processing-target area. In this embodiment, the input/output processing unit 48 may designate the format and the OCR language (Kanji characters, dates, and alphanumeric characters) acquired from the setting file in association with the processing-target area.

S73: The OCR processing unit 68 performs OCR processing on the processing-target area using a recognition engine supporting the format and the OCR language. That is, the first OCR processing unit 68a recognizes a Kanji character, the second OCR processing unit 68b recognizes a date, and the third OCR processing unit 68c recognizes an alphanumeric character. The OCR processing unit 68 returns the data converted into character code data (OCR processing result) to the input/output processing unit 48.

S78, S79: Then, the input/output processing unit 48 designates the acquired data, the CSV column name, the CSV position, and the file name (acquired from the setting file), which are acquired from each processing-target area, based on the application processing information 53, and requests the data storing unit 66 to output a file including the acquired data.

The processing of steps S80 to S93 may be similar to that in FIG. 37B.

As a result, the CSV file and the PDF file registered in the external service system 40 can be displayed. The method for displaying the CSV file and the PDF file may be similar to that in the first embodiment.

As described above, the data output system 100 according to this embodiment provides the advantages of the first embodiment and enables the administrator 8 to register more detailed content of a process and a mark (color). A target to be recognized by OCR is set for each area, and OCR recognition accuracy can be improved. Further, this embodiment adopts a simple method in which the administrator 8 marks a registration sheet to set a target to be recognized by OCR for each area.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, in the embodiments described above, the information processing system 10 outputs data acquired from an area of a form to a file. In one or more embodiments, data acquired from an area of a form may be transmitted by email instead of being formed into a file or may be displayed on the device 20.

In the example configurations illustrated in FIG. 10 and the like, the terminal apparatus 30, the device 20, and the information processing system 10 are each divided according to main functions to facilitate understanding of the processes performed by the terminal apparatus 30, the device 20, and the information processing system 10. No limitation is intended by how the functions are divided by process or by the name of the functions. The processing of the terminal apparatus 30, the device 20, and the information processing system 10 may be divided into more units of processing in accordance with the content of the processing. Further, the division may be made such that each unit of processing includes more processing.

The apparatuses or devices described in one or more embodiments are just one example of plural computing environments that implement the one or more embodiments disclosed herein. In some embodiments, the information processing system 10 includes multiple computing devices, such as a server cluster. The plural computing devices are configured to communicate with one another through any type of communication link including a network, shared memory, etc., and perform the processes disclosed herein.

Further, the information processing system 10 can be configured to share the processing steps disclosed in the embodiments described above, for example, the processing steps illustrated in FIGS. 37A and 37B, in various combinations. For example, a process executed by a predetermined unit may be executed by a plurality of information processing apparatuses included in the information processing system 10. The components of the information processing system 10 may be integrated into one server apparatus or divided into a plurality of apparatuses.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on.

Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

REFERENCE SIGNS LIST

10 information processing system
20 device

30 terminal apparatus
48 input/output processing unit
62 external service processing unit
65 area detection unit
66 data storing unit
67 area identifying unit
100 data output system

The invention claimed is:

1. An information processing system communicably connectable to one or more apparatuses and configured to execute a plurality of processes, the information processing system comprising:

a memory to store, in response to a user operation on a first apparatus, setting information associating, for each one of the plurality of processes, a process among the plurality of processes and identification information identifying content of the process;

processing circuitry configured to receive, from the first apparatus, second image data including the identification information, identify an area in the second image data received from the first apparatus, the identified area including the identification information of a particular process among the plurality of processes, store area information of the area that is identified, a particular process corresponding to the identification information in the area, and an application selected by the user at the first apparatus, execute the particular process on a third image data received from a second apparatus, based on the area information and the particular process associated with the application selected at the second apparatus, and output data including the area on which the particular process is executed.

2. The information processing system according to claim 1, wherein:

the identification information includes color information.

3. The information processing system according to claim 2, wherein:

the particular process includes optical character recognition (OCR), and the memory is to store information indicating that, as the area that is identified, a different recognition target is to be recognized in accordance with the color information.

4. The information processing system according to claim 3, wherein;

the recognition target comprises at least one of a character string, a postal code, an email address, a single-byte alphanumeric character, a number, or a uniform resource locator (URL).

5. The information processing system according to claim 1, wherein the processing circuitry is further configured to:

transmit screen information to the first apparatus, the screen information being information on a screen on which the identification information and the particular process are associated with each other.

6. The information processing system according to claim 1, wherein:

the memory is to store the particular process and the identification information in association with each other, based on the identification information, the identification information being included in the second image data received from the first apparatus.

7. The information processing system according to claim 6, wherein:

the memory is to store the particular process and the identification information in association with each other, based on position information in the identification information included in the first image data, the particular process being a process to be performed by the information processing system.

8. The information processing system according to claim 6, wherein the processing circuitry is configured to:

receive second image data of a predetermined document from the first apparatus; and detect an area from the second image data, the area including the identification information associated with the particular process, wherein the memory is to store position information of the area in association with the particular process.

9. The information processing system according to claim 8, wherein;

the processing circuitry is configured to receive third image data of the predetermined document from the second apparatus, the area on which the particular process is executed being identified from the third image data, and the particular process that is executed being associated with the position information of the area.

10. The information processing system according to claim 9, wherein the processing circuitry is configured to:

output a file including the data on which the particular process is executed, and store the file in an external service system.

11. The information processing system according to claim 10, wherein:

the particular process includes a process of designating one or more file names, and the processing circuitry is configured to set the acquired data in a file name of the file.

12. The information processing system according to claim 6, wherein;

the first image data includes position information of an area corresponding to the content of the particular process, and the memory is to store the particular process and the identification information in association with each other, based on the identification information included in the area indicated by the position information and the content of the particular process corresponding to the area indicated by the position information.

13. The information processing system according to claim 12, wherein:

the memory stores the position information of an area corresponding to the content of the particular process in association with identification information in the first image data.

14. The information processing system according to claim 1, wherein:

the particular process includes one of optical character recognition (OCR), optical mark recognition (OMR), trimming, translation, masking, and encryption.

15. A processing method, comprising:

storing, in response to a user operation on a first apparatus, setting information associating, for each one of a plurality of processes, a process among the plurality of processes and identification information identifying content of the process;

receiving, from the first apparatus, second image data including the identification information;

identifying an area in the second image data received from the first a second apparatus, the identified area including the identification information of a particular process among the plurality of processes;

storing area information of the area that is identified, a particular process corresponding to the identification information in the area, and an application selected by the user at the first apparatus;

executing the particular process on a third image data received from a second apparatus, based on the area information and the particular process associated with the application selected at the second apparatus; and outputting data including the area on which the particular process is executed.

16. A non-transitory computer readable recording medium storing computer readable code for controlling a computer system to carry out a method comprising:

storing, in response to a user operation on a first apparatus, setting information associating, for each one of a plurality of processes, a process among the plurality of processes and identification information identifying content of the process;

receiving, from the first apparatus, second image data including the identification information;

identifying an area in the second image data received from the first apparatus, the identified area including the identification information of a particular process among the plurality of processes;

storing area information of the area that is identified, a particular process corresponding to the identification information in the area, and an application selected by the user at the first apparatus;

executing the particular process on a third image data received from a second apparatus, based on the area information and the particular process associated with the application selected at the second apparatus; and outputting data including the area on which the particular process is executed.

* * * * *